US009873793B2

United States Patent
Masunaga et al.

(10) Patent No.: US 9,873,793 B2
(45) Date of Patent: Jan. 23, 2018

(54) POLYAMIDE RESIN COMPOSITION, METHOD OF MANUFACTURING AND MOLDED PRODUCT

(71) Applicant: Toray Industries, Inc., Tokyo (JP)

(72) Inventors: Atsushi Masunaga, Nagoya (JP); Hideyuki Umetsu, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 15/029,366

(22) PCT Filed: Aug. 28, 2014

(86) PCT No.: PCT/JP2014/004433
§ 371 (c)(1),
(2) Date: Apr. 14, 2016

(87) PCT Pub. No.: WO2015/056393
PCT Pub. Date: Apr. 23, 2015

(65) Prior Publication Data
US 2016/0264778 A1 Sep. 15, 2016

(30) Foreign Application Priority Data
Oct. 18, 2013 (JP) ................................. 2013-217175

(51) Int. Cl.
*C08G 73/02* (2006.01)
*C08L 63/00* (2006.01)
*C08L 77/06* (2006.01)
*C08G 69/48* (2006.01)
*C08L 77/02* (2006.01)
(Continued)

(52) U.S. Cl.
CPC .............. *C08L 77/06* (2013.01); *C08G 69/48* (2013.01); *C08J 3/005* (2013.01); *C08L 77/02* (2013.01);
(Continued)

(58) Field of Classification Search
CPC ...... C08L 77/06; C08L 77/02; C08L 2201/08; C08G 69/48; C08J 3/005; C08J 2377/02;
(Continued)

(56) References Cited

U.S. PATENT DOCUMENTS

2010/0029819 A1 2/2010 Palmer et al.
2011/0290209 A1 12/2011 Desbois et al.
(Continued)

FOREIGN PATENT DOCUMENTS

JP 7-138473 A 5/1995
JP 2006-273945 A 10/2006
(Continued)

OTHER PUBLICATIONS

Supplementary European Search Report dated Jan. 17, 2017, of corresponding European Application No. 14853654.3.

*Primary Examiner* — David T Karst
(74) *Attorney, Agent, or Firm* — DLA Piper LLP (US)

(57) ABSTRACT

A polyamide resin composition includes a specified amount of a compound and/or its condensate that includes a hydroxyl group and an epoxy group or a carbodiimide group and has a specific structure. Another polyamide resin composition includes specified amounts of an aliphatic compound having three or more amino groups or three or more hydroxyl groups per molecule and a compound having more than one functional group per molecule that is reactive with the amino group or the hydroxyl group, wherein, when an ASTM No. 1 dumbbell of 3.2 mm in thickness produced by injection molding of the polyamide resin composition is processed by heat treatment at 130° C. for 100 hours, an increase rate in concentration of a carboxyl group in the polyamide resin composition from a surface of the molded product to a depth of 0.2 mm after the heat treatment is lower than 70%.

11 Claims, 2 Drawing Sheets

(51) Int. Cl.
*C08J 3/00* (2006.01)
*C08K 5/053* (2006.01)
*C08K 5/15* (2006.01)
*C08K 5/29* (2006.01)

(52) U.S. Cl.
CPC ........ *C08J 2377/02* (2013.01); *C08J 2377/06* (2013.01); *C08J 2463/02* (2013.01); *C08J 2463/04* (2013.01); *C08J 2479/00* (2013.01); *C08K 5/053* (2013.01); *C08K 5/15* (2013.01); *C08K 5/29* (2013.01); *C08L 2201/08* (2013.01)

(58) Field of Classification Search
CPC .......... C08J 2377/06; C08J 2463/02; C08J 2463/04; C08J 2479/00; C08K 5/053; C08K 5/15; C08K 5/29
USPC .................................. 523/400; 525/540, 523
See application file for complete search history.

(56) References Cited

U.S. PATENT DOCUMENTS

| | | |
|---|---|---|
| 2011/0305863 A1 | 12/2011 | Morooka |
| 2012/0029134 A1 | 2/2012 | Doshi |
| 2013/0338263 A1 | 12/2013 | Tao et al. |
| 2015/0232617 A1 | 8/2015 | Masunaga et al. |

FOREIGN PATENT DOCUMENTS

| | | |
|---|---|---|
| JP | 2009-155412 A | 7/2009 |
| JP | 2013-518174 A | 5/2013 |
| WO | 2010/110077 A1 | 9/2010 |

POLYAMIDE RESIN COMPOSITION, METHOD OF MANUFACTURING AND MOLDED PRODUCT

TECHNICAL FIELD

This disclosure relates to a polyamide resin composition and a molded product produced by molding the polyamide resin composition.

BACKGROUND

Polyamide resins have good mechanical properties, heat resistance and chemical resistance and are thereby favorably used in the applications of automobiles and electric and electronic parts. Polyamide resins have good heat aging resistance and are accordingly used for components exposed to extremely high-temperature heat such as engine covers, among various applications. With a recent increase in density of components in the automobile engine room and a recent increase in engine power, the environmental temperature in the engine room gradually increases. There is accordingly a need for the heat aging resistance in the higher temperature condition. A conventionally known technique to improve the heat aging resistance of the polyamide resin provides a polyamide resin composition by mixing a copper compound and a halogen compound with a polyamide resin (for example, JP 2006-273945 A). The polyamide resin composition of JP 2006-273945 A, however, fails to provide sufficient heat aging resistance responding to the recent increase in environmental temperature in use. Various technological improvements have been proposed as the technique to further improve the heat aging resistance at high temperature. For example, a polyamide resin composition has been proposed to include a polyamide resin, a polyol having the number-average molecular weight of less than 2000, an auxiliary stabilizer such as a copper stabilizer and hindered phenol, and a polymer reinforcing material (for example, US 2010/0029819 A). In another example, a polyamide resin composition has been proposed to include a polyamide resin, polyethyleneimine, a lubricant, a copper-containing stabilizer, a filler and nigrosin (for example, US 2011/0290209 A).

A molded product produced from the polyamide resin composition of US 2010/0029819 A has good heat aging resistance at a temperature of 150° C. to 230° C., but has a problem of poor heat aging resistance at lower than 150° C. The polyamide resin composition of US 2011/0290209 A also has good heat aging resistance at a temperature of 160° C. to 180° C., but has a problem of poor heat aging resistance at temperature lower than 150° C. Despite a yearly increasing tendency in environmental temperature of the components in the automobile engine room, the engine room is not always kept at high temperature. A material having the heat aging resistance not only at high temperature but at low temperature is needed for the components in the automobile engine room.

The polyamide resin compositions of US 2010/0029819 A and US 2011/0290209 A additionally have problems of (i) surface appearance such as bleed out of the polyol or coloring caused by the like on the surface layer of the molded product or isolation of the copper ion and (ii) poor retention stability. The automobile components such as engine room components having the demand for the heat aging resistance require the high dimensional accuracy, chemical resistance and creep resistance as well as the high heat aging resistance. Molded products produced from the polyamide resin compositions described in JP 2006-273945 A, US 2010/0029819 A and US 2011/0290209 A, however, fail to provide such properties at sufficient levels. By taking into account these problems, it could be helpful to provide a polyamide resin composition usable to produce a molded product having excellent heat aging resistance, surface appearance, retention stability, dimensional accuracy, chemical resistance and creep resistance.

SUMMARY

We found success by either (I) a polyamide resin composition prepared by mixing a specified amount of a compound and/or its condensate that includes a hydroxyl group and an epoxy group or a carbodiimide group and has a specific structure with a polyamide resin or (II) a polyamide resin composition including specified amounts of an aliphatic compound having three or more amino groups or three or more hydroxyl groups per molecule and a compound having more than one functional group per molecule that is reactive with the amino group or the hydroxyl group, wherein when an ASTM No. 1 dumbbell of 3.2 mm in thickness produced by injection molding of the polyamide resin composition is processed in the atmosphere by heat treatment at 130° C. for 100 hours, an increase rate in concentration of a carboxyl group in the polyamide resin composition from a surface of the molded product to a depth of 0.2 mm after the heat treatment is lower than 70%.

We thus provide:

(1) A polyamide resin composition, comprising:
100 parts by weight of an (a) polyamide resin; and
0.1 to 20 parts by weight of a (g) compound and/or its condensate that includes a hydroxyl group and an epoxy group or a carbodiimide group and has a structure expressed by Formula (1):

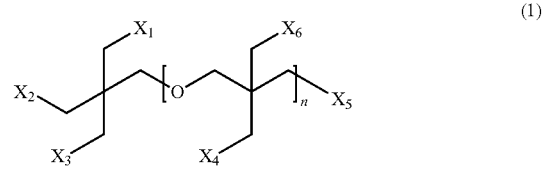

(where $X_1$ to $X_6$ are identical or different and respectively represent OH, $CH_3$ or OR, in which a total number of OH and OR is three or more, R represents an epoxy group-including or carbodiimide group-including organic group, and n indicates a range of 0 to 20).

(2) The polyamide resin composition according to (1), wherein the (g) compound and/or its condensate has a number of hydroxyl groups per molecule that is greater than a total number of epoxy groups and carbodiimide groups per molecule.

(3) The polyamide resin composition according to either (1) or (2), wherein the (g) compound and/or its condensate has a hydroxyl value of 100 to 2000 mg KOH/g.

(4) The polyamide resin composition according to any one of (1) to (3), wherein a reaction rate of the hydroxyl group and the epoxy group or the carbodiimide group in the (g) compound and/or its condensate is 1 to 95%.

(5) The polyamide resin composition according to any one of (1) to (4), wherein n in Formula (1) is in a range of 1 to 20.

(6) The polyamide resin composition according to any one of (1) to (5),
wherein when an ASTM No. 1 dumbbell of 3.2 mm in thickness produced by injection molding of the polyamide resin composition is processed in the atmosphere by heat treatment at 130° C. for 100 hours, an increase rate in concentration of a carboxyl group in the polyamide resin composition from a surface of the dumbbell to a depth of 0.2 mm after the heat treatment is lower than 70%.

(7) The polyamide resin composition according to any one of (1) to (6),
wherein the (a) polyamide resin includes two or more different types of polyamide resins.

(8) A method of manufacturing the polyamide resin composition according to any one of (1) to (7),
the method comprising at least:
a process 1 of melt-kneading 10 to 250 parts by weight of the (g) compound and/or its condensate with 100 parts by weight of the (a) polyamide resin to produce a highly concentrated preliminary reactant; and
a process 2 of further melt-kneading the highly concentrated preliminary reactant with an (a) polyamide resin.

(9) A polyamide resin composition, comprising:
100 parts by weight of an (a) polyamide resin;
0.1 to 10 parts by weight of a (b) aliphatic compound having three or more amino groups or three or more hydroxyl groups per molecule; and
0.001 to 20 parts by weight of a (c) compound having more than one functional group per molecule that is reactive with the amino group or the hydroxyl group in the (b) component,
wherein a ratio of content of the (b) component to content of the (c) component is not less than 0.30 and is less than 10000, wherein
when an ASTM No. 1 dumbbell of 3.2 mm in thickness produced by injection molding of the polyamide resin composition is processed in the atmosphere by heat treatment at 130° C. for 100 hours, an increase rate in concentration of a carboxyl group in the polyamide resin composition from a surface of the molded product to a depth of 0.2 mm after the heat treatment is lower than 70%.

(10) The polyamide resin composition according to (9), wherein the (c) compound has a molecular weight of 800 to 10000.

(11) The polyamide resin composition according to either (9) or (10),
wherein the (b) aliphatic compound having three or more amino groups or three or more hydroxyl groups per molecule has an amine value of 100 to 2000 mg KOH/g.

(12) The polyamide resin composition according to either (9) or (10),
wherein the (b) aliphatic compound having three or more amino groups or three or more hydroxyl groups per molecule has a hydroxyl value of 100 to 2000 mg KOH/g.

(13) The polyamide resin composition according to any one of (9) to (12),
wherein the functional group of the (c) compound having more than one functional group per molecule that is reactive with the amino group or the hydroxyl group is an epoxy group or a carbodiimide group.

(14) The polyamide resin composition according to any one of (1) to (7) and (9) to (13), further comprising
1 to 150 parts by weight of an (e) inorganic filler relative to 100 parts by weight of the (a) polyamide resin.

(15) A molded product produced by molding the polyamide resin composition according to any one of (1) to (7) and (9) to (14).

The polyamide resin composition provides a molded product having excellent heat aging resistance, surface appearance, retention stability, dimensional accuracy, chemical resistance and creep resistance.

REFERENCE SIGNS LIST 1 solvent

DETAILED DESCRIPTION

Figure 1:
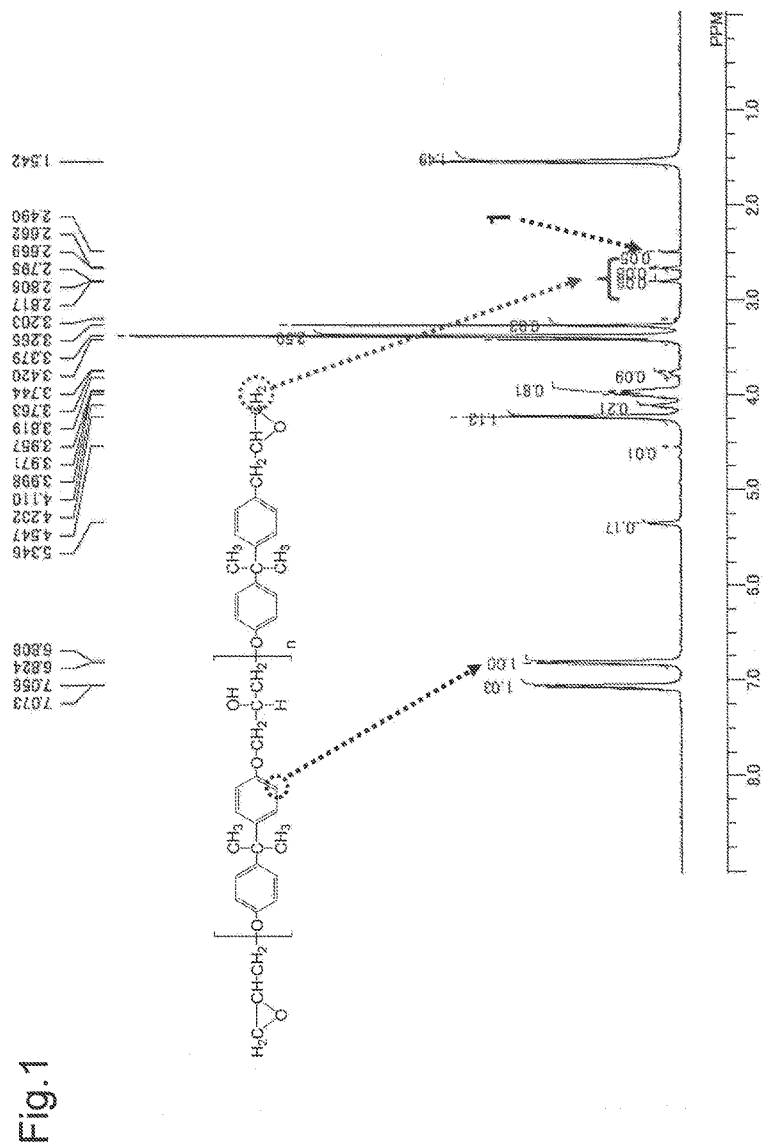
FIG. 1 is a chart showing a $^1$H-NMR spectrum of a dry blended product of a polyol and an epoxy compound.

The following describes examples in detail. A polyamide resin composition according to a first example includes an (a) polyamide resin, a (b) aliphatic compound having three or more amino groups or three or more hydroxyl groups per molecule (hereinafter referred to as "amino group- or hydroxyl group-containing aliphatic compound"), and a (c) compound having more than one functional group per molecule that is reactive with the amino group or the hydroxyl group in the (b) component (hereinafter referred to as "compound containing reactive functional group with amino group or hydroxyl group"). A polyamide resin composition according to a second example includes an (a) polyamide resin and a (g) compound and/or its condensate that includes a hydroxyl group and an epoxy group or a carbodiimide group and has a structure expressed by Formula (1) above (hereinafter referred to as "compound and/or its condensate").

The (a) polyamide resin may have a carboxyl terminal group expected to have dehydration condensation reaction with the amino group or the hydroxyl group in the (b) amino group- or hydroxyl group-containing aliphatic compound or with the hydroxyl group in the (g) compound and/or its condensate as described later. Additionally, the polyamide resin may have an amino terminal group and a carboxyl terminal group expected to react with the functional group in the (c) compound containing reactive functional group with amino group or hydroxyl group and with the epoxy group or the carbodiimide group in the (g) compound and/or its condensate. The (a) polyamide resin is accordingly expected to have excellent compatibility with the (b) amino group- or hydroxyl group-containing aliphatic compound, with the (c) compound containing reactive functional group with amino group or hydroxyl group and with the (g) compound and/or its condensate.

The (a) polyamide resin is a polyamide using (i) an amino acid, (ii) a lactam or (iii) a diamine and a dicarboxylic acid as a main raw material. Typical examples of the raw material of the (a) polyamide resin include: amino acids such as 6-aminocaproic acid, 11-aminoundecanoic acid, 12-aminododecanoic acid and para-aminomethylbenzoic acid; lactams such as ε-caprolactam and ω-laurolactam; aliphatic diamines such as tetramethylenediamine, pentamethylenediamine, hexamethylenediamine, 2-methylpentamethylenediamine, nonamethylenediamine, decamethylenediamine, undecamethylenediamine, dodecamethylenediamine, 2,2,4-/2,4,4-trimethylhexamethylenediamine, 5-methylnonamethylenediamine and 2-methyloctamethylenediamine; aromatic diamines such as meta-xylenediamine and para-xylenediamine; alicyclic diamines such as 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine and aminoethylpiperazine; aliphatic dicarboxylic acids such as adipic acid, suberic acid, azelaic acid, sebacic acid and dodecanedioic acid; aromatic dicarboxylic acids such as terephthalic acid, isophthalic acid, 2-chloroterephthalic acid, 2-methylterephthalic acid, 5-methylisophthalic acid, sodium 5-sulfoisophthalate, 2, 6-naphthalenedicarboxylic acid, hexahydroterephthalic acid and hexahydroisophthalic acid; and alicyclic dicarboxylic acids such as 1,4-cylohexanedicarboxylic acid, 1,3-cyclohexanedicarboxylic acid, 1,2-cyclohexanedicarboxylic acid and 1,3-cyclopentanedicarboxylic acid. Two or more different types of polyamide homopolymers or polyamide copolymers derived from these raw materials may be mixed to be used as the raw material of the (a) polyamide resin.

Concrete examples of the polyamide resin include polycaproamide (nylon 6), poly(hexamethylene adipamide) (nylon 66), poly(tetramethylene adipamide) (nylon 46), poly(tetramethylene sebacamide) (nylon 410), poly(pentamethylene adipamide) (nylon 56), poly(pentamethylene sebacamide) (nylon 510), poly(hexamethylene sebacamide) (nylon 610), poly(hexamethylene dodecanamide) (nylon 612), poly(decamethylene adipamide) (nylon 106), poly(decamethylene sebacamide) (nylon 1010), poly(decamethylene dodecanamide) (nylon 1012), polyundecaneamide (nylon 11), polydodecaneamide (nylon 12), polycaproamide/poly(hexamethylene adipamide) copolymer (nylon 6/66), polycaproamide/poly(hexamethylene terephthalamide) copolymer (nylon 6/6T), poly(hexamethylene adipamide)/poly(hexamethylene terephthalamide) copolymer (nylon 66/6T), poly(hexamethylene adipamide)/poly(hexamethylene isophthalamide) copolymer (nylon 66/6I), poly(hexamethylene terephthalamide)/poly(hexamethylene isophthalamide) copolymer (nylon 6T/6I), poly(hexamethylene terephthalamide)/polyundecaneamide copolymer (nylon 6T/11), poly(hexamethylene terephthalamide)/polydodecaneamide copolymer (nylon 6T/12), poly(hexamethylene adipamide)/poly(hexamethylene terephthalamide)/poly(hexamethylene isophthalamide) copolymer (nylon 66/6T/6I), poly(xylylene adipamide) (nylon XD6), poly(xylylene sebacamide) (nylon XD10), poly(hexamethylene terephthalamide)/poly(pentamethylene terephthalamide) copolymer (nylon 6T/5T), poly(hexamethylene terephthalamide)/poly(2-methylpentamethylene terephthalamide) copolymer (nylon 6T/M5T), poly(pentamethylene terephthalamide)/poly(decamethylene terephthalamide) copolymer (nylon 5T/10T), poly(nonamethylene terephthalamide) (nylon 9T), poly(decamethylene terephthalamide) (nylon 10T) and poly(dodecamethylene terephthalamide) (nylon 12T). Concrete examples of the polyamide resin also include mixtures and copolymers thereof. In the above description, the symbol "/" represents copolymerization. The same applies to the description below.

The especially preferable polyamide resin is a polyamide resin having the melting point of 240° C. to 330° C. The polyamide resin having the melting point of 240° C. to 330° C. has excellent heat resistance and strength. The polyamide resin having the melting point of not lower than 240° C. can be melt-kneaded in a state of high resin pressure under a high temperature condition. The polyamide resin having the melting point of not lower than 240° C. has the enhanced reactivity with the (b) amino group- or hydroxyl group-containing aliphatic compound, with the (c) compound containing reactive functional group with amino group or hydroxyl group and with the (g) compound and/or its condensate as described later. The polyamide resin composition including the polyamide resin having the melting point of not lower than 240° C. accordingly has the further improved heat aging resistance, dimensional accuracy, chemical resistance and creep resistance. The melting point of the polyamide resin is more preferably not lower than 250° C.

Using the polyamide resin having the melting point of not higher than 330° C., on the other hand, controls the melt-kneading temperature to an adequate level and suppresses decomposition of the polyamide resin. This further improves the heat aging resistance, the retention stability, the dimensional accuracy, the chemical resistance and the creep resistance of a molded product produced from the polyamide resin composition. The melting point of the polyamide resin is measured by a differential scanning calorimeter and is defined as temperature of an endothermic peak appearing when the temperature of the polyamide resin is decreased from the molten state to 30° C. at a temperature decrease rate of 20° C./minute and is subsequently increased to the melting point+40° C. at a temperature rise rate of 20° C./minute in an inert gas atmosphere. When two or more endothermic peaks are detected, the temperature of an endothermic peak having the maximum peak intensity is defined as the melting point.

Examples of the polyamide resin having the melting point of 240° C. to 330° C. include nylon 66, nylon 46, nylon 410, nylon 56, copolymers having the hexamethylene terephthalamide unit such as nylon 6T/66, nylon 6T/6I, nylon 6T/12, nylon 6T/5T, nylon 6T/M5T and nylon 6T/6, and nylon 5T/10T, nylon 9T, nylon 10T and nylon 12T.

It is practically preferable to mix two or more different types of these polyamide resins according to the required properties such as heat aging resistance, retention stability, dimensional accuracy, chemical resistance and creep resistance. It is preferable to mix nylon 6, nylon 11 and/or nylon 12 with the polyamide resin having the melting point of 240° C. to 330° C. This further improves the heat aging resistance of the molded product. The total mixing amount of nylon 6, nylon 11 and nylon 12 is preferably 5 to 55 parts by weight relative to 100 parts by weight of the polyamide resin having the melting point of 240° C. to 330° C.

The degree of polymerization of the polyamide resin is not specifically limited, but the relative viscosity measured at 25° C. in a 98% concentrated sulfuric acid solution having the resin concentration of 0.01 g/ml is preferably 1.5 to 5.0. The relative viscosity of not lower than 1.5 further improves the abrasion resistance, the fatigue resistance, the heat aging resistance and the chemical resistance of the obtained molded product. The relative viscosity is more preferably not lower than 2.0. The relative viscosity of not higher than 5.0, on the other hand, has excellent flowability and accordingly the excellent molding processability.

The polyamide resin composition may include the (b) amino group- or hydroxyl group-containing aliphatic compound. The carboxyl terminal group of the (a) polyamide resin is expected to have dehydration condensation reaction with the amino group or the hydroxyl group in the (b) amino group- or hydroxyl group-containing aliphatic compound, so that the (b) amino group- or hydroxyl group-containing aliphatic compound has excellent compatibility with the polyamide resin.

The (b) amino group- or hydroxyl group-containing aliphatic compound denotes an aliphatic compound having three or more amino groups or three or more hydroxyl groups per molecule. The aliphatic compound having three or more amino groups or three or more hydroxyl groups per molecule has excellent compatibility with the (a) polyamide resin and improves the heat aging resistance, the surface appearance, the dimensional accuracy, the chemical resistance and the creep resistance of the obtained molded product. The number of amino groups or the number of hydroxyl groups per molecule is preferably not less than four and is more preferably not less than six, each. The aliphatic compound having three or more amino groups or three or more hydroxyl groups per molecule has the lower steric hindrance than a corresponding aromatic compound or alicyclic compound and has excellent compatibility with the (a) polyamide resin. This is expected to improve the heat aging resistance, the surface appearance, the dimensional accuracy, the chemical resistance and the creep resistance of the obtained molded product.

A method employed to determine the number of amino groups or the number of hydroxyl groups per molecule with regard to a low molecular-weight compound may identify the structural formula of the compound by a general analysis method (for example, combination of NMR, FT-IR, GC-MS and the like) and determine the number from the structural formula. With regard to a polymer, on the other hand, the number of amino groups or hydroxyl groups may be determined as an average number of amino groups or hydroxyl groups=$(a/100) \times b/c$, where a % by weight denotes the ratio of an amino group- or hydroxyl group-containing monomer included in the polymer, b denotes the number-average molecular weight of the polymer and c denotes the gram equivalent of the amino group- or hydroxyl group-containing monomer (molecular weight of the monomer/valence of amino group or hydroxyl group).

When the functional group of the (b) amino group- or hydroxyl group-containing aliphatic compound is amino group (hereinafter this type of amino group- or hydroxyl group-containing aliphatic compound is called amino group-containing aliphatic compound), the amino group-containing aliphatic compound may be a low molecular-weight compound or may be a polymer. Concrete examples of the amino group-containing aliphatic compound include compounds having three amino groups such as 1,2,3-triaminopropane, 1,2,3-triamino-2-methylpropane and 1,2,4-triaminobutane; compounds having four amino groups such as 1,1,2,3-tetraaminopropane, 1,2,3-triamino-2-methylaminopropane and 1,2,3,4-tetraaminobutane and their isomers; compounds having five amino groups such as 3,6,9-triazaundecane-1,11-diamine; compounds having six amino groups such as 3,6,9,12-tetraazatetradecane-1,14-diamine, 1, 1,2,2,3,3-hexaaminopropane, 1,1,2,3,3-pentamino-2-methylaminopropane and 1,1,2,2,3,4-hexaaminobutane and their isomers; and polyethyleneimine obtained by polymerization of ethyleneimine. The amino group-containing aliphatic compound may also be, for example, (i) a compound obtained by introducing alkylene oxide unit into any of the above compounds having amino groups; and (ii) a compound obtained by reaction of an alkylene oxide with a compound having three or more hydroxyl groups per molecule such as trimethylolpropane, pentaerythritol or dipentaerythritol and/or a compound having hydroxyl group methyl-esterified and subsequent amination of the terminal group of the reaction product.

The molecular weight of the amino group-containing aliphatic compound is not specifically limited but is preferably 50 to 10000. The amino group-containing aliphatic compound having the molecular weight of not less than 50 is unlikely to be volatilized during melt-kneading and accordingly has excellent workability. The molecular weight of the amino group-containing aliphatic compound is preferably not less than 150 and is more preferably not less than 200. The amino group-containing aliphatic compound having the molecular weight of not greater than 10000, on the other hand, provides the higher compatibility with the (a) polyamide resin and thus ensures the more significant advantageous desired effects. The molecular weight of the amino group-containing aliphatic compound is preferably not greater than 6000, is more preferably not greater than 4000 and is furthermore preferably not greater than 800.

The molecular weight of the amino group-containing aliphatic compound may be determined from the structural formula of the compound that is identified by a general analysis method (for example, combination of NMR, FT-IR, GC-MS and the like). When the amino group-containing aliphatic compound is a condensate, the molecular weight of the condensate is weight-average molecular weight. The weight-average molecular weight (Mw) may be determined by gel permeation chromatography (GPC). A procedure of measurement by GPC uses a solvent in which the compound is dissolved, for example, hexafluoroisopropanol, as the mobile phase and poly(methyl methacrylate) (PMMA) as the standard substance. The column used is selected according to the solvent. For example, when hexafluoroisopropanol is used as the solvent, the column used may be "shodex GPC HPIP-806M" manufactured by Shimadzu GLC Ltd. The detector used for measurement may be a differential refractometer.

The amine value of the amino group-containing aliphatic compound is preferably 100 to 2000 mg KOH/g, in terms of the compatibility with the (a) polyamide resin. The amine value of the amino group-containing aliphatic compound of not less than 100 mg KOH/g readily ensures the sufficient reaction volume between the (a) polyamide resin and the amino group-containing aliphatic compound and thereby further improves the heat aging resistance, the surface appearance, the dimensional accuracy, the chemical resistance and the creep resistance of the obtained molded product. The amine value of the amino group-containing aliphatic compound is more preferably not less than 200 mg KOH/g.

The amine value of the amino group-containing aliphatic compound of not greater than 2000 mg KOH/g, on the other hand, adequately enhances the reactivity of the amino group-containing aliphatic compound with the (a) polyamide resin and thereby further improves the heat aging resistance, the surface appearance, the dimensional accuracy, the chemical resistance and the creep resistance of the obtained molded product. Additionally, the amine value of the amino group-containing aliphatic compound of not greater than 2000 mg KOH/g suppresses gelation of the polyamide resin composition by the excessive reaction. The amine value of the amino group-containing aliphatic compound is more preferably not greater than 1600 mg KOH/g. The amine value may be determined by neutralization titration of the compound dissolved in ethanol with a hydrochloric ethanolic solution.

The degree of branching of the amino group-containing aliphatic compound is not specifically limited but is preferably 0.05 to 0.70. The degree of branching is a numerical value indicating the degree of branching in the compound. A linear chain compound has the degree of branching of 0, and a completely branched dendrimer has the degree of branching of 1. The higher degree of branching enables the higher degree of crosslinking structure to be introduced into the polyamide resin composition and accordingly improves the mechanical properties of the molded product. The degree of branching of not lower than 0.05 ensures sufficient formation of the crosslinking structure in the polyamide resin composition and further improves the heat aging resistance, the dimensional accuracy, the chemical resistance and the creep resistance of the molded product. The degree of branching is preferably not lower than 0.10. The degree of branching of not higher than 0.70, on the other hand, provides the adequate crosslinking structure in the polyamide resin composition and further improves the heat aging resistance, the dimensional accuracy, the chemical resistance and the creep resistance of the molded product. The degree of branching is preferably not higher than 0.35.

The degree of branching is defined by Equation (2):

$$\text{degree of branching} = (D+T)/(D+T+L) \quad (2)$$

In Equation (2), D represents the number of dendritic units, L represents the number of linear units, and T represents the number of terminal units. These values D, T and L may be calculated from integrated values of peak shifts measured by $^{13}$C-NMR. D is derived from tertiary or quaternary carbon atoms; T is derived from methyl group among primary carbon atoms; and L is derived from primary or secondary carbon atoms other than T.

When the functional group of the (b) amino group- or hydroxyl group-containing aliphatic compound is hydroxyl group (hereinafter this type of amino group- or hydroxyl group-containing aliphatic compound is called hydroxyl group-containing aliphatic compound), the hydroxyl group-containing aliphatic compound may be a low molecular-weight compound or may be a polymer. Concrete examples of the hydroxyl group-containing aliphatic compound include 1,2,4-butanetriol, 1,2,5-pentanetriol, 1,2,6-hexanetriol, 1,2,3,6-hexanetetrol, glycerol, diglycerol, triglycerol, tetraglycerol, pentaglycerol, hexaglycerol, ditrimethylolpropane, tritrimethylolpropane, pentaerythritol, dipentaerythritol, tripentaerythritol, methylglucoside, sorbitol, glucose, mannitol, sucrose, 1,3,5-trihydroxybenzene, 1,2,4-trihydroxybenzene, ethylene-vinyl alcohol copolymer, polyvinyl alcohol, triethanolamine, trimethylolethane, trimethylolpropane, 2-methylpropane triol, tris(hydroxymethyl)aminomethane and 2-methyl-1,2,4-butanetriol. The hydroxyl group-containing aliphatic compound may be a hydroxyl group-containing compound having the repeating structural unit, which includes, for example, hydroxyl group-containing compounds having the repeating structural unit including an ester bond, an amide bond, an ether bond, a methylene bond, a vinyl bond, an imine bond, a siloxane bond, an urethane bond, a thioether bond, a silicon-silicon bond, a carbonate bond, a sulfonyl bond or an imide bond. The hydroxyl group-containing aliphatic compound may have the repeating structural unit including two or more different types of these bonds. The hydroxyl group-containing aliphatic compound is more preferably a hydroxyl group-containing compound having the repeating structural unit including an ester bond, an ether bond and/or an amide bond.

The hydroxyl group-containing compound having the repeating structural unit including an ester bond may be obtained, for example, by reaction of a compound having one or more hydroxyl groups and a monocarboxylic acid having a saturated carbon atom adjacent to a carboxyl group, substitution of all hydrogen atoms on the carbon atom and two or more hydroxyl groups.

The hydroxyl group-containing compound having the repeating structural unit including an ether bond may be obtained, for example, by ring-opening polymerization of a compound having one or more hydroxyl groups and a cyclic ether compound having one or more hydroxyl groups. The hydroxyl group-containing compound having the repeating structural unit including an ester bond and an amide bond may be obtained, for example, by polycondensation reaction of an amino diol and a cyclic acid anhydride. The hydroxyl group-containing compound having the repeating structural unit including an amino group-including ether bond may be obtained, for example, by intermolecular condensation of a trialkanolamine. The hydroxyl group-containing compound having the repeating structural unit including a carbonate bond may be obtained, for example, by polycondensation reaction using an aryl carbonate derivative of trisphenol.

Pentaerythritol, dipentaerythritol and tripentaerythritol are preferable among these hydroxyl group-containing aliphatic compounds.

The molecular weight of the hydroxyl group-containing aliphatic compound is not specifically limited but is preferably 50 to 10000. The hydroxyl group-containing aliphatic compound having the molecular weight of not less than 50 is unlikely to be volatilized during melt-kneading and accordingly has excellent workability. The molecular weight of the hydroxyl group-containing aliphatic compound is preferably not less than 150 and is more preferably not less than 200. The hydroxyl group-containing aliphatic compound having the molecular weight of not greater than 10000, on the other hand, provides the higher compatibility of the hydroxyl group-containing aliphatic compound with the (a) polyamide resin and thus ensures the more significant advantageous effects. The molecular weight of the hydroxyl group-containing aliphatic compound is preferably not greater than 6000, is more preferably not greater than 4000 and is furthermore preferably not greater than 800.

The molecular weight of the hydroxyl group-containing aliphatic compound may be determined from the structural formula of the compound that is identified by a general analysis method (for example, combination of NMR, FT-IR, GC-MS and the like). When the hydroxyl group-containing aliphatic compound is a compound obtained by condensation reaction, the weight-average molecular weight is determined by gel permeation chromatography (GPC) and is used as the molecular weight. A procedure of measurement of the weight-average molecular weight by GPC uses a solvent in which the compound is dissolved, for example, hexafluoroisopropanol, as the mobile phase and poly(methyl methacrylate) (PMMA) as the standard substance. The column used is selected according to the solvent. For example, when hexafluoroisopropanol is used as the solvent, the column used may be "shodex GPC HPIP-806M" manufactured by Shimadzu GLC Ltd. The detector used for measurement of the weight-average molecular weight may be a differential refractometer.

The hydroxyl value of the hydroxyl group-containing aliphatic compound is preferably 100 to 2000 mg KOH/g, in terms of the compatibility with the (a) polyamide resin. The hydroxyl value of the hydroxyl group-containing aliphatic compound of not less than 100 mg KOH/g readily ensures the sufficient reaction volume between the (a) polyamide resin and the hydroxyl group-containing aliphatic compound and thereby further improves the heat aging resistance, the surface appearance, the dimensional accuracy, the chemical resistance and the creep resistance of the obtained molded product. The hydroxyl value of the hydroxyl group-containing aliphatic compound is more preferably not less than 300 mg KOH/g.

The hydroxyl value of the hydroxyl group-containing aliphatic compound of not greater than 2000 mg KOH/g, on the other hand, adequately enhances the reactivity of the hydroxyl group-containing aliphatic compound with the (a) polyamide resin and further improves the heat aging resistance, the surface appearance, the dimensional accuracy, the chemical resistance and the creep resistance of the obtained molded product. Additionally, the hydroxyl value of the hydroxyl group-containing aliphatic compound of not greater than 2000 mg KOH/g suppresses gelation by the excessive reaction. The hydroxyl value of the hydroxyl group-containing aliphatic compound is more preferably not greater than 1800 mg KOH/g. The hydroxyl value may be determined by acetylation of the compound with a mixed solution of acetic anhydride and anhydrous pyridine and subsequent titration of the acetylated compound with a potassium hydroxide ethanolic solution.

The degree of branching of the hydroxyl group-containing aliphatic compound is not specifically limited but is preferably 0.05 to 0.35. The degree of branching of not lower than 0.05 ensures sufficient formation of the crosslinking structure in the polyamide resin composition and further improves the heat aging resistance, the dimensional accuracy, the chemical resistance and the creep resistance of the molded product. The degree of branching is preferably not lower than 0.10. The degree of branching of not higher than 0.35, on the other hand, provides the adequate crosslinking structure in the polyamide resin composition and further improves the heat aging resistance, the dimensional accuracy, the chemical resistance and the creep resistance of the molded product. The degree of branching is preferably not higher than 0.31.

The degree of branching is defined by Equation (2) above:

$$\text{degree of branching} = (D+T)/(D+T+L) \quad (2)$$

The (b) amino group- or hydroxyl group-containing aliphatic compound may have another functional group in addition to amino group or hydroxyl group. Examples of another functional group include aldehyde group, sulfo group, glycidyl group, isocyanate group, carbodiimide group, oxazoline group, oxazine group, ester group, amide group, silanol group and silyl ether group.

The content of the (b) amino group- or hydroxyl group-containing aliphatic compound is preferably 0.1 to 10 parts by weight relative to 100 parts by weight of the (a) polyamide resin. The content of the (b) amino group- or hydroxyl group-containing aliphatic compound of not less than 0.1 parts by weight improves the heat aging resistance, the dimensional accuracy, the chemical resistance and the creep resistance of the molded product. The content of the (b) amino group- or hydroxyl group-containing aliphatic compound is more preferably not less than 0.5 parts by weight and is furthermore preferably not less than 2.0 parts by weight relative to 100 parts by weight of the (a) polyamide resin.

The content of the (b) amino group- or hydroxyl group-containing aliphatic compound of not greater than 10 parts by weight, on the other hand, suppresses the (b) amino group- or hydroxyl group-containing aliphatic compound from being bled out on the surface layer of the molded product and thereby improves the surface appearance. The content of the (b) amino group- or hydroxyl group-containing aliphatic compound of not greater than 10 parts by weight also suppresses plasticization and decomposition of the polyamide resin and thereby improves the heat aging resistance, the retention stability, the dimensional accuracy, the chemical resistance and the creep resistance of the molded product. The content of the (b) amino group- or hydroxyl group-containing aliphatic compound is more preferably not greater than 7.5 parts by weight and is furthermore preferably not greater than 6.0 parts by weight relative to 100 parts by weight of the (a) polyamide resin.

The polyamide resin composition according to the first example includes the (c) compound containing reactive functional group with amino group or hydroxyl group. The functional group in the (c) compound containing reactive functional group with amino group or hydroxyl group reacts not only with the amino group or the hydroxyl group of the (b) amino group- or hydroxyl group-containing aliphatic compound but with the amino terminal group and/or the carboxyl terminal group of the (a) polyamide resin.

Additionally, the reactivity of the (a) polyamide resin with the (c) compound containing reactive functional group with amino group or hydroxyl group and the reactivity of the (b) amino group- or hydroxyl group-containing aliphatic compound with the (c) compound containing reactive functional group with amino group or hydroxyl group are higher than the reactivity of the (a) polyamide resin with the (b) amino group- or hydroxyl group-containing aliphatic compound. Accordingly, the (c) compound containing reactive functional group with amino group or hydroxyl group serves as a binder between the (a) polyamide resin and the (b) amino group- or hydroxyl group-containing aliphatic compound and has the advantageous effect of enhancing the compatibility between the (a) polyamide resin and the (b) amino group- or hydroxyl group-containing aliphatic compound.

The (c) compound containing reactive functional group with amino group or hydroxyl group has more than one functional group per molecule that is reactive with the amino group or the hydroxyl group of the (b) amino group- or hydroxyl group-containing aliphatic compound.

When the (c) compound containing reactive functional group with amino group or hydroxyl group has more than one functional group that is reactive with the amino group or the hydroxyl group of the (b) amino group- or hydroxyl group-containing aliphatic compound, the (c) compound containing reactive functional group with amino group or hydroxyl group sufficiently serves as the binder between the (a) polyamide resin and the (b) amino group- or hydroxyl group-containing aliphatic compound and enhances the compatibility between the (a) polyamide resin and the (b) amino group- or hydroxyl group-containing aliphatic compound. This suppresses the (b) amino group- or hydroxyl group-containing aliphatic compound from being bled out on the surface layer of the molded product and improves the surface appearance. This also improves the heat aging resistance, the dimensional accuracy, the chemical resistance and the creep resistance of the obtained molded product. The (c) compound containing reactive functional group with amino group or hydroxyl group preferably has two or more functional groups, more preferably has four or more functional groups and furthermore preferably has six or more functional groups per molecule.

With regard to a low molecular-weight compound, the number of functional groups per molecule may be determined from the structural formula of the compound identified by a general analysis method (for example, combination of NMR, FT-IR, GC-MS and the like). With regard to a polymer, the number of functional groups per molecule may be determined as an average number of functional groups= $(a/100) \times b/c$, where a % by weight denotes the ratio of a functional group-containing monomer included in the polymer, b denotes the number-average molecular weight of the polymer and c denotes the gram equivalent of the functional group-containing monomer (molecular weight of the monomer/valence of functional group).

Concrete examples of the functional group that is reactive with the amino group or the hydroxyl group of the (b) amino group- or hydroxyl group-containing aliphatic compound include epoxy group, carbodiimide group, isocyanate group and acid anhydride groups. The epoxy group or the carbodiimide group is preferable as the functional group that is reactive with the amino group or the hydroxyl group of the (b) amino group- or hydroxyl group-containing aliphatic compound, since they provide the more significant advantageous effects.

The (c) compound containing reactive functional group with amino group or hydroxyl group may be a low molecular-weight compound or may be a polymer. When the functional group that is reactive with the amino group or the hydroxyl group of the (b) amino group- or hydroxyl group-containing aliphatic compound is an epoxy group, concrete examples of the (c) compound containing reactive functional group with amino group or hydroxyl group include epichlorohydrin, glycidyl ether-type epoxy resins, glycidyl ester-type epoxy resins, glycidyl amine-type epoxy resins, alicyclic epoxy resins, heterocyclic epoxy resins and glycidyl group-containing vinyl polymers. An epoxy resin mixture including at least one or more different types of the above epoxy resins may be used as the (c) compound containing reactive functional group with amino group or hydroxyl group.

The glycidyl ether-type epoxy resin may be, for example, a product from epichlorohydrin and bisphenol A, a product from epichlorohydrin and bisphenol F, a phenol novolac-type epoxy resin produced by reaction of epichlorohydrin with novolac resin, ortho-cresol novolac-type epoxy resin, a brominated epoxy resin derived from epichlorohydrin and tetrabromobisphenol A, glycerol triglycidyl ether, trimethylolpropane triglycidyl ether or pentaerythritol polyglycidyl ether.

The glycidyl amine-type epoxy resin may be, for example, an epoxy resin produced from epichlorohydrin and aniline, diaminodiphenylmethane, p-aminophenol, meta-xylenediamine or 1,3-bis(aminomethyl)cyclohexane, tetraglycidyl aminodiphenylmethane, triglycidyl para-aminophenol, triglycidyl meta-aminophenol, tetraglycidyl meta-xylenediamine, tetraglycidyl bisaminomethylcyclohexane, triglycidyl cyanurate or triglycidyl isocyanurate.

The glycidyl ester-type epoxy resin may be, for example, an epoxy resin produced from epichlorohydrin and phthalic acid, tetrahydrophthalic acid, p-oxybenzoic acid or dimer acid, triglycidyl trimesate, triglycidyl trimellitate, or tetraglycidyl pyromellitate.

The alicyclic epoxy resin may be a compound having cyclohexene oxide group, tricyclodecene oxide group or cyclopentene oxide group. The heterocyclic epoxy resin may be, for example, an epoxy resin produced from epichlorohydrin and hydantoin or isocyanuric acid.

The glycidyl group-containing vinyl polymer may be produced by radical polymerization of a raw material monomer forming glycidyl group-containing vinyl unit. Concrete examples of the raw material monomer forming glycidyl group-containing vinyl unit include glycidyl esters of unsaturated monocarboxylic acids such as glycidyl (meth) acrylate and glycidyl p-styrylcarboxylate, monoglycidyl esters and polyglycidyl esters of unsaturated polycarboxylic acids such as maleic acid and itaconic acid, and unsaturated glycidyl ethers such as allyl glycidyl ether, 2-methylallyl glycidyl ether and styrene-4-glycidyl ether.

Commercial products of the (c) compound containing reactive functional group with amino group or hydroxyl group in which the functional group is an epoxy group or a glycidyl group include, for example, polyglycidyl ether compounds that are low molecular-weight multifunctional epoxy compounds (for example, "SR-TMP" manufactured by Sakamoto Yakuhin Kogyo Co., Ltd., and "DENACOL (registered trademark) EX-521" manufactured by Nagase ChemteX Corporation); polyethylene-based multifunctional epoxy compounds (for example, "BONDFAST (registered trademark) E" manufactured by Sumitomo Chemical Company, Limited), acrylic-based multifunctional epoxy compounds (for example, "RESEDA (registered trademark) GP-301" manufactured by TOAGOSEI CO., LTD., "ARUFON (registered trademark) UG-4000" manufactured by TOAGOSEI CO., LTD., and "METABLEN (registered trademark) KP-7653" manufactured by MITSUBISHI RAYON CO., LTD.); acrylic-styrene copolymer-based multifunctional epoxy compounds (for example, "JONCRYL (registered trademark") ADR-4368" manufactured by BASF and "ARUFON (registered trademark) UG-4040" manufactured by TOAGOSEI CO., LTD.); silicone-acrylic copolymer-based multifunctional epoxy compounds (for example, "METABLEN (registered trademark) S–2200"); polyethylene glycol-based multifunctional epoxy compounds (for example, "EPIOL (registered trademark) E-1000" manufactured by NOF CORPORATION); bisphenol A-type epoxy resins (for example, "JER (registered trademark) 1004" manufactured by Mitsubishi Chemical Corporation); and phenol novolac-type modified epoxy resin (for example, "EPPN (registered trademark) 201" manufactured by Nippon Kayaku Co., Ltd.)

Concrete examples of the (c) compound containing reactive functional group with amino group or hydroxyl group in which the functional group is a carbodiimide group include dicarbodiimides such as N,N'-diisopropylcarbodiimide, N,N'-dicyclohexylcarbodiimide and N,N'-di-2,6-diisopropylphenylcrbodiimide; and polycarbodiimides such as poly(1,6-hexamethylenecarbodiimide), poly(4,4'-methylenebiscyclohexylcarbodiimide), poly(1,3-cyclohexylenecarbodiimide), poly(1,4-cyclohexylenecarbodiimide), poly(4,4'-dicyclohexylmethanecarbodiimide), poly(4,4'-diphenylmethanecarbodiimide), poly(3,3'-dimethyl-4,4'-diphenylmethanecarbodiimide), poly(naphthalenecarbodiimide), poly(p-phenylenecarbodiimide), poly(m-phenylenecarbodiimide), poly(tolylcarbodiimide), poly(diisopropylcarbodiimide), poly(methyl-diisopropylphenylenecarbodiimide), poly(1,3,5-triisopropylbenzene)polycarbodiimide, poly(1,3,5-triisopropylbenzene and 1,5-diisopropylbenzene)polycarbodiimide, poly(triethylphenylenecarbodiimide) and poly (triisopropylphenylenecarbodiimide).

Commercial products of the (c) compound containing reactive functional group with amino group or hydroxyl group in which the functional group is a carbodiimide group include, for example, "CARBODILITE (registered trademark)" manufactured by Nisshinbo Chemical Inc. and "STABAXOL (registered trademark)" manufactured by Rhein Chemie).

Concrete examples of the (c) compound containing reactive functional group with amino group or hydroxyl group in which the functional group is an isocyanate group include diisocyanates such as 2,4-tolylene diisocyanate, 2,6-tolyelene diisocyanate, isophorone diisocyanate, 1,6-hexamethylene diisocyanate, 1,3-trimethylene diisocyanate, 1,4-tetramethylene diisocyanate, 2,2,4-trimethylhexamethylene diisocyanate, 2,4,4-trimethylhexamethylene diisocyanate, 1,9-nonamethylene diisocyanate, 1,10-decamethylene diisocyanate, 1,4-cyclohexane diisocyanate, 2,2'-diethyl ether diisocyanate, diphenylmethane-4,4'-diisocyanate, o-xylene diisocyanate, m-xylene diisocyanate, p-xylene diisocyanate, methylene-bis(cyclohexylisocyanate), cyclohexane-1,3,-dimethylene diisocyanate, cyclohexane-1,4-dimethylene diisocyanate, 1,5-naphthalene diisocyanate, p-phenylene diisocyanate, 3,3'-methyleneditolylene-4,4'-diisocyanate, 3,3'-dichloro-4,4'-diisocyanate biphenyl, 4,4'-diphenyl ether diisocyanate, tetrachlorophenylene diisocyanate, norbornane diisocyanate, hydrogenated 1,3-xylylene diisocyanate and hydrogenated 1,4-xylylene diisocyanate; and triisocyanates such as nonane triisocyanate (for example, 4-isocyanatomethyl-1,8-octane diisocyanate (TIN)), decane triisocyanate, undecane triisocyanate and dodecane triisocyanate.

Commercial products of the (c) compound containing reactive functional group with amino group or hydroxyl group in which the functional group is an isocyanate group include, for example, monomeric MDI (MDI: methylene-bis(4,1-phenylene) diisocyanate), polymeric MDI (for example, "Millionate MR-200" manufactured by Nippon Polyurethane Industry Co., Ltd. (currently Tosoh Corporation) and "LUPRANATE (registered trademark) M20S" manufactured by BASF), and aromatic polyisocyanates (for example, "Millionate MT" manufactured by Nippon Polyurethane Industry Co., Ltd. (currently Tosoh Corporation).

Concrete examples of the (c) compound containing reactive functional group with amino group or hydroxyl group in which the functional group is an acid anhydride group include carboxylic dianhydrides having two or more acid anhydride groups such as pyromellitic anhydride, benzophenonetetracarboxylic dianhydride, cyclopentanetetracarboxylic dianhydride and diphenylsulfonetetracarboxylic dianhydride.

Commercial products of the (c) compound containing reactive functional group with amino group or hydroxyl group in which the functional group is an acid anhydride group include, for example, ethylene glycol bis-anhydrous trimellitate ("RIKACID (registered trademark)" manufactured by New Japan Chemical Co., Ltd.)

The (c) compound containing reactive functional group with amino group or hydroxyl group in which the functional group is an acid anhydride group may be an olefin polymer modified with a carboxylic anhydride. Available examples of the acid anhydride used for modifying the olefin polymer include, other than the above carboxylic dianhydrides, maleic anhydride, itaconic anhydride, glutaconic anhydride, citraconic anhydride, aconitic anhydride, trimellitic anhydride, phthalic anhydride and succinic anhydride. The olefin polymer may be, for example, homopolymer or copolymer of α-olefin, diene elastomer or polyolefin copolymer.

Concrete examples of the homopolymer or copolymer of α-olefin include homopolymers such as polyethylene, polypropylene, polybutene-1, polypentene-1 and polymethylpentene; and polyolefins obtained by radical polymerization of at least one of α-olefins such as ethylene, propylene, butene-1, pentene-1, 4-methylpentene-1 and isobutylene and unconjugated dienes such as 1,4-hexadiene, dicyclopentadiene, 2,5-norbornadiene, 5-ethylidene norbornene, 5-ethyl-2,5-norbornadiene and 5-(1'-propenyl)-2-norbornene.

The diene elastomer may be an A-B type or A-B-A'-type block copolymer elastomer of a vinyl aromatic hydrocarbon and a conjugated diene. The terminal blocks A and A' may be identical or different and may be, for example, thermoplastic homopolymers or copolymers derived from a vinyl aromatic hydrocarbon having a monocyclic or polycyclic aromatic unit. Available examples of the vinyl aromatic hydrocarbon include styrene, α-methylstyrene, vinyltoluene, vinylxylene, ethylvinylxylene and vinylnaphthalene. Two or more different types of the vinyl aromatic hydrocarbons may be used. The middle block B is made of a conjugated diene hydrocarbon, for example, 1,3-butadiene, 2,3-dimethylbutadiene, isoprene, 1,3-pentadiene or a polymer derived from any mixture of these conjugated diene hydrocarbons. The middle block B of the above block copolymer may be treated by hydrogenation treatment.

The polyolefin copolymer may be, for example, ethylene/propylene copolymer, ethylene/butene-1 copolymer, ethylene/propylene/dicyclopentadiene copolymer, ethylene/propylene/5-ethylidene-2-norbornene copolymer, non-hydrogenated and hydrogenated polybutadiene, non-hydrogenated or hydrogenated styrene/isoprene/styrene triblock copolymer, or non-hydrogenated or hydrogenated styrene/butadiene/styrene triblock copolymer.

The method employed to modify the acid anhydride group to the olefin polymer is not specifically limited but may be, for example, (i) copolymerization of the acid anhydride group or (ii) graft interposition into an unmodified polyolefin using a radical initiator.

The molecular weight of the (c) compound containing reactive functional group with amino group or hydroxyl group is preferably 800 to 10000. The (c) compound containing reactive functional group with amino group or hydroxyl group that has the molecular weight of not less than 800 is unlikely to be volatilized during melt-kneading and accordingly has excellent workability. Additionally, the molecular weight of the (c) compound containing reactive functional group with amino group or hydroxyl group of not less than 800 enhances the viscosity during melt-kneading. This further enhances the compatibility with the (a) polyamide resin and with the (b) amino group- or hydroxyl group-containing aliphatic compound. This improves the dimensional accuracy, the chemical resistance and the creep resistance of the obtained molded product. Additionally, this reduces the increase rate in concentration of carboxyl group in the polyamide resin composition from the surface of the molded product to a depth of 0.2 mm after heat treatment to be lower than 70%, when an ASTM No. 1 dumbbell of 3.2 mm in thickness produced by injection molding of the polyamide resin composition is processed in the atmosphere by heat treatment at 130° C. for 100 hours or by heat treatment at 190° C. for 9 hours as described later. This accordingly improves the heat aging resistance of the molded product. The molecular weight of the (c) compound containing reactive functional group with amino group or hydroxyl group is more preferably not less than 1000.

The molecular weight of the (c) compound containing reactive functional group with amino group or hydroxyl group of not greater than 10000, on the other hand, provides the adequate viscosity during melt-kneading and thereby ensures the excellent workability. The molecular weight of the (c) compound containing reactive functional group with amino group or hydroxyl group of not greater than 10000 also preferably maintains the high compatibility with the (a) polyamide resin and with the (b) amino group- or hydroxyl group-containing aliphatic compound. The molecular weight of the (c) compound containing reactive functional group with amino group or hydroxyl group is more preferably not greater than 8000.

The (c) compound containing reactive functional group with amino group or hydroxyl group is preferably in a solid form at 25° C. or in a liquid form having the viscosity of not lower than 200 mPa·s at 25° C. This readily provides the viscosity of a desired level during melt-kneading and further enhances the compatibility with the (a) polyamide resin and with the (b) amino group- or hydroxyl group-containing aliphatic compound. This accordingly further improves the heat aging resistance, the dimensional accuracy, the chemical resistance and the creep resistance of the obtained molded product.

The value obtained by dividing the molecular weight of the (c) compound containing reactive functional group with amino group or hydroxyl group by the number of functional groups per molecule serves as an index showing the concentration of the functional group in the (c) compound containing reactive functional group with amino group or hydroxyl group and is preferably 50 to 2000. The smaller value indicates the higher concentration of the functional group. This value of not less than 50 suppresses gelation by the excessive reaction and adequately increases the reactivity with the (a) polyamide resin and with the (b) amino group- or hydroxyl group-containing aliphatic compound. This accordingly further improves the heat aging resistance, the retention stability, the surface appearance, the dimensional accuracy, the chemical resistance and the creep resistance of the obtained molded product. The value obtained by dividing the molecular weight of the (c) compound containing reactive functional group with amino group or hydroxyl group by the number of functional groups per molecule is more preferably not less than 100.

The value obtained by dividing the molecular weight of the (c) compound containing reactive functional group with amino group or hydroxyl group by the number of functional groups per molecule of not greater than 2000, on the other hand, ensures the sufficient reactivity with the (a) polyamide resin and with the (b) amino group- or hydroxyl group-containing aliphatic compound. This accordingly further improves the heat aging resistance, the retention stability, the surface appearance, the dimensional accuracy, the chemical resistance and the creep resistance of the obtained molded product. The value obtained by dividing the molecular weight of the (c) compound containing reactive functional group with amino group or hydroxyl group by the number of functional groups per molecule is more preferably not greater than 1000 and is furthermore preferably not greater than 300.

In the polyamide resin composition according to the first example, the content of the (c) compound containing reactive functional group with amino group or hydroxyl group is preferably 0.001 to 20 parts by weight relative to 100 parts by weight of the (a) polyamide resin. The content of the (c) compound containing reactive functional group with amino group or hydroxyl group of not less than 0.001 parts by weight improves the heat aging resistance, the surface appearance, the dimensional accuracy, the chemical resistance and the creep resistance of the molded product. The content of the (c) compound containing reactive functional group with amino group or hydroxyl group is preferably not less than 0.01 parts by weight and is more preferably not less than 0.1 parts by weight relative to 100 parts by weight of the (a) polyamide resin.

The content of the (c) compound containing reactive functional group with amino group or hydroxyl group of not greater than 20 parts by weight, on the other hand, suppresses gelation and thereby improves the heat aging resistance, the retention stability, the dimensional accuracy, the chemical resistance and the creep resistance of the molded product. The content of the (c) compound containing reactive functional group with amino group or hydroxyl group is preferably not greater than 7 parts by weight, is more preferably not greater than 5 parts by weight and is furthermore preferably not greater than 3 parts by weight relative to 100 parts by weight of the (a) polyamide resin.

In the polyamide resin composition according to the first example, the ratio of the content of the (b) amino group- or hydroxyl group-containing aliphatic compound to the content of the (c) compound containing reactive functional group with amino group or hydroxyl group is preferably not less than 0.30 and less than 10000. The reactivity of the (a) polyamide resin with the (c) compound containing reactive functional group with amino group or hydroxyl group and the reactivity of the (b) amino group- or hydroxyl group-containing aliphatic compound with the (c) compound containing reactive functional group with amino group or hydroxyl group are higher than the reactivity of the (a) polyamide resin with the (b) amino group- or hydroxyl group-containing aliphatic compound. The ratio of the content of the (b) amino group- or hydroxyl group-containing aliphatic compound to the content of the (c) compound containing reactive functional group with amino group or hydroxyl group of not less than 0.30 suppresses gelation by the excessive reaction and improves the dimensional accuracy, the chemical resistance and the creep resistance of the molded product. The ratio of the content of the (b) amino group- or hydroxyl group-containing aliphatic compound to the content of the (c) compound containing reactive functional group with amino group or hydroxyl group of not less than 0.30 also reduces the increase rate in concentration of carboxyl group in the polyamide resin composition from the surface of the molded product to a depth of 0.2 mm after heat treatment to be lower than 70%, when an ASTM No. 1 dumbbell of 3.2 mm in thickness produced by injection molding of the polyamide resin composition is processed in the atmosphere by heat treatment at 130° C. for 100 hours or by heat treatment at 190° C. for 9 hours as described later. This accordingly improves the heat aging resistance of the molded product. It is preferable that the ratio of the content of the (b) amino group- or hydroxyl group-containing aliphatic compound to the content of the (c) compound containing reactive functional group with amino group or hydroxyl group is greater than 1.

The ratio of the content of the (b) amino group- or hydroxyl group-containing aliphatic compound to the content of the (c) compound containing reactive functional group with amino group or hydroxyl group of less than 10000 ensures the adequate presence of the (b) amino group- or hydroxyl group-containing aliphatic compound and the (c) compound containing reactive functional group with amino group or hydroxyl group and thereby improves the heat aging resistance, the retention stability, the surface appearance, the dimensional accuracy, the chemical resistance and the creep resistance of the molded product.

The (b) amino group- or hydroxyl group-containing aliphatic compound has the effect of improving the molding processability such as flowability and the heat aging resistance at 150 to 230° C. The (b) amino group- or hydroxyl group-containing aliphatic compound, however, has a problem of insufficient heat aging resistance at lower than 150° C., which may be attributed to the low compatibility with the (a) polyamide resin. Another problem is that the (b) amino group- or hydroxyl group-containing aliphatic compound is bled out on the surface layer of the molded product. Another problem is that the amino group or the hydroxyl group of the (b) amino group- or hydroxyl group-containing aliphatic compound accelerates hydrolysis of the amide bond of the (a) polyamide resin and results in providing the poor retention stability.

Additionally, another problem is that the (b) amino group- or hydroxyl group-containing aliphatic compound plasticizes the (a) polyamide resin and results in reducing the dimensional accuracy, the chemical resistance and the creep resistance of the obtained molded product. The example, however, uses a specified content of the (c) compound containing reactive functional group with amino group or hydroxyl group with the (a) polyamide resin and the (b) amino group- or hydroxyl group-containing aliphatic compound. The (c) compound containing reactive functional group with amino group or hydroxyl group is expected to serve like a binder of increasing the reactivity of the (a) polyamide resin with the (b) amino group- or hydroxyl group-containing aliphatic compound and to enhance the compatibility between the (a) polyamide resin and the (b) amino group- or hydroxyl group-containing aliphatic compound. This is expected to suppress bleed-out on the surface of the molded product to improve the surface appearance and also satisfy the heat aging resistance at lower than 150° C. Serving the (c) compound containing reactive functional group with amino group or hydroxyl group like the binder is expected to suppress hydrolysis of the amide bond of the (a) polyamide resin by the amino group or the hydroxyl group of the (b) amino group- or hydroxyl group-containing aliphatic compound and improve the retention stability. This is also expected to suppress plasticization of the (a) polyamide resin and thereby improve the dimensional accuracy, the chemical resistance and the creep resistance of the obtained molded product.

The polyamide resin composition preferably includes a reactant of the (b) amino group- or hydroxyl group-containing aliphatic compound and the (c) compound containing reactive functional group with amino group or hydroxyl group to be mixed with the (a) polyamide resin. More specifically, the polyamide resin composition according to the second example preferably includes 0.1 to 20 parts by weight of the (g) compound and/or its condensate relative to 100 parts by weight of the (a) polyamide resin. The (g) compound and/or its condensate denotes a compound and/or its condensate having a structure that includes a hydroxyl group and an epoxy group or a carbodiimide group and is expressed by Formula (1) below.

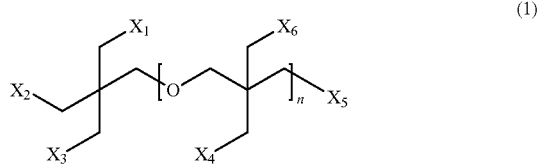

(1)

In Formula (1), $X_1$ to $X_6$ may be identical or may be different and respectively represent OH, $CH_3$ or OR, in which the total number of OH and OR is three or more, R represents an epoxy group-including or carbodiimide group-including organic group, and n is 0 to 20.

Compared to adding a compound having a hydroxyl group but not having an epoxy group or a carbodiimide group and/or its condensate (hereinafter referred to as "polyol"), adding the compound having a hydroxyl group and an epoxy group or a carbodiimide group and/or its condensate increases the number of the functional groups having the high reactivity with the terminal group of the (a) polyamide resin and thus further increases the compatibility with the (a) polyamide resin. This further improves the heat aging resistance, the surface appearance, the dimensional accuracy, the chemical resistance and the creep resistance of the obtained molded product.

In Formula (1), R represents an epoxy group-including organic group or a carbodiimide group-including organic group. The epoxy group-including organic group may be, for example, epoxy group or glycidyl group. The carbodiimide group-including organic group may be, for example, alkyl carbodiimide group, cycloalkyl carbodiimide group or allyl alkyl carbodiimide group.

The (g) compound and/or its condensate has excellent compatibility with the (a) polyamide resin and further improves the heat aging resistance, the surface appearance, the dimensional accuracy, the chemical resistance and the creep resistance of a molded product produced from the polyamide resin composition including the (g) compound and/or its condensate. This may be attributed to the adequate level of branch structure. The degree of branching of the (g) compound and/or its condensate is not specifically limited but is preferably 0.05 to 0.70. The degree of branching is a numerical value indicating the degree of branching in the compound. A linear chain compound has the degree of branching of 0, and a completely branched dendrimer has the degree of branching of 1. The higher degree of branching enables the higher degree of crosslinking structure to be introduced into the polyamide resin composition and accordingly improves the mechanical properties of the molded product. The degree of branching of not lower than 0.05 ensures sufficient formation of the crosslinking structure in the polyamide resin composition and further improves the heat aging resistance, the dimensional accuracy, the retention stability, the chemical resistance and the creep resistance of the molded product. The degree of branching is more preferably not lower than 0.10. The degree of branching of not higher than 0.70, on the other hand, provides the adequate crosslinking structure in the polyamide resin composition and further improves the heat aging resistance, the dimensional accuracy, the retention stability, the chemical resistance and the creep resistance of the molded product. The degree of branching is more preferably not higher than 0.35. The degree of branching is defined by Equation (2) above.

In Formula (1), n is preferable in the range of 0 to 20. The number n of not greater than 20 suppresses plasticization of the (a) polyamide resin and improves the heat aging resistance, the chemical resistance and the creep resistance of the obtained molded product. The number n is more preferably not greater than 4. This further improves the abrasion resistance, the fatigue resistance, the heat aging resistance and the chemical resistance of the obtained molded product. The number n is more preferably not less than 1. This further enhances the molecular mobility of the (g) compound and/or its condensate and further improves the compatibility with the (a) polyamide resin.

The structure of the (g) compound and/or its condensate may be identified by a general analysis method (for example, combination of NMR, FT-IR, GC-MS and the like).

In Formula (1), the total number of OH and OR is preferably not less than 3. This provides the excellent compatibility with the (a) polyamide resin and further improves the heat aging resistance, the dimensional accuracy, the chemical resistance and the creep resistance of the obtained molded product. With regard to a low molecular-weight compound, the total number of OH and OR may be determined from the structural formula of the compound that is identified by a general analysis method (for example, combination of NMR, FT-IR, GC-MS and the like). With regard to a condensate, on the other hand, the number of OH may be determined from the number-average molecular weight and the hydroxyl value of the (g) compound and/or its condensate according to Equation (3) below:

$$\text{Number of OH in Formula (1)} = (\text{Number-Average Molecular Weight} \times \text{Hydroxyl value})/56110 \quad (3)$$

With regard to a condensate, the number of OR may be determined by dividing the number-average molecular weight of the (g) compound and/or its condensate by the epoxy equivalent or the carbodiimide equivalent. The number-average molecular weight of the (g) compound and/or its condensate may be determined by gel permeation chromatography (GPC). A procedure of measurement of the number-average molecular weight uses a solvent in which the (g) compound and/or its condensate is dissolved, for example, hexafluoroisopropanol, as the mobile phase and poly(methyl methacrylate) (PMMA) as the standard substance. The column used is selected according to the solvent. For example, when hexafluoroisopropanol is used as the solvent, the column used may be "shodex GPC HPIP-806M" manufactured by Shimadzu GLC Ltd. The detector used for measurement of the weight-average molecular weight may be a differential refractometer. The hydroxyl value may be calculated by a procedure described later.

The hydroxyl value of the (g) compound and/or its condensate used in the second example is preferably 100 to 2000 mg KOH/g, in terms of the compatibility with the (a) polyamide resin. The hydroxyl value of the (g) compound and/or its condensate of not less than 100 mg KOH/g readily ensures the sufficient reaction volume between the (a) polyamide resin and the (g) compound and/or its condensate and thereby further improves the heat aging resistance, the dimensional accuracy, the chemical resistance and the creep resistance of the obtained molded product. The hydroxyl value of the (g) compound and/or its condensate is more preferably not less than 300 mg KOH/g.

The hydroxyl value of the (g) compound and/or its condensate of not greater than 2000 mg KOH/g, on the other hand, adequately enhances the reactivity of the (g) compound and/or its condensate with the (a) polyamide resin and further improves the heat aging resistance, the surface appearance, the dimensional accuracy, the chemical resistance and the creep resistance of the obtained molded product. Additionally, the hydroxyl value of the (g) compound and/or its condensate of not greater than 2000 mg KOH/g suppresses gelation by the excessive reaction. The hydroxyl value of the (g) compound and/or its condensate is more preferably not greater than 1800 mg KOH/g. The hydroxyl value may be determined by acetylation of the (g) compound and/or its condensate with a mixed solution of acetic anhydride and anhydrous pyridine and subsequent titration of the acetylated compound with a potassium hydroxide ethanolic solution.

The (g) compound and/or its condensate may be, for example, a reactant of the (b) hydroxyl group-containing aliphatic compound described above and a compound having an epoxy group or a carbodiimide group as the functional group (hereinafter referred to as "epoxy group- or carbodiimide group-containing compound") of the (c) compound containing reactive functional group with amino group or hydroxyl group. Concrete examples of the (b) hydroxyl group-containing aliphatic compound and the epoxy group- or carbodiimide group-containing compound are those described above according to the first example.

In the polyamide resin composition according to the second example, the content of the (g) compound and/or its condensate is preferably 0.1 to 20 parts by weight relative to 100 parts by weight of the (a) polyamide resin. The content of the (g) compound and/or its condensate of not less than 0.1 parts by weight improves the heat aging resistance, the dimensional accuracy, the chemical resistance and the creep resistance of the molded product. The content of the (g) compound and/or its condensate is more preferably not less than 0.5 parts by weight and is furthermore preferably not less than 2.0 parts by weight relative to 100 parts by weight of the (a) polyamide resin. The content of the (g) compound and/or its condensate of not greater than 20 parts by weight, on the other hand, suppresses the (g) compound and/or its condensate from being bled out on the surface layer of the molded product and thereby improves the surface appearance. The content of the (g) compound and/or its condensate of not greater than 20 parts by weight also suppresses plasticization and decomposition of the polyamide resin and thereby improves the heat aging resistance, the retention stability, the dimensional accuracy, the chemical resistance and the creep resistance of the molded product. The content of the (g) compound and/or its condensate is more preferably not greater than 7.5 parts by weight and is furthermore preferably not greater than 6.0 parts by weight relative to 100 parts by weight of the (a) polyamide resin.

The method of manufacturing the (g) compound and/or its condensate used in the second example is not specifically limited. A preferable method dry blends the (b) hydroxyl group-containing aliphatic compound described above with the epoxy group- or carbodiimide group-containing compound and melt kneads the blended mixture at a higher temperature than the melting points of both the components.

It is also preferable to add a catalyst to accelerate the reaction of the hydroxyl group with the epoxy group or the carbodiimide group. The addition amount of the catalyst is not specifically limited but is preferably 0 to 1 part by weight and is more preferably 0.01 to 0.3 parts by weight relative to 100 parts by weight of the sum of the (b) hydroxyl group-containing aliphatic compound and the epoxy group- or carbodiimide group-containing compound.

Available examples of the catalyst to accelerate the reaction of the hydroxyl group with the epoxy group include phosphines, imidazoles, amines and diazabicyclos. A concrete example of the phosphine is triphenylphosphine (TPP). Concrete examples of the imidazole include 2-heptadecylimidazole (HDI), 2-ethyl-4-methylimidazole, 1-benzyl-2-methylimidazole and 1-isobutyl-2-methylimidazole. Concrete examples of the amine include N-hexadecylmorpholine (HDM), triethylene diamine, benzyl dimethyl amine (BDMA), tributylamine, diethylamine, triethylamine, 1,8-diazabicyclo(5,4,0)-undecene-7 (DBU), 1,5-diazabicyclo(4,3,0)-nonene-5 (DBN), trisdimethyl aminomethyl phenol, tetramethyl ethylene diamine, N,N-dimethylcyclohexylamine, 1,4,-diazabicyclo-(2,2,2)-octane (DABCO).

Available examples of the catalyst to accelerate the reaction of the hydroxyl group with the carbodiimide group include trialkyl lead alkoxide, fluoroboric acid, zinc chloride and sodium alkoxide.

In the process of melt-kneading the (b) hydroxyl group-containing aliphatic compound and the epoxy group- or carbodiimide group-containing compound, the hydroxyl group in the (b) hydroxyl group-containing aliphatic compound reacts with the epoxy group or the carbodiimide group in the epoxy group- or carbodiimide group-containing compound, while dehydration condensation reaction of the hydroxyl groups of these compounds proceeds. This provides the compound and/or its condensate having the hyper-branched structure shown by Formula (1). Compared to separately adding the (b) hydroxyl group-containing aliphatic compound and the epoxy group- or carbodiimide group-containing compound without reaction therebetween to the (a) polyamide resin, mixing the (g) compound and/or its condensate with the (a) polyamide resin further improves the heat aging resistance, the retention stability, the dimensional accuracy, the chemical resistance and the creep resistance of the obtained molded product. Especially this remarkably improves the heat aging resistance at high temperature of not lower than 190° C. This reason has not been elucidated but may be attributed to the following. The reaction of the (b) hydroxyl group-containing aliphatic compound and the epoxy group- or carbodiimide group-containing compound partially produces the (b) hydroxyl group-containing aliphatic compound having the hyper-branched structure including the epoxy group- or carbodiimide group-containing compound as the connecting point. The (b) hydroxyl group-containing aliphatic compound having the hyper-branched structure is expected to have the reduced autoagglutination force and thereby enhances the reactivity with the (a) polyamide resin. From another perspective, the (b) hydroxyl group-containing aliphatic compound having the hyper-branched structure is expected to increase the melt viscosity of the (g) compound and/or its condensate and thereby enhance the dispersibility of the (g) compound and/or its condensate in the polyamide resin composition.

In producing the (g) compound and/or its condensate by the reaction of the (b) hydroxyl group-containing aliphatic compound with the epoxy group- or carbodiimide group-containing compound, the mixing ratio of the (b) hydroxyl group-containing aliphatic compound to the epoxy group- or carbodiimide group-containing compound is not specifically limited. It is, however, preferable to mix the (b) hydroxyl group-containing aliphatic compound with the epoxy group- or carbodiimide group-containing compound such that the number of hydroxyl groups per molecule of the (g) compound and/or its condensate is greater than the total number of epoxy groups and carbodiimide groups per molecule of the (g) compound and/or its condensate. The epoxy group and the carbodiimide group have the higher reactivities with the terminal group of the (a) polyamide resin than that of the hydroxyl group. The number of hydroxyl groups per molecule of the (g) compound and/or its condensate of greater than the total number of epoxy groups and carbodiimide groups per molecule of the (g) compound and/or its condensate suppresses embrittlement due to formation of the excessive crosslinking structure and further improves the heat aging resistance, the retention stability, the dimensional accuracy, the chemical resistance and the creep resistance of the obtained molded product.

In producing the (g) compound and/or its condensate by the reaction of the (b) hydroxyl group-containing aliphatic compound with the epoxy group- or carbodiimide group-containing compound, the reaction rate of the hydroxyl group with the epoxy group or the carbodiimide group is not specifically limited but is preferably 1 to 95%. The reaction rate of not lower than 1% increases the degree of branching of the (g) compound and/or its condensate and reduces the autoagglutination force, thereby enhancing the reactivity with the (a) polyamide resin. The reaction rate is preferably not lower than 10% and is more preferably not lower than 20%. The reaction rate of not higher than 95%, on the other hand, enables the epoxy group or the carbodiimide group to remain at an adequate ratio and enhances the reactivity with the (a) polyamide resin. The reaction rate is more preferably not higher than 70%.

The reaction rate of the hydroxyl group with the epoxy group or the carbodiimide group may be determined by dissolving the (g) compound and/or its condensate in a solvent (for example, deuterated dimethyl sulfoxide or deuterated hexafluoroisopropanol) and calculating a reduction before and after the reaction of the epoxy group with the (b) hydroxyl group-containing aliphatic compound with regard to epoxy ring-derived peaks by $^1$H-NMR measurement or a reduction before and after the reaction of the carbodiimide group with the (b) hydroxyl group-containing aliphatic compound with regard to a carbodiimide group-derived peak by $^{13}$C-NMR measurement. The reaction rate may be determined according to Equation (4) below:

$$\text{Reaction rate (\%)} = \{1-(b/a)\} \times 100 \quad (4)$$

In Equation (4) above, a denotes a peak area of the dry-blended mixture of the (b) hydroxyl group-containing aliphatic compound and the compound having an epoxy group or a carbodiimide group as the functional group of the (c) compound containing reactive functional group with amino group or hydroxyl group, and b denotes a peak area of the (g) compound and/or its condensate.

Figure 2:
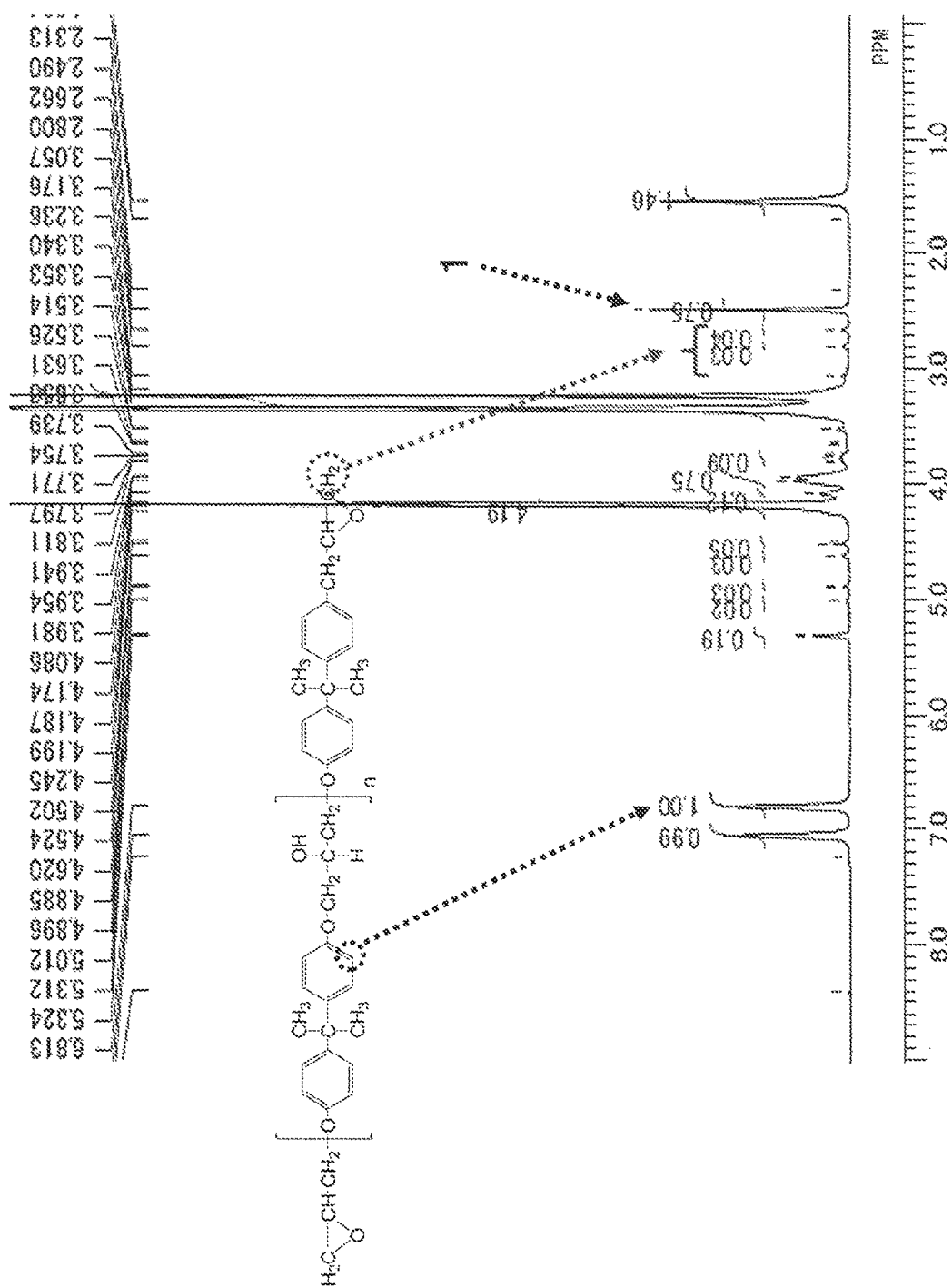
FIG. 2 is a chart showing a $^1$H-NMR spectrum of a melt kneaded reactant of a polyol and an epoxy compound obtained in Reference Example 9.

As an example, FIG. 1 shows an $^1$H-NMR spectrum of a dry-blended mixture of dipentaerythritol and a bisphenol A-type epoxy resin "JER (registered trademark) 1004" manufactured by Mitsubishi Chemical Corporation at a weight ratio of 3 to 1. FIG. 2 shows an $^1$H-NMR spectrum of (g-7) compound and/or its condensate obtained in Reference Example 9 described later. The solvent used was deuterated dimethyl sulfoxide, the amount of the sample was 0.035 g, and the volume of the solvent was 0.70 ml. A solvent peak is shown by numeral 1.

The total area of epoxy ring-derived peaks appearing at around 2.60 ppm and 2.80 ppm is determined from the $^1$H-NMR spectrum shown in FIG. 1. Similarly the total area of peaks shown in FIG. 2 is determined. The reaction rate is then calculated according to the equation of computation. The peak area is normalized by a peak area of a benzene ring-derived peak of the epoxy resin that does not contribute to the reaction.

The (g) compound and/or its condensate is preferably in a solid form at 25° C. or in a liquid form having the viscosity of not lower than 200 mPa·s at 25° C. This readily provides the viscosity of a desired level during melt-kneading and further enhances the compatibility with the (a) polyamide resin. This further improves the heat aging resistance, the dimensional accuracy, the chemical resistance and the creep resistance of the obtained molded product.

As described above, the (b) hydroxyl group-containing aliphatic compound has the effect of improving the molding processability such as flowability and the heat aging resistance at 150 to 230° C., but has a problem of insufficient heat aging resistance at lower than 150° C., which may be attributed to the low compatibility with the (a) polyamide resin. Another problem is that the (b) hydroxyl group-containing aliphatic compound is bled out on the surface layer of the molded product. Another problem is that the hydroxyl group of the (b) hydroxyl group-containing aliphatic compound accelerates hydrolysis of the amide bond of the (a) polyamide resin and results in providing the poor retention stability. Additionally, another problem is that the (b) hydroxyl group-containing aliphatic compound plasticizes the (a) polyamide resin and results in reducing the dimensional accuracy, the chemical resistance and the creep resistance of the obtained molded product. A specified content of the (g) compound and/or its condensate may be used with the (a) polyamide resin. This enhances the compatibility with the (a) polyamide resin, suppresses bleed-out on the surface of the molded product to improve the surface appearance and also satisfies the heat aging resistance at lower than 150° C. This reason may be attributed to the following. The epoxy group or the carbodiimide group of the (g) compound and/or its condensate reacts with the terminal group of the (a) polyamide resin to form an adequate level of crosslinking structure. This suppresses reduction in degree of polymerization by hydrolysis of the amide bond, improves the retention stability and suppresses plasticization of the (a) polyamide resin. This results in improving the dimensional accuracy, the chemical resistance and the creep resistance of the obtained molded product.

The increase rate in concentration of carboxyl terminal group in the polyamide resin composition from the surface of the molded product to a depth of 0.2 mm after heat treatment is preferably lower than 70%, when an ASTM No. 1 dumbbell of 3.2 mm in thickness produced by injection molding of the polyamide resin composition is processed in the atmosphere by heat treatment at 130° C. for 100 hours. The increase rate in concentration of carboxyl terminal group in the polyamide resin composition from the surface of the molded product to a depth of 0.2 mm after heat treatment is preferably lower than 70%, when an ASTM No. 1 dumbbell of 3.2 mm in thickness produced by injection molding of the polyamide resin composition is processed in the atmosphere by heat treatment at 190° C. for 9 hours.

The increase rate after heat treatment at 130° C. for 100 hours of lower than 70% improves the heat aging resistance of the obtained molded product. The increase rate after heat treatment at 190° C. for 9 hours of lower than 70% improves the heat aging resistance of the obtained molded product. This reason has not been elucidated but may be attributed to the following. Reduction of the heat aging resistance may be attributed to that the (a) polyamide resin on the surface of a molded product exposed to oxygen has oxidative degradation to the low molecular weight and is embrittled when the molded product made of the polyamide resin composition is exposed to heat in the atmosphere. The carboxyl terminal group of the (a) polyamide resin that is increased in the process of degradation of the (a) polyamide resin to the low molecular weight is expected to react with the (b) amino group- or hydroxyl group-containing aliphatic compound and with the (c) compound containing reactive functional group with amino group or hydroxyl group. This is accordingly expected to suppress the degradation of the (a) polyamide resin to the low molecular weight and maintain the heat aging resistance. Similarly the carboxyl terminal group of the (a) polyamide resin is expected to react with the (g) compound and/or its condensate. This is accordingly expected to suppress the degradation of the (a) polyamide resin to the low molecular weight and maintain the heat aging resistance. In other words, reducing the increase rate in concentration of carboxyl terminal group in the polyamide resin composition after heat treatment is expected to suppress the degradation of the (a) polyamide resin to the low molecular weight. Accordingly using the polyamide resin composition including the (b) amino group- or hydroxyl group-containing aliphatic compound and the (c) compound containing reactive functional group with amino group or hydroxyl group or including the (g) compound and/or its condensate can reduce the increase rate after heat treatment at 130° C. for 100 hours and the increase rate after heat treatment at 190° C. for 9 hours to be lower than 70%.

As described above, in the polyamide resin composition according to the first example, the ratio of the content of the (b) amino group- or hydroxyl group-containing aliphatic compound to the content of the (c) compound containing reactive functional group with amino group or hydroxyl group of not less than 0.30 results in reducing the increase rate in concentration of the carboxyl terminal group after heat treatment to be lower than 70% and improving the heat aging resistance. This reason has also not been elucidated but may be attributed to the following. This content ratio is expected to suppress the excessive reaction of the (c) compound containing reactive functional group with amino group or hydroxyl group with both the terminal groups of the (a) polyamide resin and with the amino group or the hydroxyl group of the (b) amino group- or hydroxyl group-containing aliphatic compound in the initial stage of heat treatment and keep the concentration of the functional group at a level reacting with the carboxyl terminal group of the (a) polyamide resin to the late stage of heat treatment.

The concentration of the carboxyl terminal group in the polyamide resin composition may be measured by a known method such as neutralization titration with regard to the polyamide resin composition from the surface to the depth of 0.2 mm that is cut from a molded product after heat treatment at 130° C. for 100 hours or after heat treatment at 190° C. for 9 hours in the atmosphere with a milling machine.

As described above, in the polyamide resin composition according to the first example, the molecular weight of the (c) compound containing reactive functional group with amino group or hydroxyl group of not less than 800 results in reducing the increase rate in concentration of the carboxyl terminal group after heat treatment to be lower than 70% and further improving the heat aging resistance. This reason has also not been elucidated but may be attributed to the following. This molecular weight is expected to increase the viscosity during melt-kneading and further enhance the reactivity of the carboxyl terminal group of the (a) polyamide resin with the amino group or the hydroxyl group in the (b) amino group- or hydroxyl group-containing aliphatic compound.

The polyamide resin composition may further include a (d) copper compound. The (d) copper compound is expected to have coordinate bond with the amino group or ammonium ion or with the hydroxyl group or hydroxide ion of the (b) amino group- or hydroxyl group-containing aliphatic compound, in addition to coordinate bond with the amide group of the polyamide resin. Accordingly the (d) copper compound is expected to have the effect of enhancing the compatibility between the polyamide resin and the (b) amino group- or hydroxyl group-containing aliphatic compound. The (d) copper compound is also expected to have coordinate bond with the hydroxyl group or hydroxide ion of the (g) compound and/or its condensate. Accordingly the copper compound is expected to have the effect of enhancing the compatibility between the polyamide resin and the (g) compound and/or its condensate.

The polyamide resin composition may further include a potassium compound. The potassium compound suppresses isolation and deposition of copper. The potassium compound is thus expected to have the effect of accelerating the reaction of the copper compound with the (b) amino group- or hydroxyl group-containing aliphatic compound and with the (a) polyamide resin. Similarly the potassium compound is expected to have the effect of accelerating the reaction of the copper compound with the (g) compound and/or its condensate and with the (a) polyamide resin.

The copper compound may be, for example, copper chloride, copper bromide, copper iodide, copper acetate, copper acetylacetonate, copper carbonate, copper borofluoride, copper citrate, copper hydroxide, copper nitrate, copper sulfate or copper oxalate. Two or more different types of these compounds may be used as the copper compound. Among these copper compounds, preferable are industrially available copper compounds or more specifically copper halides. The copper halide may be, for example, copper iodide, copper (I) bromide, copper (II) bromide or copper (I) chloride. Copper iodide is more preferable as the copper halide.

The potassium compound may be, for example, potassium iodide, potassium bromide, potassium chloride, potassium fluoride, potassium acetate, potassium hydroxide, potassium carbonate, or potassium nitrate. Two or more different types of these compounds may be used as the potassium compound. Among these potassium compounds, potassium iodide is preferable. Including the potassium compound improves the surface appearance, the weather resistance and the die corrosion resistance of the molded product.

The content (weight basis) of the copper element in the polyamide resin composition is preferably 25 to 200 ppm. The content of the copper element of not lower than 25 ppm improves the compatibility between the (a) polyamide resin and the (b) amino group- or hydroxyl group-containing aliphatic compound or the compatibility between the (a) polyamide resin and the (g) compound and/or its condensate and further improves the heat aging resistance, the dimensional accuracy, the chemical resistance and the creep resistance of the molded product. The content (weight basis) of the copper element in the polyamide resin composition is preferably not lower than 80 ppm.

The content of the copper element of not higher than 200 ppm, on the other hand, suppresses coloring due to deposition or isolation of the copper compound and thereby further improves the surface appearance of the molded product. The content of the copper element of not higher than 200 ppm also suppresses a decrease in hydrogen bonding strength of the amide group due to the excessive coordinate bond of the polyamide resin with copper and further improves the heat aging resistance, the dimensional accuracy, the chemical resistance and the creep resistance of the molded product. The content (weight basis) of the copper element in the polyamide resin composition is preferably not higher than 190 ppm. The content of the copper element in the polyamide resin composition can be made to the above desired range by adequately regulating the addition amount of the copper compound.

The content of the copper element in the polyamide resin composition may be determined by the following procedure. The procedure dries pellets of the polyamide resin composition under reduced pressure, incinerates the pellets in an electric oven at 550° C. for 24 hours, adds concentrated sulfuric acid to the ash, heats the mixture for wet degradation and dilutes the degradation solution. The copper content is determined by atomic absorption analysis (calibration curve method) of the diluted solution.

The ratio Cu/K of the content of the copper element to the content of the potassium element in the polyamide resin composition is preferably 0.21 to 0.43. The ratio Cu/K is an index indicating the degree of suppression of deposition and isolation of copper. The lower ratio more effectively suppresses deposition and isolation of copper and accelerates the reaction of the copper compound with the (b) amino group- or hydroxyl group-containing aliphatic compound and with the (a) polyamide resin. Similarly the lower ratio accelerates the reaction of the copper compound with the (g) compound and/or its condensate and with the (a) polyamide resin. Cu/K of not higher than 0.43 suppresses deposition and isolation of copper and further improves the surface appearance of the molded product. Cu/K of not higher than 0.43 also improves the compatibility with the polyamide resin composition and thereby further improves the heat aging resistance, the dimensional accuracy, the chemical resistance and the creep resistance of the molded product.

Cu/K of not lower than 0.21, on the other hand, enhances the dispersibility of the compound including potassium and especially makes even deliquescent potassium iodide unlikely to be aggregated and enhances the effect of suppressing deposition and isolation of copper. This sufficiently accelerates the reaction of the copper compound with the (b) amino group- or hydroxyl group-containing aliphatic compound and with the (a) polyamide resin and further improves the heat aging resistance, the dimensional accuracy, the chemical resistance and the creep resistance of the molded product. Similarly Cu/K of not lower than 0.21 sufficiently accelerates the reaction of the copper compound with the (g) compound and/or its condensate and with the (a) polyamide resin and further improves the heat aging resistance, the dimensional accuracy, the chemical resistance and the creep resistance of the molded product. The content of the potassium element in the polyamide resin composition may be determined by the same procedure as that of the content of copper as described above.

The polyamide resin composition may additionally include an (e) filler. The filler used may be either an organic filler or an inorganic filler and may be either a fibrous filler or a non-fibrous filler. The fibrous filler is preferable as the (e) filler.

The fibrous filler may be a fibrous or whisker filler: for example, glass fiber, PAN (polyacrylonitrile)-based or pitch-based carbon fiber, metal fiber such as stainless steel fiber, aluminum fiber or brass fiber, organic fiber such as aromatic polyamide fiber, gypsum fiber, ceramic fiber, asbestos fiber, zirconia fiber, alumina fiber, silica fiber, titanium oxide fiber, silicon carbide fiber, rock wool, potassium titanate whisker, zinc oxide whisker, calcium carbonate whisker, wollastonite whisker, aluminum borate whisker or silicon nitride whisker. The glass fiber and the carbon fiber are especially preferable as the fibrous filler.

The type of the glass fiber is not specifically limited, but may be any type of glass fiber generally used for reinforcement of the resin. The glass fiber may be selected, for example, from long-fiber or short-fiber chopped strands and milled fibers. The glass fiber may be coated or bundled with a thermoplastic resin such as ethylene/vinyl acetate copolymer or a thermosetting resin such as epoxy resin. The cross section of the glass fiber is not limited to circular shape, flat gourd-shape, cocoon-shape, oval shape, elliptical shape, rectangular shape or analogous thereof. In terms of reducing the characteristic warpage likely to appear in a molded product made of the glass fiber-mixed polyamide resin composition, the ratio of major axis/minor axis of the flat fiber is preferably not less than 1.5 and more preferably not less than 2.0 and is also preferably not greater than 10 and more preferably not greater than 6.0. The ratio of major axis/minor axis of less than 1.5 has little effect of the flat cross section, whereas the ratio of greater than 10 has difficulty in manufacturing the glass fiber.

Examples of the non-fibrous filler include: non-swellable silicates such as talc, wollastonite, zeolite, sericite, mica, kaolin, clay, pyrophyllite, bentonite, asbestos, alumina silicate and calcium silicate; swellable lamellar silicates including swellable micas such as Li-type fluorine taeniolite, Na-type fluorine taeniolite, Na-type fluorine tetrasilicon mica and Li-type fluorine tetrasilicon mica; metal oxides such as silicon oxide, magnesium oxide, alumina, silica, diatomite, zirconium oxide, titanium oxide, iron oxide, zinc oxide, calcium oxide, tin oxide and antimony oxide; metal carbonates such as calcium carbonate, magnesium carbonate, zinc carbonate, barium carbonate, dolomite and hydrotalcite; metal sulfates such as calcium sulfate and barium sulfate; metal hydroxides such as magnesium hydroxide, calcium hydroxide, aluminum hydroxide and basic magnesium carbonate; various clay minerals including smectite clay minerals such as montmorillonite, beidellite, nontronite, saponite, hectorite and sauconite, vermiculite, halloysite, kanemite, kenyaite, zirconium phosphate and titanium phosphate; glass beads, glass flakes, ceramic beads, boron nitride, aluminum nitride, silicon carbide, calcium phosphate, carbon black and graphite. The above swellable lamellar silicate may have the exchangeable cation located between layers exchanged with organic onium ion. The organic onium ion may be, for example, ammonium ion, phosphonium ion or sulfonium ion. Two or more different types of the fillers may be used in combination.

The surface of the above filler may be treated with a known coupling agent (for example, silane coupling agent or titanate coupling agent). Such treatment further improves the mechanical strength and the surface appearance of the molded product. One preferable procedure treats the surface of the filler in advance with the coupling agent by the conventional method and melt-kneads the surface treated-filler with the polyamide resin. Instead of advanced surface treatment of the filler, an integrable mixing method may be employed to add the coupling agent in the course of melt-kneading the filler with the polyamide resin. The amount of the coupling agent used for treatment is preferably not less than 0.05 parts by weight and is more preferably not less than 0.5 parts by weight relative to 100 parts by weight of the filler. The amount of the coupling agent used for treatment is, on the other hand, preferably not greater than 10 parts by weight and is more preferably not greater than 3 parts by weight relative to 100 parts by weight of the filler.

In the polyamide resin composition, the content of the (e) filler is preferably 1 to 150 parts by weight relative to 100 parts by weight of the (a) polyamide resin. The content of the (e) filler of not less than 1 part by weight further improves the heat aging resistance, the dimensional accuracy, the chemical resistance and the creep resistance of the molded product. The content of the (e) filler is more preferably not less than 10 parts by weight and is furthermore preferably not less than 20 parts by weight. The content of the (e) filler of not greater than 150 parts by weight, on the other hand, suppresses floating of the filler to the surface of the molded product and gives the molded product of the excellent surface appearance. The content of the (e) filler is more preferably not greater than 80 parts by weight and is furthermore preferably not greater than 70 parts by weight.

The polyamide resin composition may further include a resin other than the polyamide resin and various additives according to the purpose in such a range that does not damage the advantageous effects.

Concrete examples of the resin other than the polyamide resin include polyester resin, polyolefin resin, modified polyphenylene ether resin, polysulfone resin, polyketone resin, polyether imide resin, polyarylate resin, polyether sulfone resin, polyether ketone resin, polythioether ketone resin, polyether ether ketone resin, polyimide resin, polyamide imide resin and polytetrafluoroethylene resin. When any of such resins is added, in order not to interfere with the advantageous characteristics of the polyamide resin, the content is preferably not greater than 30 parts by weight and is more preferably not greater than 20 parts by weight relative to 100 parts by weight of the (a) polyamide resin.

Concrete example of the various additives include: heat stabilizers other than the copper compounds; coupling agents such as isocyanate compounds, organic silane compounds, organic titanate compounds, organic borane compounds and epoxy compounds; plasticizers such as polyalkylene oxide oligomer compounds, thioether compounds, ester compounds and organic phosphorous compounds; crystal nucleating agents such as organic phosphorous compounds and polyether ether ketones; metal soaps such as montanic acid waxes, lithium stearate and aluminum stearate; mold release agents such as ethylenediamine-stearic acid-sebacic acid polycondensates and silicone compounds; coloring-preventing agents such as hypophosphites; lubricants, ultraviolet protective agents, coloring agents, flame retardants, impact modifiers and foaming agents. When any of such additives is added, in order not to interfere with the advantageous characteristics of the polyamide resin, the content is preferably not greater than 10 parts by weight and is more preferably not greater than 1 part by weight relative to 100 parts by weight of the (a) polyamide resin.

The (e) heat stabilizer other than the copper compound may be, for example, a phenolic compound, a phosphorous compound, a sulfur compound or an amine compound. Two or more different types of these compounds may be used as the (e) heat stabilizer other than the copper compound.

A hindered phenolic compound is preferably used as the phenolic compound: more specifically, N,N'-hexamethylene-bis(3,5-di-t-butyl-4-hydroxy-hydrocinnamide) or tetrakis[methylene-3-(3',5'-di-t-butyl-4'-hydroxyphenyl)propionate] methane may be preferably used.

Examples of the phosphorous compound include bis(2,6-di-t-butyl-4-methylphenyl) pentaerythritol diphosphite, bis (2,4-d-t-butylphenyl) pentaerythritol diphosphite, bis(2,4-dicumylphenyl) pentaerythritol diphosphite, tris(2,4-di-t-butylphenyl) phosphite, tetrakis(2,4-di-t-butylphenyl)-4,4'-bisphenylene phosphite, distearyl pentaerythritol diphosphite, triphenyl phosphite and 3,5,-di-butyl-4-hydroxybenzyl phosphonate diethyl ester. Among the phosphorous compounds, those having the high melting point are preferably used to minimize volatilization and decomposition of the heat resistant material in the polyamide resin compound.

Examples of the sulfur compound include organic thioacid compounds, mercaptobenzimidazole compounds, dithiocarbamate compounds and thiourea compounds. Among these sulfur compounds, mercaptobenzimidazole compounds and organic thioacid compounds are preferable. Especially, the thioether compound having the thioether structure receives oxygen from an oxidized substance to be reduced and is thus preferably usable as the heat stabilizer. More specifically, preferable thioether compounds are 2-mercaptobenzimidazole, 2-mercaptomethylbenzimidazole, di(tetradecyl) thiodipropionate, di(octadecyl) thiodipropionate, pentaerythritol tetrakis(3-dodecyl thiopropionate) and pentaerythritol tetrakis(3-lauryl thiopropionate). More preferable are pentaerythritol tetrakis(3-dodecyl thiopropionate) and pentaerythritol tetrakis(3-lauryl thiopropionate). The molecular weight of the sulfur compound is generally not less than 200 and is preferably not less than 500, and its upper limit is generally 3000.

As the amine compound, preferable are compounds having the diphenylamine skeleton, compounds having the phenylnaphthylamine skeleton and compounds having the dinaphthylamine skeleton. Especially preferable are compounds having the diphenylamine skeleton and compounds having the phenylnaphthylamine skeleton. Among these amine compounds, more preferable are 4,4'-bis($\alpha,\alpha$-dimethylbenzyl)diphenylamine, N,N'-di-2-naphthyl-p-phenylenediamine and N,N'-diphenyl-p-phenylenediamine. Especially preferable are N,N'-di-2-naphthyl-p-phenylenediamine and 4,4'-bis($\alpha,\alpha$-dimethylbenzyl)diphenylamine.

A preferable combination of the sulfur compound and the amine compound is pentaerythritol tetrakis(3-lauryl thiopropionate) and 4,4'-bis($\alpha,\alpha$-dimethylbenzyl)diphenylamine.

The method of manufacturing the polyamide resin composition is not specifically limited, but manufacture in the molten state or manufacture in the solution state may be employed. In terms of enhancing the reactivity, manufacture in the molten state is preferably employed. For example, melt-kneading with an extruder or a melt-kneading with a kneader may be employed for manufacture in the molten state. In terms of productivity, however, melt-kneading with an extruder that allows for continuous manufacture is preferable. In melt-kneading with the extruder, one or a plurality of extruders may be used among single-screw extruder, multi-screw extruders such as twin-screw extruder and four-screw extruder, and twin-screw single-screw combined extruder. In terms of improving melt-kneading performance, reactivity and productivity, it is preferable to use a multi-screw extruder such as twin-screw extruder or four-screw extruder. The most preferable method is melt-kneading with the twin-screw extruder.

In melt-kneading with the twin-screw extruder, the method of supplying the raw materials to the twin-screw extruder is not specifically limited. The (b) amino group- or hydroxyl group-containing aliphatic compound and the (g) compound and/or its condensate are likely to accelerate decomposition of the polyamide resin in a temperature range higher than the melting point of the polyamide resin. It is accordingly preferable to supply the (b) amino group- or hydroxyl group-containing aliphatic compound or the (g) compound and/or its condensate on the downstream side of the supply position of the polyamide resin, so as to shorten the kneading time of the (a) polyamide resin and the (b) amino group- or hydroxyl group-containing aliphatic compound or the (g) compound and/or its condensate. In the description hereof, the side where the raw materials are supplied to the twin-screw extruder is defined as upstream side, and the side where the molten resin is discharged is defined as downstream side.

The (d) copper compound is expected to serve to form coordinate bond with the amide group of the polyamide resin and thereby protect the amide group and also serve as a compatibility accelerator of the polyamide resin with the (b) amino group- or hydroxyl group-containing aliphatic compound or the (g) compound and/or its condensate. Accordingly, when the (d) copper compound is added, it is preferable to supply the (d) copper compound together with the polyamide resin to the twin-screw extruder, so as to ensure the sufficient reaction of the polyamide resin with the copper compound.

A ratio (L/D) of full screw length L to screw diameter D of the twin-screw extruder is preferably not less than 25 and is more preferably greater than 30. The ratio L/D of not less than 25 facilitates supplying the (b) amino group- or hydroxyl group-containing aliphatic compound or the (g) compound and/or its condensate after sufficiently kneading the polyamide resin and the copper compound as appropriate. In adding the (d) copper compound, this ratio facilitates supplying the (b) amino group- or hydroxyl group-containing aliphatic compound or the (g) compound and/or its condensate after sufficiently kneading the polyamide resin with the copper compound. As a result, this is expected to suppress decomposition of the polyamide resin and increase the compatibility between the (a) polyamide resin and the (b) amino group- or hydroxyl group-containing aliphatic compound or the (g) compound and/or its condensate. This accordingly improves the heat aging resistance, dimensional accuracy, chemical resistance and creep resistance of the molded product.

It is preferable to supply the (a) polyamide resin and the (d) copper compound as needed from the upstream side of ½ of the screw length to the twin-screw extruder for melt-kneading. More preferable is to supply from an upstream side end of the screw segment. The screw length herein denotes the length from the upstream end of the screw segment at the position (feed port) of supplying the (a) polyamide resin on the screw base to the tip of the screw. The upstream end of the screw segment denotes the position of a screw piece located at the most upstream end in the screw segment coupled with the extruder.

It is preferable to subsequently supply the (b) amino group- or hydroxyl group-containing aliphatic compound or the (g) compound and/or its condensate from the downstream side of ½ of the screw length to the twin-screw extruder for melt-kneading. Supplying the (b) amino group- or hydroxyl group-containing aliphatic compound or the (g) compound and/or its condensate from the downstream side of ½ of the screw length facilitates supplying the (b) amino group- or hydroxyl group-containing aliphatic compound or the (g) compound and/or its condensate after sufficiently kneading the polyamide resin and the copper compound as appropriate. As a result, this is expected to suppress decomposition of the polyamide resin and increase the compatibility between the (a) polyamide resin and the (b) amino group- or hydroxyl group-containing aliphatic compound or the (g) compound and/or its condensate. This accordingly improves the heat aging resistance, the dimensional accuracy, the chemical resistance and the creep resistance of the molded product.

Supplying the (c) compound containing reactive functional group with amino group or hydroxyl group together with the (a) polyamide resin from the upstream side of ½ of the screw length to the twin-screw extruder ensures the advantageous effects. Supplying the (c) compound containing reactive functional group with amino group or hydroxyl group together with the (b) amino group- or hydroxyl group-containing aliphatic compound from the downstream side of ½ of the screw length to the twin-screw extruder also ensures the advantageous effects.

When the polyamide resin composition is manufactured using the twin-screw extruder, in terms of improving the kneading performance and the reactivity, it is preferable to use a twin-screw extruder having a plurality of full flight zones and a plurality of kneading zones. Each full flight zone is comprised of one or more full flights. Each kneading zone is comprised of one or more kneading disks.

Additionally, on the assumption that a maximum resin pressure of the resin pressures in the plurality of kneading zones is Pkmax (MPa) and that a minimum resin pressure of the resin pressures in the plurality of full flight zones is Pfmin (Mpa), the preferable condition of melt kneading is $$Pk\text{max} \geq Pf\text{min} + 0.3,$$

and the more preferable condition of melt kneading is $Pk\mathrm{max} \geq Pf\mathrm{min}+0.5.$ The resin pressures in the kneading zone and in the full flight zone denote resin pressures measured by resin pressure gauges placed in the respective zones.

The kneading zone has the better kneading performance and reactivity of the molten resin, compared to the full flight zone. Filling the kneading zone with the molten resin drastically improves the kneading performance and the reactivity. One index indicating the filling degree of the molten resin is the resin pressure. The high resin pressure is usable as one indication of the higher filling degree of the molten resin. In other words, in an application using the twin-screw extruder, increasing the resin pressure in the kneading zone to be higher than the resin pressure in the full flight zone in a predetermined range can effectively accelerate the reaction. As a result, this is expected to increase compatibility of the (a) polyamide resin with the (b) amino group- or hydroxyl group-containing aliphatic compound and the (c) compound containing reactive functional group with amino group or hydroxyl group or the compatibility of the (a) polyamide resin with the (g) compound and/or its condensate. This accordingly improves the heat aging resistance, the dimensional accuracy, the chemical resistance and the creep resistance of the molded product.

The method of increasing the resin pressure in the kneading zone is not specifically limited. For example, a preferable procedure introduces a reverse screw zone serving to press back the molten resin to the upstream side or a seal ring zone serving to accumulate the molten resin between the kneading zones or on the downstream side of the kneading zone. The reverse screw zone and the seal ring zone are respectively comprised of one or more reverse screws and one or more seal rings. These may be introduced in combination.

When the total length of the kneading zones located on the upstream side of the feeding position of the (b) amino group- or hydroxyl group-containing aliphatic compound or the (g) compound and/or its condensate is Ln1, Ln1/L is preferably not less than 0.02 and is more preferably not less than 0.03. The ratio Ln1/L is, on the other hand, preferably not greater than 0.40 and is more preferably not greater than 0.20. Ln1/L of not less than 0.02 enhances the reactivity of the polyamide resin, while Ln1/L of not greater than 0.40 adequately suppresses shear heating and thereby suppresses thermal degradation of the resin. The melting temperature of the polyamide resin is not specifically limited but is preferably not higher than 340° C. to suppress reduction of the molecular weight due to thermal degradation of the polyamide resin.

When the total length of the kneading zones located on the downstream side of the feeding position of the (b) amino group- or hydroxyl group-containing aliphatic compound or the (g) compound and/or its condensate is Ln2, Ln2/L is preferably 0.02 to 0.30. Ln2/L of not less than 0.02 further enhances the reactivity of the (b) amino group- or hydroxyl group-containing aliphatic compound or the reactivity of the (g) compound and/or its condensate. The ratio Ln2/L is more preferably not less than 0.04. Ln2/L of not greater than 0.30, on the other hand, further suppresses decomposition of the polyamide resin. The ratio Ln2/L is more preferably not greater than 0.16.

A more preferable method of manufacturing the polyamide resin composition uses the twin-screw extruder to melt-knead the (a) polyamide resin with a reactant obtained by the melting reaction of the mixture of the (b) amino group- or hydroxyl group-containing aliphatic compound and the (c) compound containing reactive functional group with amino group or hydroxyl group at temperature that causes both the compounds to be melted. Compared to separately supplying the (b) amino group- or hydroxyl group-containing aliphatic compound and the (c) compound containing reactive functional group with amino group or hydroxyl group without reaction therebetween to the twin-screw extruder, this more preferable method remarkably improves the heat aging resistance, the dimensional accuracy, the chemical resistance and the creep resistance of the obtained molded product. This reason has not been elucidated but may be attributed to the following. The melting reaction of the (b) amino group- or hydroxyl group-containing aliphatic compound and the (c) compound containing reactive functional group with amino group or hydroxyl group partially produces the (b) amino group- or hydroxyl group-containing aliphatic compound having the hyper-branched structure including the (c) compound containing reactive functional group with amino group or hydroxyl group as the connecting point. This hyper-branched structure is expected to reduce the autoagglutination force and enhance the reactivity with the (a) polyamide resin.

A more preferable method of manufacturing the polyamide resin composition melt-kneads the (a) polyamide resin with the (b) amino group- or hydroxyl group-containing aliphatic compound and the (c) compound containing reactive functional group with amino group or hydroxyl group using the twin-screw extruder to produce a master batch and further melt-kneads the master batch with the (a) polyamide resin using the twin-screw extruder. A more preferable method of manufacturing the polyamide resin composition melt-kneads 10 to 250 parts by weight of the (g) compound and/or its condensate with 100 parts by weight of the (a) polyamide resin to produce a highly concentrated preliminary reactant and further melt-kneads the highly concentrated preliminary reactant with the (a) polyamide resin using the twin-screw extruder. Compared to the method that does not produce the master batch or the highly concentrated preliminary reactant, these preferable methods specifically improve the heat aging resistance, the dimensional accuracy, the chemical resistance and the creep resistance of the obtained molded product. This reason has not been elucidated but may be attributed to that melt-kneading twice enhances the compatibility between the respective components. In producing the master batch, the addition amount of the (b) amino group- or hydroxyl group-containing aliphatic compound or the addition amount of the (g) compound and/or its condensate is increased relative to the (a) polyamide resin. Similarly, in producing the highly concentrated preliminary reactant, the addition amount of the (g) compound and/or its condensate is increased relative to the (a) polyamide resin. To suppress reduction of the retention stability, in the process of melt-kneading with the twin-screw extruder, it is preferable to supply the (b) amino group- or hydroxyl group-containing aliphatic compound or the (g) compound and/or its condensate on the downstream side of the feeding position of the polyamide resin and shorten the kneading time of the (a) polyamide resin with the (b) amino group- or hydroxyl group-containing aliphatic compound or the (g) compound and/or its condensate. The (a) polyamide resin used for the highly concentrated preliminary reactant may be identical with or may be different from the (a) polyamide resin further added to the highly concentrated preliminary reactant. The (a) polyamide resin used for the highly concentrated preliminary reactant is preferably nylon 6, nylon 11 and/or nylon 12, in terms of further improving the heat aging resistance of the molded product.

The polyamide resin composition thus obtained may be molded by a known method, and various molded products such as sheets and films may be produced from the polyamide resin composition. The molding technique employed may be, for example, injection molding, injection compression molding, extrusion molding, compression molding, blow molding or press molding.

The polyamide resin composition and its molded product having the excellent properties may be used in various applications such as automobile components, electric and electronic components, construction components, various containers, commodities, household articles and sanitary articles. The polyamide resin composition and its molded product are especially preferably used in applications of automobile engine peripheral components, automobile under-hood components, automobile gear components, automobile interior components, automobile exterior components, air intake and exhaust system components, engine cooling water system components, automobile electric components and electric and electronic components that are specifically required to have the good heat aging resistance, surface appearance, retention stability, dimensional accuracy, chemical resistance and creep resistance. More specifically, the polyamide resin composition or its molded product is preferably used for: automobile engine peripheral components such as engine cover, air intake pipe, timing belt cover, intake manifold, filler cap, throttle body and cooling fan; automobile under-hood components such as cooling fan, top and base of radiator tank, cylinder head cover, oil pan, brake piping, tube for fuel piping and exhaust gas system components; automobile rear components such as gear, actuator, bearing retainer, bearing cage, chain guide and chain tensioner; automobile interior components such as gearshift lever bracket, steering lock bracket, key cylinder, door inner handle, door handle cowl, rear-view mirror bracket, air conditioner switch, instrument panel, console box, glove compartment, steering wheel and trim; automobile exterior components such as front fender, rear fender, fuel lid, door panel, cylinder head cover, door mirror stay, tail gate panel, license garnish, roof rail, engine mount bracket, rear garnish, rear spoiler, trunk lid, rocker molding, molding, lamp housing, front grill, mud guard and side bumper; air intake and exhaust system components such as air intake manifold, intercooler inlet, turbo charger, exhaust pipe cover, inner bush, bearing retainer, engine mount, engine head cover, resonator and throttle body; engine cooling water system components such as chain cover, thermostat housing, outlet pipe, radiator tank, alternator and delivery pipe; automobile electric components such as connector, wire harness connector, motor component, lamp socket, in-vehicle sensor switch and combination switch; and electric and electronic components such as SMT connector, socket, card connector, jack, power supply component, switch, sensor, capacitor seat plate, relay, resistor, fuse holder, coil bobbin, IC or LED housing, reflector, Si power module and SiC power module.

EXAMPLES

The following describes compositions, products and methods more specifically with reference to examples. The properties were evaluated by the following procedures. Melting Point of Polyamide Resin About 5 mg of the polyamide resin was weighed, and the melting point of the (a) polyamide resin was measured in a nitrogen atmosphere under the following conditions using a robot DSC (differential scanning calorimeter) RDC 220 manufactured by Seiko Instruments Inc. The temperature of an observed endothermic peak (melting point) was measured when the temperature was increased to the melting point of the polyamide resin+40° C. to be the molten state, was subsequently decreased to 30° C. at a temperature decrease rate of 20° C./minute, was kept at 30° C. for 3 minutes and was then increased to the melting point+40° C. at a temperature rise rate of 20° C./minute.

Relative Viscosity of Polyamide Resin

The relative viscosity ($\eta r$) of a 98% concentrated sulfuric acid solution having a polyamide resin concentration of 0.01 g/mo was measured at 25° C. using an Ostwald viscometer.

Copper Content and Potassium Content in Polyamide Resin Composition

Pellets obtained in each of examples and comparative examples were dried under reduced pressure at 80° C. (at 120° C. in Examples 29 and 54) for 12 hours. The pellets were then incinerated in an electric oven at 550° C. for 24 hours and were heated for wet degradation after addition of concentrated sulfuric acid to the resulting ash. The obtained degradation solution was diluted. The copper content and the potassium content were determined by atomic absorption analysis (calibration curve method) of the diluted solution. The atomic absorption analyzer used was AA-6300 manufactured by Shimadzu Corporation.

Weight-Average Molecular Weight and Number-Average Molecular Weight

A solution used for measurement was obtained by dissolving 2.5 mg of the (b) amino group- or hydroxyl group-containing aliphatic compound, the (c) compound containing reactive functional group with amino group or hydroxyl group, or the (g) compound and/or its condensate in 4 ml of hexafluoroisopropanol (with addition of 0.005 N sodium trifluoroacetate) and filtering with a filter of 0.45 μm. The measurement conditions are below:

apparatus: gel permeation chromatography (GPC) (manufactured by Waters Corporation)

detector: differential refractometer Waters 410 (manufactured by Waters Corporation)

column: Shodex HFIP-806M (two)+HFIP-LG flow rate: 0.5 ml/min injected volume of sample: 0.1 ml temperature: 30° C.

calibration of molecular weight: poly(methyl methacrylate)

Amine Value

A 0.5 g to 1.5 g aliquot of the (b) amino group-containing aliphatic compound was precisely weighed and was dissolved in 50 ml of ethanol. Using a potentiometric titrator equipped with a pH electrode (AT-200 manufactured by KYOTO ELECTRONIC MANUFACTURING CO., LTD.), neutralization titration of this solution was performed with a 0.1 mol/L hydrochloric ethanolic solution. The inflection point of the pH curve was specified as the titration end point, and the amine value was calculated by Equation (5):

$$\text{amine value[mg KOH/g]}=(56.1\times V\times 0.1\times f)/W \quad (5)$$

(where W denotes the weighed amount of the amino group-containing aliphatic compound [g], V denotes the titration volume at the titration end point [ml] and f denotes the factor of 0.1 mol/L hydrochloric ethanolic solution.)

Hydroxyl Value

After 0.5 g of the (b) hydroxyl group-containing aliphatic compound or of the (g) compound and/or its condensate was weighed in a 250 ml Erlenmeyer flask, 20.00 ml of a mixed solution of acetic anhydride and anhydrous pyridine adjusted to the ratio of 1:10 (weight ratio) was added to the Erlenmeyer flask. The Erlenmeyer flask equipped with a reflux condenser was then refluxed with stirring in an oil bath controlled to temperature of 100° C. for 20 minutes and was then cooled down to room temperature. Subsequently 20 ml of acetone and 20 ml of distilled water were added to the Erlenmeyer flask through the condenser. The mixture was then titrated with a 0.5 ml/L potassium hydroxide ethanolic solution using a phenolphthalein indicator. The hydroxyl value was calculated according to Equation (6) by subtracting the measurement result of a separately measured blank (without including the sample):

$$\text{hydroxyl value[mg KOH/g]} = ((B-C) \times f \times 28.05)/S + D \quad (6)$$

(where B denotes the volume of the 0.5 mol/L potassium hydroxide ethanolic solution used for titration [ml], C denotes the volume of the 0.5 mol/L potassium hydroxide ethanolic solution used for titration of the blank [ml], f denotes the factor of the 0.5 mol/L potassium hydroxide ethanolic solution, S denotes the mass of the sample [g], and D denotes the acid value.) Reaction rate of (g) compound and/or its condensate After 0.035 g of the (g) compound and/or its condensate was dissolved in 0.7 ml of deuterated dimethyl sulfoxide as the solvent, $^1$H-NMR measurement was performed for the epoxy group and $^{13}$C-NMR for the carbodiimide group. The respective analysis conditions are below:

(1) $^1$H-NMR apparatus: nuclear magnetic resonance apparatus (JNM-AL400) manufactured by JEOL, Ltd;

solvent: deuterated dimethyl sulfoxide observation frequencies: OBFRZQ 399.65 MHz, OBSET 124.00 KHz, and OBFIN 10500.00 Hz cumulative number: 256 times (2) $^{13}$C-NMR apparatus: nuclear magnetic resonance apparatus (JNM-AL400) manufactured by JEOL, Ltd;

solvent: deuterated dimethyl sulfoxide observation frequencies: OBFRQ 100.40 MHz, OBSET 125.00 KHz, and OBFIN 10500.00 Hz cumulative number: 512 times The area of epoxy ring-derived peaks was determined from the obtained $^1$H-NMR spectrum, and the area of a carbodiimide group-derived peak was determined from the obtained $^{13}$C-NMR spectrum. The peak area was determined by integrating the areas of regions surrounded by the base line and the peaks using analysis software associated with the NMR apparatus. The reaction rate was calculated by Equation (4) below, where a denotes a peak area of the dry-blended mixture of a polyol and an epoxy group- or carbodiimide group-containing compound and b denotes a peak area of the (g) compound and/or its condensate.

$$\text{Reaction rate (\%)} = \{1-(b/a)\} \times 100 \quad (4)$$

As an example, FIG. 1 shows an $^1$H-NMR spectrum of a dry-blended mixture of dipentaerythritol and a bisphenol A-type epoxy resin "JER (registered trademark) 1004" manufactured by Mitsubishi Chemical Corporation at a weight ratio of 3 to 1. FIG. 2 shows an $^1$H-NMR spectrum of (g-7) compound and/or its condensate obtained in Reference Example 9. The total area of epoxy ring-derived peaks appearing at around 2.60 ppm and 2.80 ppm was determined from the $^1$H-NMR spectrum shown in FIG. 1. Similarly the total area of peaks shown in FIG. 2 was determined. The reaction rate was then calculated according to the equation of computation. The peak area was normalized by a peak area of a benzene ring-derived peak of the epoxy resin that does not contribute to the reaction.

Degree of Branching

The (b) amino group- or hydroxyl group-containing aliphatic compound, the (c) compound containing reactive functional group with amino group or hydroxyl group, or the (g) compound and/or its condensate was analyzed by $^{13}$C-NMR under the following conditions, and the degree of branching (DB) was calculated according to Equation (2). The degree of branching is defined by Equation (2):

$$\text{degree of branching} = (D+T)/(D+T+L) \quad (2)$$

In Equation (2), D represents the number of dendritic units, L represents the number of linear units, and T represents the number of terminal units. These values D, T and L may be calculated from integrated values of peak shifts measured by $^{13}$C-NMR. D is derived from tertiary or quaternary carbon atoms; T is derived from methyl group among primary carbon atoms; and L is derived from primary or secondary carbon atoms other than T. The peak area was determined by integrating the areas of regions surrounded by the base line and the peaks using analysis software associated with the NMR apparatus. The measurement conditions are below:

(1) $^{13}$C-NMR apparatus: nuclear magnetic resonance apparatus (JNM-AL400) manufactured by JEOL, Ltd;

solvent: deuterated dimethyl sulfoxide amount of sample measured/volume of solvent: 0.035 g/0.75 ml observation frequencies: OBFRQ 100.40 MHz, OBSET 125.00 KHz, and OBFIN 10500.00 Hz cumulative number: 512 times Total Number of OH and OR in Formula (1)

The number of OH was calculated according to Equation (3) below from the determined number-average molecular weight and the calculated hydroxyl value of the (g) compound and/or its condensate:

$$\text{Number of OH in Formula(1)} = (\text{number-average molecular weight} \times \text{hydroxyl value})/56110 \quad (3)$$

The number of OR was calculated by dividing the number-average molecular weight of the (g) compound and/or its condensate by the epoxy equivalent or the carbodiimide equivalent.

The number-average molecular weight and the hydroxyl value of the (g) compound and/or its condensate were measured by the methods described above. With regard to the epoxy equivalent, 400 mg of the (g) compound and/or its condensate was dissolved in 30 ml of hexafluoroisopropanol, and 20 ml of acetic acid and a tetraethylammonium bromide/acetic acid solution (=50 g/200 ml) were subsequently added. Using 0.1 N perchloric acid as the titrant and crystal violet as the indicator, the titration volume was measured when the color of the solution was changed from violet to bluish green. The epoxy equivalent was then calculated from this measured titration volume according to Equation (7) below:

$$\text{Epoxy equivalent [g/eq]} = W/((A-B) \times 0.1 \times f \times 0.001) \quad (7)$$

(where A denotes the volume of 0.1 N perchloric acid used for titration [ml], B denotes the volume of 0.1 N perchloric acid used for titration of the blank [ml], f denotes the factor of 0.1 N perchloric acid and W denotes the mass of the sample [g]).

The carbodiimide equivalent was calculated by the following procedure. A sheet was produced by thermally pressing a dry-blended mixture of 100 parts by weight of the (g) compound and/or its condensate and 30 parts by weight of potassium ferrocyanide (manufactured by Tokyo Chemical Industry Co., Ltd.) as the internal standard substance at about 200° C. for 1 minute. The infrared absorption spectrum of the sheet was then measured by the transmission method with an infrared spectrophotometer (IR Prestige-21/AIM8800 manufactured by Shimadzu Corporation). The measurement conditions were the resolution of 4 cm$^{-1}$ and the cumulative number of 32 times. In the infrared absorption spectrum by the transmission method, the absorbance is inversely proportional to the thickness of the sheet so that there is a need to normalize the peak intensity of the carbodiimide group using the internal standard peak. The absorbance of the carbodiimide group-derived peak appearing at around 2140 cm$^{-1}$ was divided by the absorbance of the absorption peak of CN group in potassium ferrocyanide appearing at around 2100 cm$^{-1}$. The carbodiimide equivalent was calculated from this value of division. For this purpose, IR measurement was performed in advance using samples having known carbodiimide equivalents. A calibration curve was provided using the ratio of the absorbance of the carbodiimide group-derived peak to the absorbance of the internal standard peak. The carbodiimide equivalent was then calculated by substituting the ratio of the absorbance of the (g) compound and/or its condensate in this calibration curve. An aliphatic polycarbodiimide ("CARBODILITE (registered trademark) LA-1" having the carbodiimide equivalent of 247 g/mol manufactured by Nisshinbo Chemical Inc.) and an aromatic polycarbodiimide ("STABAXOL (registered trademark) P" having the carbodiimide equivalent of 360 g/mol) manufactured by Rhein Chemie) were used as the samples having known carbodiimide equivalents.

Increase Rate in Concentration of Carboxyl Terminal Group after Heat Treatment

Pellets obtained in each of examples and comparative examples were dried under reduced pressure at 80° C. (at 120° C. in Examples 29 and 54) for 12 hours. An ASTM No. 1 dumbbell of 3.2 mm in thickness was produced by injection molding of these dried pellets using an injection molding machine (SG75H-MIV manufactured by Sumitomo Heavy Industries, Ltd) under the conditions of the cylinder temperature of the melting point of the (a) polyamide resin+15° C. and the mold temperature of 80° C. (160° C. in Examples 29 and 54). This dumbbell was processed in the atmosphere by heat treatment at 130° C. for 100 hours or at 190° C. for 9 hours. The heat-treated molded product was fixed on a stage of a milling machine (Type: H-0-1) manufactured by HOKOKU KOGYO Co., Ltd. and was vertically moved using a graduated handle (scale: 0.02 mm) configured to operate the stage in the vertical direction, so that the polyamide resin composition was cut from the surface of the molded product to the depth of 0.2 mm. About 0.50 g of the cut polyamide resin composition was precisely weighed in a 50 ml Erlenmeyer flask, and 20 ml of benzyl alcohol was added. The polyamide resin composition was then dissolved using an aluminum block heater controlled to the temperature of 195° C. The resulting solution was subjected to neutralization titration with 0.02 mol/L potassium hydroxide ethanolic solution using a phenolphthalein indicator. The concentration of the carboxyl terminal group in the polyamide resin composition was calculated according to Equation (8) below from the volume of the potassium hydroxide ethanolic solution added to change the color of the solution to violet:

$$\text{Concentration of carboxyl terminal group [mol/g]} = ((E-F) \times f \times 0.001 \times 0.02)/G \quad (8)$$

(where E denotes the volume of the 0.02 mol/L potassium hydroxide ethanolic solution used for titration [ml], F denotes the volume of the 0.02 mol/L potassium hydroxide ethanolic solution used for titration of the blank [ml], f denotes the factor of the 0.02 mol/L potassium hydroxide ethanolic solution, and G denotes the mass of the sample (except glass fiber) [g]).

The concentration of the carboxyl terminal group in the surface layer of the molded product prior to the heat treatment was similarly measured, and an increase rate in concentration of the carboxyl terminal group after the heat treatment was calculated according to Equation (9):

$$\begin{aligned}&\text{Increase rate in concentration of carboxyl terminal}\\&\text{group after heat treatment (\%)} = (\text{concentration}\\&\text{of carboxyl terminal group after heat treatment} -\\&\text{concentration of carboxyl terminal group before}\\&\text{heat treatment})/\text{concentration of carboxyl termi-}\\&\text{nal group before heat treatment} \times 100 \quad (9)\end{aligned}$$

Heat Aging Resistance Based on Tensile Strength

Pellets obtained in each of examples and comparative examples were dried under reduced pressure at 80° C. (at 120° C. in Examples 29 and 54) for 12 hours. An ASTM No. 1 dumbbell of 3.2 mm in thickness was produced by injection molding of these dried pellets using an injection molding machine (SG75H-MIV manufactured by Sumitomo Heavy Industries, Ltd) under the conditions of the cylinder temperature of the melting point of the (a) polyamide resin+15° C. and the mold temperature of 80° C. (160° C. in Examples 29 and 54). This test piece was subjected to a tensile test using a tension tester Tensilon UTA2.5T (manufactured by ORIENTEC Co., LTD.) at a crosshead speed of 10 mm/minute in conformity with ASTM D638. The measurement was repeated three times, and its average value was calculated as tensile strength before heat aging resistance test. The ASTM No. 1 dumbbell test piece was subsequently subjected to heat treatment (heat aging resistance test) at 135° C. in a gear oven in the atmosphere for 3000 hours or at 190° C. in a gear oven in the atmosphere for 2000 hours. The test piece after the treatment was subjected to the similar tensile test. The average value of three measurements was calculated as tensile strength after heat aging resistance test. The ratio of the tensile strength after heat aging resistance test to the tensile strength before aging resistance test was calculated as retention of tensile strength. The higher retention of tensile strength indicates the better heat aging resistance.

Surface Appearance

Pellets obtained in each of examples and comparative examples were dried under reduced pressure at 80° C. (at 120° C. in Examples 29 and 54) for 12 hours. A rectangular plate (film gate) of 80×80×3 mm in thickness was produced by injection molding of these dried pellets using an injection molding machine (SG75H-MIV manufactured by Sumitomo Heavy Industries, Ltd) under the conditions of the cylinder temperature of the melting point of the (a) polyamide resin+15° C., the mold temperature of 80° C. (160° C. in Examples 29 and 54), the injection/cooling time=10/10 seconds, the screw rotation speed of 150 rpm, the injection pressure of 100 MPa and the injection rate of 100 mm/second. The rectangular plate obtained was subjected to heat treatment at 140° C. under atmospheric pressure for 1 hour.

The surface condition of the rectangular plate after the treatment was visually observed and was evaluated according to the following criteria:

A: The molded product was white in color and had no bleeding observed on the surface;

B: The molded product was slightly bluish white or slightly reddish brown in color and had no bleeding observed on the surface;

C1: The molded product was bluish white or reddish brown in color and had no bleeding observed on the surface; and C2: The molded product was white in color and had bleeding observed on the surface. Bleeding means floating on the surface of the molded product. When the (b) amino group- or hydroxyl group-containing aliphatic compound or the (g) compound and/or its condensate is in the solid state at room temperature, the bleeding is in powdery form. When the (b) amino group- or hydroxyl group-containing aliphatic compound or the (g) compound and/or its condensate is in the liquid state at room temperature, the bleeding is in viscous liquid form.

Retention Stability

Pellets obtained in each of examples and comparative examples were dried under reduced pressure at 80° C. (at 120° C. in Examples 29 and 54) for 12 hours. The relative viscosity was measured after the dried pellets were retained in the molten state in a nitrogen atmosphere at the melting point of the (a) polyamide resin+20° C. for 30 minutes. A value of division of this measured relative viscosity by the relative viscosity before retention was calculated as the retention of relative viscosity. This was used as the index of retention stability. The retention of relative viscosity closer to 100% indicates the better retention stability.

Linear Expansion Coefficient

Pellets obtained in each of examples and comparative examples were dried under reduced pressure at 80° C. (at 120° C. in Examples 29 and 54) for 12 hours. A rectangular plate (film gate) of 80×80×3 mm in thickness was produced by injection molding of these dried pellets using an injection molding machine (SG75H-MIV manufactured by Sumitomo Heavy Industries, Ltd) under the conditions of the cylinder temperature of the melting point of the (a) polyamide resin+15° C., the mold temperature of 80° C. (160° C. in Examples 29 and 54) and the injection/cooling time=10/10 seconds. The rectangular plate was cut in the MD direction to 10 mm×5 mm×3 mm in thickness, was annealed at 150° C. for 2 hours, and was then subjected to a temperature increase from −40° C. to 150° C. at a rate of 5° C./minute using a thermomechanical analyzer TMA (manufactured by Seiko Instruments Inc.) The linear expansion coefficient was calculated according to ISO 11359 and was used as the index of dimensional accuracy. The smaller linear expansion coefficient indicates the better dimensional accuracy.

Chemical Resistance

Pellets obtained in each of examples and comparative examples were dried under reduced pressure at 80° C. (at 120° C. in Examples 29 and 54) for 12 hours. An ASTM No. 1 dumbbell of 3.2 mm in thickness was produced by injection molding of these dried pellets using an injection molding machine (SG75H-MIV manufactured by Sumitomo Heavy Industries, Ltd) under the conditions of the cylinder temperature of the melting point of the (a) polyamide resin+15° C. and the mold temperature of 80° C. (160° C. in Examples 29 and 54). After the test piece was heated at 130° C. for 1000 hours in an aqueous solution of 50% by volume of Toyota Genuine Super Long Life Coolant (LLC) having the ethylene glycol content of 88% by weight manufactured by Toyota Motor Corporation, the tensile strength of the test piece was measured in the same manner as the above heat aging resistance. The ratio of the tensile strength after heating to the tensile strength before heating was calculated as retention of tensile strength. This was used as the indication of chemical resistance. The higher retention of tensile strength indicates the better chemical resistance.

Creep Resistance

Pellets obtained in each of examples and comparative examples were dried under reduced pressure at 80° C. (at 120° C. in Examples 29 and 54) for 12 hours. An ASTM No. 1 dumbbell of 3.2 mm in thickness was produced by injection molding of these dried pellets using an injection molding machine (SG75H-MIV manufactured by Sumitomo Heavy Industries, Ltd) under the conditions of the cylinder temperature of the melting point of the (a) polyamide resin+15° C. and the mold temperature of 80° C. (160° C. in Examples 29 and 54). This test piece was placed in a six-seat creep test machine CP6-L-10 kN (manufactured by ORIENTEC Co., LTD.) in conformity with ASTM D674, and the strain was measured after treatment under a 50 MPa load at 130° C. for 300 hours. The lower strain indicates the better creep resistance.

Heat Aging Resistance Based on Impact Strength

Pellets obtained in each of examples and comparative examples were dried under reduced pressure at 80° C. for 12 hours. A test piece with mold notch of ⅛ inch in thickness was produced by injection molding of these dried pellets using an injection molding machine (SG75H-MIV manufactured by Sumitomo Heavy Industries, Ltd) under the conditions of the cylinder temperature of the melting point of the (a) polyamide resin+15° C. and the mold temperature of 80° C. This test piece was subjected to an impact test at 23° C. by an Izod impact test machine (Toyo Seiki Seisakusho, Ltd.) in conformity with ASTM D256. The measurement was repeated five times, and its average value was calculated as impact strength before heat aging resistance test. The test piece with mold notch was subsequently subjected to heat treatment (heat aging resistance test) at 135° C. in a gear oven in the atmosphere for 3000 hours or at 190° C. in a gear oven in the atmosphere for 2000 hours. The test piece after the treatment was subjected to the similar impact test. The average value of five measurements was calculated as impact strength after heat aging resistance test. The ratio of the impact strength after heat aging resistance test to the impact strength before aging resistance test was calculated as retention of impact strength. The higher retention of impact strength indicates the better heat aging resistance.

Fire Retardancy

Pellets obtained in each of examples and comparative examples were dried under reduced pressure at 80° C. for 12 hours. A test piece of 1/32 inch in thickness for evaluation of fire retardancy was produced by injection molding of these dried pellets using an injection molding machine (SG75H-MIV manufactured by Sumitomo Heavy Industries, Ltd) under the conditions of the cylinder temperature of the melting point of the (a) polyamide resin+15° C. and the mold temperature of 80° C. The fire retardancy of this test piece was evaluated according to the evaluation criteria specified in UL 94. The level of fire retardancy decreases in the sequence of V-0>V-1>V-2>HB.

Synthesis of Polyamide Resin

Reference Example 1 (Synthesis of (a-2) Nylon 410)

After 700 g of 410 salt that is an equimolar salt of tetramethylenediamine and sebacic acid, 21.2 g of a 10 wt % tetramethylenediamine aqueous solution (1.00 mol % relative to 410 salt) and 0.3065 g of sodium hypophosphite (0.05% by weight relative to the weight of the polymer produced) were placed in a polymerization tank, the polymerization tank was sealed, was nitrogen-substituted and was then heated. When the tank inner pressure reached 0.5 MPa, the tank was kept at the tank inner pressure of 0.5 MPa for 1.5 hours, while releasing water out of the system. The tank inner pressure was then returned to ordinary pressure over 10 minutes, and the reaction further proceeded under nitrogen flow for 1.5 hours to complete polymerization. The polymer was ejected in the form of strings from the polymerization tank, was pelletized and was vacuum dried at 80° C. for 24 hours, so that nylon 410 having $\eta r=2.84$ and the melting point of 252° C. was obtained.

Reference Example 2 (Synthesis of (a-4) Nylon 4T/6T=40/60 (Weight Ratio)

A 4T salt that is an equimolar salt of tetramethylenediamine and terephthalic acid and a 6T salt that is an equimolar salt of hexamethylenediamine and terephthalic acid were mixed at the weight ratio of 40 to 60. Excess amounts of 0.5 mol % tetramethylenediamine and hexamethylenediamine were added relative to the total aliphatic diamine. Subsequently 30 parts by weight of water was added and mixed with the total of 70 parts by weight of these raw materials. After the mixture was placed in a polymerization tank, the polymerization tank was sealed, was nitrogen-substituted and was then heated. When the tank inner pressure reached 2.0 MPa, the tank was kept at the tank inner pressure of 2.0 MPa and the tank inner temperature of 240° C. for 2 hours, while releasing water out of the system. The content was then discharged from the polymerization tank onto a cooling belt and was vacuum dried at 100° C. for 24 hours, so that polyamide resin oligomer was obtained. The obtained polyamide resin oligomer was crushed and dried and was subjected to solid phase polymerization at 50 Pa and 240° C., so that nylon 4T/6T=40/60 having $\eta r=2.48$ and the melting point of 336° C. was obtained.

Production of Master Batch Including Copper Compound and Potassium Compound (d-1: Nylon 66 Master Batch Having CuI/KI (Weight Ratio)=0.14)

After 2.0 parts by weight of copper iodide and 35.7 parts by weight of a 40% potassium iodide aqueous solution were premixed with 100 parts by weight of nylon 66 ("AMILAN (registered trademark) CM3001-N" manufactured by Toray Industries, Ltd.), the mixture was melt-kneaded using a twin-screw extruder TEX30 (L/D=45.5) manufactured by the Japan Steel Works, Ltd at the cylinder temperature of 275° C. and the screw rotation speed of 150 rpm and was pelletized with a strand cutter. The resulting pellets were vacuum dried at 80° C. for 8 hours, and master batch pellets having the copper content of 0.57 wt % were produced.

(d-2: Nylon 66 Master Batch Having CuI/KI (Weight Ratio)=0.16)

After 2.0 parts by weight of copper iodide and 31.3 parts by weight of a 40% potassium iodide aqueous solution were premixed with 100 parts by weight of nylon 66 ("AMILAN (registered trademark) CM3001-N" manufactured by Toray Industries, Ltd.), the mixture was melt-kneaded using a twin-screw extruder TEX30 (L/D=45.5) manufactured by the Japan Steel Works, Ltd at the cylinder temperature of 275° C. and the screw rotation speed of 150 rpm and was pelletized with a strand cutter. The resulting pellets were vacuum dried at 80° C. for 8 hours, and master batch pellets having the copper content of 0.58 wt % were produced.

(d-3: Nylon 66 Master Batch Having CuI/KI (Weight Ratio)=0.23)

After 2.0 parts by weight of copper iodide and 21.7 parts by weight of a 40% potassium iodide aqueous solution were premixed with 100 parts by weight of nylon 66 ("AMILAN (registered trademark) CM3001-N" manufactured by Toray Industries, Ltd.), the mixture was melt-kneaded using a twin-screw extruder TEX30 (L/D=45.5) manufactured by the Japan Steel Works, Ltd at the cylinder temperature of 275° C. and the screw rotation speed of 150 rpm and was pelletized with a strand cutter. The resulting pellets were vacuum dried at 80° C. for 8 hours, and master batch pellets having the copper content of 0.60 wt % were produced.

(d-4: Nylon 66 Master Batch Having CuI/KI (Weight Ratio)=0.31)

After 2.0 parts by weight of copper iodide and 16.1 parts by weight of a 40% potassium iodide aqueous solution were premixed with 100 parts by weight of nylon 66 ("AMILAN (registered trademark) CM3001-N" manufactured by Toray Industries, Ltd.), the mixture was melt-kneaded using a twin-screw extruder TEX30 (L/D=45.5) manufactured by the Japan Steel Works, Ltd at the cylinder temperature of 275° C. and the screw rotation speed of 150 rpm and was pelletized with a strand cutter. The resulting pellets were vacuum dried at 80° C. for 8 hours, and master batch pellets having the copper content of 0.62 wt % were produced.

Production of (g) Compound and/or its Condensate

Reference Example 3 (g-1)

After 10 parts by weight of phenol novolac-type modified epoxy resin ("EPPN (registered trademark) 201" manufactured by Nippon Kayaku Co., Ltd.) was premixed with 100 parts by weight of pentaerythritol (manufactured by Koei Chemical Company Limited), the mixture was melt-kneaded using a twin-screw extruder PCM30 manufactured by Ikegai Corp. at the cylinder temperature of 245° C. and the screw rotation speed of 100 rpm for 3.5 minutes and was pelletized with a hot cutter. The resulting pellets were supplied again to the extruder, and the process of melt-kneading and pelletizing under the same conditions as above (re-melt-kneading process) was performed once again to obtain pellets of a compound and/or its condensate expressed by Formula (1). The obtained compound had the reaction rate of 49%, the degree of branching of 0.27 and the hydroxyl value of 1530 mg KOH/g. The value of division of the molecular weight of pentaerythritol by the number of functional groups per molecule was 34, and the value of division of the molecular weight of phenol novolac-type modified epoxy resin by the number of functional groups per molecule was 190. The number of hydroxyl groups per molecule was greater than the number of epoxy groups per molecule, and the total number of OH and OR in Formula (1) was not less than 3.

Reference Example 4 (g-2)

After 10 parts by weight of phenol novolac-type modified epoxy resin ("EPPN (registered trademark) 201" manufactured by Nippon Kayaku Co., Ltd.) was premixed with 100 parts by weight of dipentaerythritol (manufactured by Koei Chemical Company Limited), the mixture was melt-kneaded using a twin-screw extruder PCM30 manufactured by Ikegai Corp. at the cylinder temperature of 200° C. and the screw rotation speed of 100 rpm for 3.5 minutes and was pelletized with a hot cutter. The resulting pellets were supplied again to the extruder, and the process of melt-kneading and pelletizing under the same conditions as above (re-melt-kneading process) was performed once again to obtain pellets of a compound and/or its condensate expressed by Formula (1). The obtained compound had the reaction rate of 53%, the degree of branching of 0.29 and the hydroxyl value of 1280 mg KOH/g. The value of division of the molecular weight of dipentaerythritol by the number of functional groups per molecule was 42. The number of hydroxyl groups per molecule was greater than the number of epoxy groups per molecule, and the total number of OH and OR in Formula (1) was not less than 3.

Reference Example 5 (g-3)

Pellets of a compound and/or its condensate expressed by Formula (1) were obtained by a procedure similar to that of Reference Example 4, except that the screw rotation speed of the twin-screw extruder was changed to 300 rpm and the melt-kneading time was changed to 0.9 minutes. The obtained compound had the reaction rate of 2%, the degree of branching of 0.15 and the hydroxyl value of 1350 mg KOH/g. The number of hydroxyl groups per molecule was greater than the number of epoxy groups per molecule, and the total number of OH and OR in Formula (1) was not less than 3.

Reference Example 6 (g-4)

Pellets of a compound and/or its condensate expressed by Formula (1) were obtained by a procedure similar to that of Reference Example 4, except that the screw rotation speed of the twin-screw extruder was changed to 200 rpm and the melt-kneading time was changed to 2.4 minutes. The obtained compound had the reaction rate of 15%, the degree of branching of 0.20 and the hydroxyl value of 1300 mg KOH/g. The number of hydroxyl groups per molecule was greater than the number of epoxy groups per molecule, and the total number of OH and OR in Formula (1) was not less than 3.

Reference Example 7 (g-5)

After 10 parts by weight of phenol novolac-type modified epoxy resin ("EPPN (registered trademark) 201" manufactured by Nippon Kayaku Co., Ltd.) and 0.3 parts by weight of 1,8-diazabicyclo(5,4,0)-undecene-7 (manufactured by Tokyo Chemical Industry Co., Ltd.) were premixed with 100 parts by weight of dipentaerythritol (manufactured by Koei Chemical Company Limited), the mixture was melt-kneaded using a twin-screw extruder PCM30 manufactured by Ikegai Corp. at the cylinder temperature of 200° C. and the screw rotation speed of 100 rpm for 3.5 minutes and was pelletized with a hot cutter. The resulting pellets were supplied to the extruder, and the process of melt-kneading and pelletizing under the same conditions as above (re-melt-kneading process) was performed six more times to obtain pellets of a compound and/or its condensate expressed by Formula (1). The obtained compound had the reaction rate of 96%, the degree of branching of 0.39 and the hydroxyl value of 1170 mg KOH/g. The number of hydroxyl groups per molecule was greater than the number of epoxy groups per molecule, and the total number of OH and OR in Formula (1) was not less than 3.

Reference Example 8 (g-6)

After 500 parts by weight of phenol novolac-type modified epoxy resin ("EPPN (registered trademark) 201" manufactured by Nippon Kayaku Co., Ltd.) was premixed with 100 parts by weight of dipentaerythritol (manufactured by Koei Chemical Company Limited), the mixture was melt-kneaded using a twin-screw extruder PCM30 manufactured by Ikegai Corp. at the cylinder temperature of 200° C. and the screw rotation speed of 100 rpm for 3.5 minutes and was pelletized with a hot cutter, so that pellets of a compound and/or its condensate expressed by Formula (1) were obtained. The obtained compound had the reaction rate of 33%, the degree of branching of 0.23 and the hydroxyl value of 540 mg KOH/g. The number of hydroxyl groups per molecule was less than the number of epoxy groups per molecule, and the total number of OH and OR in Formula (1) was not less than 3.

Reference Example 9 (g-7)

After 33.3 parts by weight of bisphenol A-type epoxy resin ("JER (registered trademark) 1004" manufactured by Mitsubishi Chemical Corporation) was premixed with 100 parts by weight of dipentaerythritol (manufactured by Koei Chemical Company Limited), the mixture was melt-kneaded using a twin-screw extruder PCM30 manufactured by Ikegai Corp. at the cylinder temperature of 200° C. and the screw rotation speed of 100 rpm for 3.5 minutes and was pelletized with a hot cutter. The resulting pellets were supplied again to the extruder, and the process of melt-kneading and pelletizing under the same conditions as above (re-melt-kneading process) was performed once again to obtain pellets of a compound and/or its condensate expressed by Formula (1). The obtained compound had the reaction rate of 56%, the degree of branching of 0.34 and the hydroxyl value of 1200 mg KOH/g. The value of division of the molecular weight of bisphenol A-type epoxy resin by the number of functional groups per molecule was 825. The number of hydroxyl groups per molecule was greater than the number of epoxy groups per molecule, and the total number of OH and OR in Formula (1) was not less than 3.

Reference Example 10 (g-8)

After 10 parts by weight of aliphatic polycarbodiimide ("CARBODILITE (registered trademark) LA-1" manufactured by Nisshinbo Chemical Inc.) was premixed with 100 parts by weight of dipentaerythritol (manufactured by Koei Chemical Company Limited), the mixture was melt-kneaded using a twin-screw extruder PCM30 manufactured by Ikegai Corp. at the cylinder temperature of 200° C. and the screw rotation speed of 100 rpm for 3.5 minutes and was pelletized with a hot cutter. The resulting pellets were supplied again to the extruder and were subjected to melt-kneading and pelletizing under the same conditions as above, so that pellets of a compound and/or its condensate expressed by Formula (1) were obtained. The obtained compound had the reaction rate of 89%, the degree of branching of 0.37 and the hydroxyl value of 1110 mg KOH/g. The value of division of the molecular weight of aliphatic polycarbodiimide by the number of functional groups per molecule was 247. The number of hydroxyl groups per molecule was greater than the number of carbodiimide groups per molecule, and the total number of OH and OR in Formula (1) was not less than 3.

Reference Example 11 (g'-1)

After 10 parts by weight of phenol novolac-type modified epoxy resin ("EPPN (registered trademark) 201" manufactured by Nippon Kayaku Co., Ltd.) was premixed with 100 parts by weight of diglycerol (manufactured by Sakamoto Yakuhin Kogyo Co., Ltd.), the mixture was melt-kneaded using a twin-screw extruder PCM30 manufactured by Ikegai Corp. at the cylinder temperature of 100° C. and the screw rotation speed of 100 rpm for 3.5 minutes and was pelletized with a hot cutter. The resulting pellets were supplied again to the extruder and were subjected to melt-kneading and pelletizing under the same conditions as above, so that pellets of a compound without the structure expressed by Formula (1) were obtained. The obtained compound had the reaction rate of 38%, the degree of branching of 0.02 and the hydroxyl value of 1240 mg KOH/g. The value of division of the molecular weight of diglycerol by the number of functional groups per molecule was 42. The number of hydroxyl groups per molecule was greater than the number of epoxy groups per molecule, and the total number of hydroxyl group and epoxy group was not less than 3.

Reference Example 12 (g'-2)

Pellets of a compound without the structure expressed by Formula (1) were obtained by a procedure similar to that of Reference Example 11, except 100 parts by weight of 1,4-butanediol (manufactured by Tokyo Chemical Industry Co., Ltd.) was used in place of diglycerol. The obtained compound had the reaction rate of 42%, the degree of branching of 0.03 and the hydroxyl value of 1160 mg KOH/g. The value of division of the molecular weight of 1,4-butanediol by the number of functional groups per molecule was 45. The number of hydroxyl groups per molecule was greater than the number of epoxy groups per molecule, and the total number of hydroxyl group and epoxy group was less than 3.

Reference Example 13 (g'-3)

Pellets of a compound without the structure expressed by Formula (1) were obtained by a procedure similar to that of Reference Example 11, except 100 parts by weight of polypropylene glycol ("UNIOL (registered trademark) D2000" manufactured by NOF CORPORATION) was used in place of diglycerol. The obtained compound had the reaction rate of 30%, the degree of branching of 0.01 and the hydroxyl value of 48 mg KOH/g. The value of division of the molecular weight of polypropylene glycol by the number of functional groups per molecule was 1000. The number of hydroxyl groups per molecule was less than the number of epoxy groups per molecule, and the total number of hydroxyl group and epoxy group was less than 3.

Production of Highly Concentrated Preliminary Reactant

Reference Example 14 (h-1)

After 26.7 parts by weight of the (g-2) compound was premixed with 100 parts by weight of nylon 66 ("AMILAN (registered trademark) CM3001-N" manufactured by Toray Industries, Ltd.), the mixture was melt-kneaded using a twin-screw extruder TEX30 (L/D=45.5) manufactured by the Japan Steel Works, Ltd at the cylinder temperature of 235° C. and the screw rotation speed of 150 rpm and was pelletized with a strand cutter. The resulting pellets were vacuum dried at 80° C. for 8 hours, and pellets of a highly concentrated preliminary reactant were produced.

The following shows (a) polyamide resins, (b) amino group- or hydroxyl group-containing aliphatic compounds, (c) compounds containing reactive functional group with amino group or hydroxyl group, (e) a filler, (f) heat stabilizers, (i) flame retardants, (j) auxiliary flame retardant, (k) impact resistance improver and (l) another additive used in Examples and Comparative Examples:

(a-1) nylon 66 resin ("AMILAN (registered trademark) CM3001-N" manufactured by Toray Industries, Ltd.) having the melting point of 260° C., $\eta r=2.78$.

(a-3) nylon 6 resin ("AMILAN (registered trademark) CM1010" manufactured by Toray Industries, Ltd.) having the melting point of 225° C., $\eta r=2.70$.

(b-1) trimethylolpropane polyoxypropylenetriamine ("JEFFAMINE (registered trademark) T403" manufactured by Huntsman Corporation) having three primary amines per molecule, the molecular weight of 440 and the amine value of 360 mg KOH/g.

(b-2) pentaethylenehexamine (manufactured by Tokyo Chemical Industry Co., Ltd.) having two primary amines and four secondary amines per molecule, the molecular weight of 232 and the amine value of 1260 mg KOH/g.

(b-3) trimethylolpropane (manufactured by Tokyo Chemical Industry Co., Ltd.) having three hydroxyl groups per molecule, the molecular weight of 134, and the hydroxyl value of 1256 mg KOH/g.

(b-4) pentaerythritol (manufactured by Tokyo Chemical Industry Co., Ltd.) having four hydroxyl groups per molecule, the molecular weight of 136, and the hydroxyl value of 1645 mg KOH/g.

(b-5) dipentaerythritol (manufactured by Tokyo Chemical Industry Co., Ltd.) having six hydroxyl groups per molecule, the molecular weight of 254, and the hydroxyl value of 1325 mg KOH/g.

(b-6) polyoxypropylenediamine ("JEFFAMINE (registered trademark) D2000" manufactured by Huntsman Corporation) having two primary amines per molecule, the molecular weight of 2000, and the amine value of 56 mg KOH/g.

(b-7) polyethertriamine ("JEFFAMINE (registered trademark) T5000" manufactured by Huntsman Corporation) having three primary amines per molecule, the molecular weight of 5000, and the amine value of 30 mg KOH/g.

(b-8) 2,2,4-trimethyl-1,3-pentadiol (manufactured by Tokyo Chemical Industry Co., Ltd.) having two hydroxyl groups per molecule, the molecular weight of 146 and the hydroxyl value of 765 mg KOH/g.

(b-9) 1,3,5-benzenetriol (manufactured by Tokyo Chemical Industry Co., Ltd.) having three hydroxyl groups per molecule, the molecular weight of 126 and the hydroxyl value of 1320 mg KOH/g.

(b-10) polyoxypropylene glyceryl ether ("UNIOL (registered trademark) TG-3000" manufactured by NOF CORPORATION) having three hydroxyl groups per molecule, the molecular weight of 3000, and the hydroxyl value of 44 mg KOH/g.

(b-11) 2,2-bis(hydroxymethyl)butyric acid (manufactured by Tokyo Chemical Industry Co., Ltd.) having two hydroxyl groups and one carboxyl group per molecule, the molecular weight of 148, and the hydroxyl value of 750 mg KOH/g.

(c-1) Phenol Novolac-Type Epoxy Resin

"EPPN (registered trademark) 201" manufactured by Nippon Kayaku Co., Ltd., having seven epoxy groups per molecular on average, the molecular weight of 1330 and the molecular weight/number of functional groups per molecule=190.

(c-2) Lauryl Alcohol (EO) 15 Glycidyl Ether

"DENACOL (registered trademark) EX-171" manufactured by Nagase ChemteX Corporation having one epoxy group per molecule, the molecular weight of 970 and the molecular weight/number of functional groups per molecule=970.

(c-3) Aliphatic Polycarbodiimide

"CARBODILITE (registered trademark) LA-1" manufactured by Nisshinbo Chemical Inc. having twenty-four carbodiimide groups per molecule on average, the molecular weight of 6000 and the molecular weight/number of functional groups per molecule=247.

(c-4) Aromatic Polycarbodiimide

"STABAXOL (registered trademark) P" manufactured by Rhein Chemie having nine carbodiimide groups per molecule on average, the molecular weight of 3000 and the molecular weight/number of functional groups per molecule=330.

(c-5) Bisphenol A-Type Epoxy Resin

"JER (registered trademark) 1004" manufactured by Mitsubishi Chemical Corporation having two epoxy groups per molecule, the molecular weight of 1650 and the molecular weight/number of functional groups per molecule=825.

(e-1) Glass Fiber Having Circular Cross Section (T-275H Manufactured by Nippon

Electric Glass Co., Ltd., diameter of cross section: 10.5 μm, surface treatment agent: silane coupling agent, fiber length: 3 mm)

(f-1) Hindered Phenolic Heat Stabilizer

"IRGANOX" (registered trademark) 1010 manufactured by BASF (tetrakis [methylene-3-(3',5'-di-t-butyl-4'-hydroxyphenyl)propionate] methane)

(f-2) Phosphorous Heat Stabilizer

"IRGAFOS" (registered trademark) 168 manufactured by BASF (tris(2,4-di-t-butylphenyl) phosphite)

(f-3) Sulfur Antioxidant

"ADK STAB" (registered trademark) AO412S manufactured by ADEKA CORPORATION (pentaerythritol tetrakis (3-lauryl thiopropionate))

(f-4) Amine Antioxidant

"NAUGARD" (registered trademark) 445 manufactured by Crompton (4,4'-bis(α,α-dimethylbenzyl)diphenylamine)

(i-1) Bromine-Based Flame Retardant brominated polyphenylene oxide ("PYROGUARD" (registered trademark) SR-460B manufactured by DKS Co., Ltd.)

(i-2) Phosphorus-Based Flame Retardant mixture containing 80% by weight of aluminum phosphinate ("EXOLIT" (registered trademark) OP-1312 manufactured by Clariant).

(j-1) antimony trioxide ("PATOX" (registered trademark) MK manufactured by NIHON SEIKO Co., Ltd>)

(k-1) maleic anhydride-modified ethylene-butene copolymer ("TAFMER" (registered trademark) MH-7010 manufactured by Mitsui Chemicals, Inc.)

(l-1) hydrotalcite ("KW" (registered trademark) 2100 manufactured by Khowa Chemical Industry Co., Ltd.)

Examples 1 to 22 and 27 to 30 and Comparative Examples 1 to 12

After the polyamide resin, the compound containing reactive functional group with amino group and hydroxyl group, the copper compound and the heat stabilizer shown in Tables were premixed, the mixture was fed from a main feeder of a twin-screw extruder TEX 30 (L/D=45) manufactured by the Japan Steel Works, Ltd at the cylinder temperature set to the melting point of the polyamide resin+15° C. and the screw rotation speed set to 200 rpm to the twin-screw main feeder and was melt-kneaded. The main feeder was connected at the position of 0 viewed from the upstream side on the assumption that the full length of the screw was 1.0, i.e., at the position of the upstream end of the screw segment. The amino group- or hydroxyl group-containing aliphatic compound and the filler shown in Tables were subsequently fed from a side feeder to the twin-screw extruder and were melt-kneaded. The side feeder was connected at the position of 0.65 viewed from the upstream side on the assumption that the full length of the screw was 1.0, i.e., at the position downstream of ½ of the screw length. The screw configuration of the twin-screw extruder was set such that Ln1/L was 0.14 and Ln2/L was 0.07, where Ln1 represents the total length of kneading zones located on the upstream side of the feeding position of the amino group- or hydroxyl group-containing aliphatic compound and Ln2 represents the total length of kneading zones located on the downstream side of the feeding position of the amino group- or hydroxyl group-containing aliphatic compound. There was a difference (Pkmax−Pfmin) between a minimum resin pressure Pfmin out of the resin pressures indicated by resin pressure gauges located in a plurality of full flight zones and a maximum resin pressure Pkmax out of the resin pressures indicated by the resin pressure gauges located in a plurality of kneading zones as shown in Tables. The strings ejected from the die were promptly cooled down in a water bath and pelletized with a strand cutter.

Example 23

Pellets of a polyamide resin composition were obtained under the same conditions as those of Example 2, except that the amino group- or hydroxyl group-containing aliphatic compound was fed from the main feeder to the twin-screw extruder. There was a difference (Pkmax−Pfmin) between Pfmin and Pkmax as shown in Table 6.

Example 24

Pellets of a polyamide resin composition were obtained under the same conditions as those of Example 2, except that the screw configuration of the twin-screw extruder was set to Ln1/L=0.01 and Ln2/L=0.01. There was a difference (Pkmax−Pfmin) between Pfmin and Pkmax as shown in Table 6.

Example 25

After the amino group- or hydroxyl group-containing aliphatic compound and the compound containing reactive functional group with amino group and hydroxyl group shown in Table 5 were premixed and placed in a recovery flask and was subjected to melting reaction in a nitrogen atmosphere at 250° C. for 1 hour. The obtained reactant was cooled down, and the solid substance was crushed with a hammer so that the crushed product of the (g) compound and/or its condensate expressed by Formula (1) was obtained. The obtained compound had the reactivation rate of 76%, the degree of branching of 0.34, and the hydroxyl value of 1180 mg KOH/g. The value of division of the molecular weight of phenol novolac-type modified epoxy resin by the number of functional groups per molecule was 190. The number of hydroxyl groups per molecule was greater than the number of epoxy groups per molecule, and the total number of OH and OR in Formula (1) was not less than 3. Pellets of a polyamide resin composition were obtained under the same conditions as those of Example 2, except that this crushed product was fed together with the polyamide resin from the main feeder to the twin-screw extruder. There was a difference (Pkmax−Pfmin) between Pfmin and Pkmax as shown in Table 6.

Example 26

Pellets of a polyamide resin composition were obtained under the same conditions as those of Example 3, except that no filler was added. These pellets were dried under reduced pressure at 80° C. for 12 hours as a master batch. Subsequently 36.6 parts by weight of the master batch and 66.7 parts by weight of the polyamide resin were fed from the main feeder to the twin-screw extruder and were melt-kneaded. The main feeder was connected at the position of 0 viewed from the upstream side on the assumption that the full length of the screw was 1.0, i.e., at the position of the upstream end of the screw segment. Subsequently, 44.9 parts by weight of the filler was fed from the side feeder to the twin-screw extruder and was melt-kneaded. The side feeder was connected at the position of 0.65 viewed from the upstream side on the assumption that the full length of the screw was 1.0, i.e., at the position downstream of ½ of the screw length. The respective components were accordingly included at the ratio in parts by weight shown in Table 5. The cylinder temperature, the screw rotation speed and the screw configuration were similar to those of Example 3. A difference (Pkmax−Pfmin) between Pfmin and Pkmax was calculated from the values of the resin pressure gauges when adding and melt-kneading the master batch and is shown in Table 6.

Examples 31 to 48 and 52 to 58 and Comparative Examples 13 to 19

After the (a) polyamide resin, the (d) copper compound, the (f) heat stabilizer, the (i) the flame retardant, the (j) auxiliary flame retardant, the (k) impact resistance improver and the (l) another additive shown in Tables were premixed, the mixture was fed from a main feeder of a twin-screw extruder TEX 30 (L/D=45) manufactured by the Japan Steel Works, Ltd at the cylinder temperature set to the melting point of the polyamide resin+15° C. and the screw rotation speed set to 200 rpm to the twin-screw main feeder and was melt-kneaded. The main feeder was connected at the position of 0 viewed from the upstream side on the assumption that the full length of the screw was 1.0, i.e., at the position of the upstream end of the screw segment. The (g) or (g') compound and/or its condensate and the (e) filler shown in Tables were subsequently fed from a side feeder to the twin-screw extruder and were melt-kneaded. The side feeder was connected at the position of 0.65 viewed from the upstream side on the assumption that the full length of the screw was 1.0, i.e., at the position downstream of ½ of the screw length. The screw configuration of the twin-screw extruder was set such that Ln1/L was 0.14 and Ln2/L was 0.07, where Ln1 represents the total length of kneading zones located on the upstream side of the feeding position of the (g) compound and/or its condensate and Ln2 represents the total length of kneading zones located on the downstream side of the feeding position of the (g) compound and/or its condensate. There was a difference (Pkmax−Pfmin) between a minimum resin pressure Pfmin out of the resin pressures indicated by resin pressure gauges located in a plurality of full flight zones and a maximum resin pressure Pkmax out of the resin pressures indicated by the resin pressure gauges located in a plurality of kneading zones as shown in Tables. The strings ejected from the die were promptly cooled down in a water bath and pelletized with a strand cutter.

Example 49

Pellets of a polyamide resin composition were obtained under the same conditions as those of Example 32, except that the (g) compound and/or its condensate was fed from the main feeder to the twin-screw extruder. There was a difference (Pkmax−Pfmin) between Pfmin and Pkmax as shown in Table 14.

Example 50

Pellets of a polyamide resin composition were obtained under the same conditions as those of Example 32, except that the screw configuration of the twin-screw extruder was set to Ln1/L=0.01 and Ln2/L=0.01. There was a difference (Pkmax−Pfmin) between Pfmin and Pkmax as shown in Table 14.

Example 51

Pellets of a polyamide resin composition were obtained under the same conditions as those of Example 32, except that the (h) highly concentrated preliminary reactant was fed from the main feeder to the twin-screw extruder. The composition ratio of Example 51 was accordingly the same as that of Example 32. The cylinder temperature, the screw rotation speed and the screw configuration were similar to those of Example 32. A difference (Pkmax−Pfmin) between Pfmin and Pkmax was calculated from the values of the resin pressure gauges when adding and melt-kneading the highly concentrated preliminary reactant and is shown in Table 16.

The evaluation results of the respective Examples and Comparative Examples are shown in Tables 1 to 18.

TABLE 1

| | | | EX 1 | EX 2 | EX 3 | EX 4 | EX 5 |
|---|---|---|---|---|---|---|---|
| Polyamide resin | (a-1) nylon 66 | parts by weight | 100 | 100 | 100 | 100 | 100 |
| | (a-2) nylon 410 (Reference Example 1) | parts by weight | — | — | — | — | — |
| | (a-3) nylon 8 | parts by weight | — | — | — | — | — |
| | (a-4) nylon 4T/6T = 40/60 (Reference Example 2) | parts by weight | — | — | — | — | — |
| Amino group- or hydroxyl group-containing aliphatic compound | (b-1) trimethylolpropane polyoxypropylenetriamine | parts by weight | — | — | — | 3 | — |
| | (b-2) pentaethylenehexamine | parts by weight | — | — | — | — | 1 |
| | (b-3) trimethylolpropane | parts by weight | — | — | — | — | — |
| | (b-4) pentaerythritol | parts by weight | — | — | — | — | — |
| | (b-5) dipentaerythritol | parts by weight | 1 | 3 | 9 | — | — |

TABLE 1-continued

| | | | | | | | |
|---|---|---|---|---|---|---|---|---|
| | (b-6) polyoxypropylenediamine | parts by weight | — | — | — | — | — |
| | (b-7) polyethertriamine | parts by weight | — | — | — | — | — |
| | (b-8) 2,2,4-trimethyl-1,3-pentadiol | parts by weight | — | — | — | — | — |
| | (b-9) 1,3,5-benzenetriol | parts by weight | — | — | — | — | — |
| | (b-10) polyoxypropylene glyceryl ether | parts by weight | — | — | — | — | — |
| | (b-11) 2,2-bis (hydroxymethyl) butyric acid | parts by weight | — | — | — | — | — |
| Compound containing reactive functional group with amino group and hydroxyl group | (c-1) phenol novolac-type epoxy resin | parts by weight | 0.1 | 0.3 | 0.9 | 0.3 | 0.1 |
| | (c-2) lauryl alcohol(EO) 15 glycidyl ether | parts by weight | — | — | — | — | — |
| | (c-3) aliphatic polycathodiimide | parts by weight | — | — | — | — | — |
| | (c-4) aromatic polycarbodiimide | parts by weight | — | — | — | — | — |
| | (c-5) bisphenol A-type epoxy resin | parts by weight | — | — | — | — | — |
| Copper compound | (d-1) nylon 66 master batch cotaining CuI/KI = 0.14 | parts by weight | — | — | — | — | — |
| | (d-2) nylon 66 master batch cotaining CuI/KI = 0.16 | parts by weight | — | — | — | — | — |
| | (d-3) nylon 66 master batch cotaining CuI/KI = 0.23 | parts by weight | — | — | — | — | — |
| | (d-4) nylon 66 master batch cotaining CuI/KI = 0.31 | parts by weight | — | — | — | — | — |
| Filler | (e-1) glass fiber | parts by weight | 44.9 | 44.9 | 44.9 | 44.9 | 44.9 |
| Heat stabilizer | (f-1) Irganox1010 | parts by weight | — | — | — | — | — |
| | (f-2) Irgafos168 | parts by weight | — | — | — | — | — |
| | (f-3) Adkstab AO412S | parts by weight | — | — | — | — | — |
| | (f-4) Neugard445 | parts by weight | — | — | — | — | — |

| | | | Ex 6 | EX 7 | EX 8 | EX 9 | EX 10 |
|---|---|---|---|---|---|---|---|
| Polyamide resin | (a-1) nylon 66 | parts by weight | 100 | 100 | 100 | 100 | 100 |
| | (a-2) nylon 410 (Reference Example 1) | parts by weight | — | — | — | — | — |
| | (a-3) nylon 8 | parts by weight | — | — | — | — | — |
| | (a-4) nylon 4T/6T = 40/60 (Reference Example 2) | parts by weight | — | — | — | — | — |
| Amino group- or hydroxyl group-containing aliphatic compound | (b-1) trimethylolpropane polyoxypropylenetriamine | parts by weight | — | — | — | — | — |
| | (b-2) pentaethylenehexamine | parts by weight | — | — | — | — | — |
| | (b-3) trimethylolpropane | parts by weight | 3 | — | — | — | — |
| | (b-4) pentaerythritol | parts by weight | — | 3 | — | — | — |
| | (b-5) dipentaerythritol | parts by weight | — | — | — | — | 3 |
| | (b-6) polyoxypropylenediamine | parts by weight | — | — | — | — | — |
| | (b-7) polyethertriamine | parts by weight | — | — | 3 | — | — |
| | (b-8) 2,2,4-trimethyl-1,3-pentadiol | parts by weight | — | — | — | — | — |
| | (b-9) 1,3,5-benzenetriol | parts by weight | — | — | — | — | — |
| | (b-10) polyoxypropylene glyceryl ether | parts by weight | — | — | — | 3 | — |
| | (b-11) 2,2-bis (hydroxymethyl) butyric acid | parts by weight | — | — | — | — | — |
| Compound containing reactive functional group with amino group and hydroxyl group | (c-1) phenol novolac-type epoxy resin | parts by weight | 0.3 | 0.3 | 0.3 | 0.3 | — |
| | (c-2) lauryl alcohol(EO) 15 glycidyl ether | parts by weight | — | — | — | — | — |
| | (c-3) aliphatic polycathodiimide | parts by weight | — | — | — | — | 0.3 |
| | (c-4) aromatic polycarbodiimide | parts by weight | — | — | — | — | — |
| | (c-5) bisphenol A-type epoxy resin | parts by weight | — | — | — | — | — |
| Copper compound | (d-1) nylon 66 master batch cotaining CuI/KI = 0.14 | parts by weight | — | — | — | — | — |
| | (d-2) nylon 66 master batch cotaining CuI/KI = 0.16 | parts by weight | — | — | — | — | — |
| | (d-3) nylon 66 master batch cotaining CuI/KI = 0.23 | parts by weight | — | — | — | — | — |
| | (d-4) nylon 66 master batch cotaining CuI/KI = 0.31 | parts by weight | — | — | — | — | — |
| Filler | (e-1) glass fiber | parts by weight | 44.9 | 44.9 | 44.9 | 44.9 | 44.9 |
| Heat stabilizer | (f-1) Irganox1010 | parts by weight | — | — | — | — | — |
| | (f-2) Irgafos168 | parts by weight | — | — | — | — | — |
| | (f-3) Adkstab AO412S | parts by weight | — | — | — | — | — |
| | (f-4) Neugard445 | parts by weight | — | — | — | — | — |

TABLE 2

| | | EX 1 | EX 2 | EX 3 | EX 4 | EX 5 |
|---|---|---|---|---|---|---|
| Melting point of (a) polyamide resin | ° C. | 280 | 260 | 260 | 260 | 260 |
| Number of amino groups or number of hydroxyl groups per molecular of (b) amino group- or hydroxyl group-containing aliphatic component | — | 5 | 8 | 5 | 3 | 6 |
| Amine value of (b) amino group- or hydroxyl group-containing aliphatic compound | mgKOH/g | — | — | — | 360 | 1260 |
| Hydroxyl value of (b) amino group- or hydroxyl group-containing aliphatic compound | mgKOH/g | 1325 | 1325 | 1325 | — | — |
| Number of functional groups per molecular of (c) compound containing reactive functional group with amino group and hydroxyl group | — | 7 | 7 | 7 | 7 | 7 |
| Molecular weight of (c) compound containing reactive functional group with amino group and hydroxyl group | — | 1330 | 1330 | 1330 | 1330 | 1330 |
| Carboxyl terminal group | Concentration of carboxyl terminal group of polyamide resin composition before heat treatment | $\times 10^{-3}$ mol/g | 5.7 | 5.8 | 6.2 | 6.1 | 6.4 |
| | Concentration of carboxy terminal group of polyamide resin composition after heat treatment of 130° C. × 100 hr | $\times 10^{-5}$ mol/g | 7.6 | 6.8 | 7.4 | 7.4 | 7.7 |
| | Rate of increase in concentration of carboxyl terminal group of polyamide resin composition by heat treatment of 130° C. | % | 33 | 17 | 20 | 21 | 21 |

TABLE 2-continued

| | | | | | | | |
|---|---|---|---|---|---|---|---|
| | Concentration of carboxyl terminal group of polyamide resin composition after heat treatment of 190° C. × 9 hr | ×10⁻⁵ mol/g | 9.2 | 8.5 | 9.1 | 10.1 | 10.6 |
| | Rate of increase in concentration of carboxyl terminal group of polyamide resin composition by heat treatment of 190° C. | % | 62 | 47 | 47 | 66 | 66 |
| Copper content in composition | | ppm | — | — | — | — | — |
| Ratio of copper content/potassium content in composition | | — | — | — | — | — | — |
| Extruder feed position of (c) compound containing reactive functional group with amino group and hydroxyl group | | — | 0.0 | 0.0 | 0.0 | 0.0 | 0.0 |
| Extruder feed position of (b) amino group- or hydroxyl group-containing aliphatic compound | | — | 0.65 | 0.65 | 0.65 | 0.65 | 0.65 |
| Pkmax-Pfmin | | MPa | 1.3 | 1.3 | 1.2 | 1.1 | 1.0 |
| Heat aging resistance | Tensile strength retention after treatment of 135° C. × 3000 hr | % | 92 | 98 | 94 | 94 | 94 |
| | Tensile strength retention after treatment of 190° C. × 2000 hr | % | 75 | 82 | 82 | 74 | 74 |
| Retention stability | Relative viscosity of polyamide resin composition before retention in molten state | — | 2.78 | 2.78 | 2.75 | 2.75 | 2.74 |
| | Relative viscosity of polyamide resin composition after retention in molten state | — | 2.78 | 2.75 | 2.70 | 2.71 | 2.89 |
| | Relative viscosity retention | % | 99 | 99 | 98 | 99 | 98 |
| Dimensional accuracy | Linear expansion coefficient (MD direction, −40° C.-160° C.) | ×10⁵/° C. | 1.8 | 1.4 | 1.8 | 1.6 | 1.6 |
| Chemical resistance | Tensile strength retention after treatment of 130° C. × 1000 hr with 50% LLC aqueous solution | % | 80 | 65 | 60 | 51 | 61 |
| Creep resistance | Strain under application of load of 50 MPa at 130° C. × 300 hr | % | 2.0 | 1.5 | 2.0 | 1.7 | 1.7 |
| Surface appearance | | — | A | A | A | A | A |

| | | | EX 6 | EX 7 | EX 8 | EX 9 | EX 10 |
|---|---|---|---|---|---|---|---|
| Melting point of (a) polyamide resin | | ° C. | 260 | 260 | 260 | 260 | 260 |
| Number of amino groups or number of hydroxyl groups per molecular of (b) amino group- or hydroxyl group-containing aliphatic component | | — | 3 | 4 | 3 | 3 | 8 |
| Amine value of (b) amino group- or hydroxyl group-containing aliphatic compound | | mgKOH/g | — | — | 30 | — | — |
| Hydroxyl value of (b) amino group- or hydroxyl group-containing aliphatic compound | | mgKOH/g | 1256 | 1545 | — | 44 | 1325 |
| Number of functional groups per molecular of (c) compound containing reactive functional group with amino group and hydroxyl group | | — | 7 | 7 | 7 | 7 | 24 |
| Molecular weight of (c) compound containing reactive functional group with amino group and hydroxyl group | | — | 1330 | 1330 | 1330 | 1330 | 6000 |
| Carboxyl terminal group | Concentration of carboxyl terminal group of polyamide resin composition before heat treatment | ×10⁻⁵ mol/g | 5.3 | 5.2 | 5.4 | 5.6 | 5.0 |
| | Concentration of carboxy terminal group of polyamide resin composition after heat treatment of 130° C. × 100 hr | ×10⁻⁵ mol/g | 5.9 | 6.1 | 7.5 | 7.7 | 6.3 |
| | Rate of increase in concentration of carboxyl terminal group of polyamide resin composition by heat treatment of 130° C. | % | 30 | 18 | 38 | 40 | 25 |
| | Concentration of carboxyl terminal group of polyamide resin composition after heat treatment of 190° C. × 9 hr | ×10⁻⁵ mol/g | 8.1 | 7.8 | 8.9 | 9.1 | 7.4 |
| | Rate of increase in concentration of carboxyl terminal group of polyamide resin composition by heat treatment of 190° C. | % | 53 | 50 | 65 | 55 | 48 |
| Copper content in composition | | ppm | — | — | — | — | — |
| Ratio of copper content/potassium content in composition | | — | — | — | — | — | — |
| Extruder feed position of (c) compound containing reactive functional group with amino group and hydroxyl group | | — | 0.0 | 0.0 | 0.0 | 0.0 | 0.0 |
| Extruder feed position of (b) amino group- or hydroxyl group-containing aliphatic compound | | — | 0.65 | 0.65 | 0.65 | 0.65 | 0.65 |
| Pkmax-Pfmin | | MPa | 1.3 | 1.3 | 1.3 | 1.3 | 1.5 |
| Heat aging resistance | Tensile strength retention after treatment of 135° C. × 3000 hr | % | 92 | 96 | 88 | 88 | 93 |
| | Tensile strength retention after treatment of 190° C. × 2000 hr | % | 80 | 81 | 74 | 74 | 82 |
| Retention stability | Relative viscosity of polyamide resin composition before retention in molten state | — | 2.78 | 2.78 | 2.78 | 2.78 | 2.82 |
| | Relative viscosity of polyamide resin composition after retention in molten state | — | 2.76 | 2.75 | 2.73 | 2.74 | 2.85 |
| | Relative viscosity retention | % | 99 | 99 | 98 | 99 | 101 |
| Dimensional accuracy | Linear expansion coefficient (MD direction, −40° C.-160° C.) | ×10⁵/° C. | 1.9 | 1.4 | 2.4 | 2.5 | 1.4 |
| Chemical resistance | Tensile strength retention after treatment of 130° C. × 1000 hr with 50% LLC aqueous solution | % | 59 | 65 | 55 | 55 | 62 |
| Creep resistance | Strain under application of load of 50 MPa at 130° C. × 300 hr | % | 2.0 | 1.5 | 2.3 | 2.4 | 1.3 |
| Surface appearance | | — | A | A | A | A | A |

TABLE 3

| | | | EX 11 | EX 12 | EX 13 | EX 14 | EX 15 |
|---|---|---|---|---|---|---|---|
| Polyamide resin | (a-1) nylon 66 | parts by weight | 100 | 100 | 100 | 100 | 100 |
| | (a-2) nylon 410 (Reference Example 1) | parts by weight | — | — | — | — | — |
| | (a-3) nylon 5 | parts by weight | — | — | — | — | — |
| | (a-4) nylon 4T/6T = 40/60 (Reference Example 2) | parts by weight | — | — | — | — | — |
| Amino group- or hydroxyl group-containing aliphatic compound | (b-1) trimethylolpropane polyoxypropylenetriamine | parts by weight | — | — | — | 3 | — |
| | (b-2) pentaethylenehexamine | parts by weight | — | — | — | — | — |
| | (b-3) trimethylolpropane | parts by weight | — | — | — | — | — |
| | (b-4) pentaerythtritol | parts by weight | — | — | — | — | — |
| | (b-5) dipentaerythritol | parts by weight | 3 | 3 | 3 | — | 3 |
| | (b-6) polyoxypropylenediamine | parts by weight | — | — | — | — | — |
| | (b-7) polyethertriamine | parts by weight | — | — | — | — | — |
| | (b-8) 2,2,4-trimethyl-1,3-pentadiol | parts by weight | — | — | — | — | — |
| | (b-9) 1,3,5-benzenetriol | parts by weight | — | — | — | — | — |
| | (b-10) polyoxypropylene glyceryl ether | parts by weight | — | — | — | — | — |
| | (b-11) 2,2-bis (hydroxymethyl) butyric acid | parts by weight | — | — | — | — | — |
| Compound containing reactive functional group with amino group and hydroxyl group | (c-1) phenol novolac-type epoxy resin | parts by weight | — | 0.03 | 2.5 | — | 0.3 |
| | (c-2) lauryl alcohol(EO) 15 glycidyl ether | parts by weight | — | — | — | — | — |
| | (c-3) aliphatic polycarbodiimide | parts by weight | — | — | — | 0.3 | — |
| | (c-4) aromatic polycarbodiimide | parts by weight | 0.3 | — | — | — | — |
| | (c-5) bisphenol A-type epoxy resin | parts by weight | — | — | — | — | — |
| Copper compound | (d-1) nylon 66 master batch containing CuI/KI = 0.14 | parts by weight | — | — | — | — | 2.55 |
| | (d-2) nylon 66 master batch containing CuI/KI = 0.16 | parts by weight | — | — | — | — | — |
| | (d-3) nylon 66 master batch containing CuI/KI = 0.23 | parts by weight | — | — | — | — | — |
| | (d-4) nylon 66 master batch containing CuI/KI = 0.31 | parts by weight | — | — | — | — | — |
| Filler | (e-1) glass fiber | parts by weight | 44.9 | 44.9 | 44.9 | 44.9 | 44.9 |
| Heat stabilizer | (f-1) Irganox1010 | parts by weight | — | — | — | — | — |
| | (f-2) Irgafos168 | parts by weight | — | — | — | — | — |
| | (f-3) Adkstab A04125 | parts by weight | — | — | — | — | — |
| | (f-4) Neugard445 | parts by weight | — | — | — | — | — |

| | | | EX 16 | EX 17 | EX 18 | EX 19 | EX 20 |
|---|---|---|---|---|---|---|---|
| Polyamide resin | (a-1) nylon 66 | parts by weight | 100 | 100 | 100 | 100 | 100 |
| | (a-2) nylon 410 (Reference Example 1) | parts by weight | — | — | — | — | — |
| | (a-3) nylon 5 | parts by weight | — | — | — | — | — |
| | (a-4) nylon 4T/6T = 40/60 (Reference Example 2) | parts by weight | — | — | — | — | — |
| Amino group- or hydroxyl group-containing aliphatic compound | (b-1) trimethylolpropane polyoxypropylenetriamine | parts by weight | — | — | — | — | — |
| | (b-2) pentaethylenehexamine | parts by weight | — | — | — | — | — |
| | (b-3) trimethylolpropane | parts by weight | — | — | — | — | — |
| | (b-4) pentaerythtritol | parts by weight | — | — | — | — | — |
| | (b-5) dipentaerythritol | parts by weight | 3 | 3 | 3 | 3 | 3 |
| | (b-6) polyoxypropylenediamine | parts by weight | — | — | — | — | — |
| | (b-7) polyethertriamine | parts by weight | — | — | — | — | — |
| | (b-8) 2,2,4-trimethyl-1,3-pentadiol | parts by weight | — | — | — | — | — |
| | (b-9) 1,3,5-benzenetriol | parts by weight | — | — | — | — | — |
| | (b-10) polyoxypropylene glyceryl ether | parts by weight | — | — | — | — | — |
| | (b-11) 2,2-bis (hydroxymethyl) butyric acid | parts by weight | — | — | — | — | — |
| Compound containing reactive functional group with amino group and hydroxyl group | (c-1) phenol novolac-type epoxy resin | parts by weight | 0.3 | 0.3 | 0.3 | 0.3 | 0.3 |
| | (c-2) lauryl alcohol(EO) 15 glycidyl ether | parts by weight | — | — | — | — | — |
| | (c-3) aliphatic polycarbodiimide | parts by weight | — | — | — | — | — |
| | (c-4) aromatic polycarbodiimide | parts by weight | — | — | — | — | — |
| | (c-5) bisphenol A-type epoxy resin | parts by weight | — | — | — | — | — |
| Copper compound | (d-1) nylon 66 master batch containing CuI/KI = 0.14 | parts by weight | — | — | — | — | — |
| | (d-2) nylon 66 master batch containing CuI/KI = 0.16 | parts by weight | 2.55 | — | — | 0.6 | 6.38 |
| | (d-3) nylon 66 master batch containing CuI/KI = 0.23 | parts by weight | — | 2.55 | — | — | — |
| | (d-4) nylon 66 master batch containing CuI/KI = 0.31 | parts by weight | — | — | 2.55 | — | — |
| Filler | (e-1) glass fiber | parts by weight | 44.9 | 44.9 | 44.9 | 44.9 | 44.9 |
| Heat stabilizer | (f-1) Irganox1010 | parts by weight | — | — | — | — | — |
| | (f-2) Irgafos168 | parts by weight | — | — | — | — | — |
| | (f-3) Adkstab A04125 | parts by weight | — | — | — | — | — |
| | (f-4) Neugard445 | parts by weight | — | — | — | — | — |

TABLE 4

| | | EX 11 | EX 12 | EX 13 | EX 14 | EX 15 |
|---|---|---|---|---|---|---|
| Melting point of (a) polyamide resin | ° C. | 260 | 260 | 260 | 280 | 280 |
| Number of amino groups or number of hydroxyl groups per molecular of (b) amino group- or hydroxyl group-containing aliphatic compound | — | — | 6 | 6 | 6 | 3 | 6 |
| Amine value of (b) amino group- or hydroxyl group-containing aliphatic compound | mgKOH/g | — | — | — | 360 | — |
| Hydroxyl value of (b) amino group- or hydroxyl group-containing aliphatic compound | mgKOH/g | 1325 | 1325 | 1325 | — | 1325 |
| Number of functional groups per molecular of (c) compound containing reactive funtional group with amino group and hydroxyl group | — | 9 | 7 | 7 | 24 | 7 |

TABLE 4-continued

|  |  |  |  |  |  |  |  |
|---|---|---|---|---|---|---|---|
| Molecular weight of (c) compound containing reactive fuctional group with amino group and hydroxyl group | | — | 3000 | 1330 | 1330 | 6000 | 1330 |
| Carboxyl terminal group | Concentraion of carboxyl terminal group of polyamide resin composition before heat treatment | ×10⁻³ mol/g | 5.5 | 6.1 | 4.9 | 5.5 | 5.7 |
| | Concentration of carboxyl terminal group of polyamide resin compositon after heat treatment of 130° C. × 100 hr | ×10⁻⁵ mol/g | 7.4 | 9.0 | 5.1 | 7.4 | 6.4 |
| | Rate of increase in concentration of carboxyl terminal group of polyamide resin composition by heat treatment of 130° C. | % | 34 | 47 | 5 | 34 | 12 |
| | Concentration of carboxyl terminal group of polyamide resin composition after heat treatment of 190° C. × 9 hr | ×10⁻⁵ mol/g | 8.4 | 10.1 | 7.4 | 9.1 | 8.4 |
| | Rate of increase in concentration of carboxyl terminal group of polyamide resin composition by heat treatment of 190° C. | % | 53 | 68 | 51 | 88 | 47 |
| Copper content in composition | | ppm | — | — | — | — | 98 |
| Ratio of copper content/potassium content in composition | | — | — | — | — | — | 0.20 |
| Extruder feed position of (c) compound containing reactive functional group with amino group and hydroxyl group | | — | 0.0 | 0.0 | 0.0 | 0.0 | 0.0 |
| Extruder feed position of (b) amino group- or hydroxyl group-containing alphatic compound | | — | 0.85 | 0.85 | 0.65 | 0.85 | 0.65 |
| Pkmax-Pfmin | | MPa | 1.4 | 1.0 | 1.8 | 1.4 | 1.3 |
| Heat aging resistance | Tensile strength retention after treatment of 135° C. × 3000 hr | % | 93 | 91 | 92 | 93 | 97 |
| | Tensile strength retention after treatment of 190° C. × 2000 hr | % | 80 | 74 | 81 | 74 | 84 |
| Retention stability | Relative viscosity of polyamide resin composition before retention in molten state | — | 2.80 | 2.76 | 2.84 | 2.78 | 2.78 |
| | Relative viscosity of polyamide resin composition after retention in molten state | — | 2.80 | 2.66 | 2.89 | 2.72 | 2.75 |
| | Relative viscosity retention | % | 100 | 96 | 102 | 98 | 99 |
| Dimensional Accuracy | Linear expansion coefficient (MD direction, −40° C.-150° C. | ×10⁻⁵/° C. | 1.5 | 2.5 | 1.0 | 1.8 | 1.3 |
| Chemical resistance | Tensile strength retention after treatment of 130° C. × 1000 hr with 50% LLC aqueous solution | % | 62 | 57 | 73 | 60 | 67 |
| Creep resistance | Strain under application of load of 50 MPa at 130° C. × 300 hr | % | 1.4 | 2.8 | 1.0 | 1.8 | 1.4 |
| Surface appearance | | — | A | A | A | A | B |

|  |  |  | EX 16 | EX 17 | EX 18 | EX 19 | EX 20 |
|---|---|---|---|---|---|---|---|
| Melting point of (a) polyamide resin | | ° C. | 260 | 260 | 260 | 260 | 260 |
| Number of amino groups or number of hydroxyl groups per molecular of (b) amino group- or hydroxyl group-containing aliphatic compound | | — | 8 | 6 | 6 | 6 | 8 |
| Amine value of (b) amino group- or hydroxyl group-containing aliphatic compound | | mgKOH/g | — | — | — | — | — |
| Hydroxyl value of (b) amino group- or hydroxyl group-containing aliphatic compound | | mgKOH/g | 1325 | 1325 | 1325 | 1325 | 1325 |
| Number of functional groups per molecular of (c) compound containing reactive funtional group with amino group and hydroxyl group | | — | 7 | 7 | 7 | 7 | 7 |
| Molecular weight of (c) compound containing reactive fuctional group with amino group and hydroxyl group | | — | 13330 | 1330 | 13330 | 1330 | 13330 |
| Carboxyl terminal group | Concentraion of carboxyl terminal group of polyamide resin composition before heat treatment | ×10⁻³ mol/g | 5.8 | 5.8 | 5.5 | 5.8 | 5.8 |
| | Concentration of carboxyl terminal group of polyamide resin compositon after heat treatment of 130° C. × 100 hr | ×10⁻⁵ mol/g | 5.9 | 6.4 | 6.1 | 6.7 | 5.7 |
| | Rate of increase in concentration of carboxyl terminal group of polyamide resin composition by heat treatment of 130° C. | % | 5 | 10 | 10 | 16 | 2 |
| | Concentration of carboxyl terminal group of polyamide resin composition after heat treatment of 190° C. × 9 hr | ×10⁻⁵ mol/g | 8.0 | 8.2 | 7.7 | 8.5 | 8.2 |
| | Rate of increase in concentration of carboxyl terminal group of polyamide resin composition by heat treatment of 190° C. | % | 42 | 41 | 40 | 47 | 47 |
| Copper content in composition | | ppm | 98 | 101 | 105 | 23 | 239 |
| Ratio of copper content/potassium content in composition | | — | 0.23 | 0.33 | 0.44 | 0.23 | 0.23 |
| Extruder feed position of (c) compound containing reactive functional group with amino group and hydroxyl group | | — | 0.0 | 0.0 | 0.0 | 0.0 | 0.0 |
| Extruder feed position of (b) amino group- or hydroxyl group-containing alphatic compound | | — | 0.85 | 0.65 | 0.85 | 0.65 | 0.65 |
| Pkmax-Pfmin | | MPa | 1.3 | 1.3 | 1.3 | 1.3 | 1.4 |
| Heat aging resistance | Tensile strength retention after treatment of 135° C. × 3000 hr | % | 100 | 99 | 97 | 97 | 98 |
| | Tensile strength retention after treatment of 190° C. × 2000 hr | % | 86 | 85 | 84 | 83 | 83 |
| Retention stability | Relative viscosity of polyamide resin composition before retention in molten state | — | 2.78 | 2.78 | 2.78 | 2.78 | 2.78 |
| | Relative viscosity of polyamide resin composition after retention in molten state | — | 2.75 | 2.75 | 2.75 | 2.75 | 2.75 |
| | Relative viscosity retention | % | 99 | 99 | 99 | 99 | 99 |
| Dimensional Accuracy | Linear expansion coefficient (MD direction, −40° C.-150° C. | ×10⁻⁵/° C. | 0.9 | 1.0 | 1.3 | 1.3 | 1.0 |
| Chemical resistance | Tensile strength retention after treatment of 130° C. × 1000 hr with 50% LLC aqueous solution | % | 70 | 69 | 67 | 67 | 68 |
| Creep resistance | Strain under application of load of 50 MPa at 130° C. × 300 hr | % | 1.0 | 1.2 | 1.4 | 1.4 | 1.4 |
| Surface appearance | | — | A | A | B | A | C1 |

TABLE 5

|  |  |  | EX 21 | EX 22 | EX 23 | EX 24 | EX 25 |
|---|---|---|---|---|---|---|---|
| Polyamide resin | (a-1) nylon 66 | parts by weight | 100 | 100 | 100 | 100 | 100 |
|  | (a-2) nylon 410 (Reference Example 1) | parts by weight | — | — | — | — | — |
|  | (a-3) nylon 6 | parts by weight | — | — | — | — | — |
|  | (a-4) nylon 4T/6T = 40/60 (Reference Example 2) | parts by weight | — | — | — | — | — |
| Amino group- or hydroxyl group- containing alphatic compound | (b-1) trimethylolpropane polyoxypropylenetriamine | parts by weight | — | — | — | — | — |
|  | (b-2) pentaethylenehexamine | parts by weight | — | — | — | — | — |
|  | (b-3) trimethylolpropane | parts by weight | — | — | — | — | — |
|  | (b-4) pentaerythritol | parts by weight | — | — | — | — | — |
|  | (b-5) dipentaerythritol | parts by weight | 3 | 3 | 3 | 3 | 3 |
|  | (b-6) polyoxypropylenediamine | parts by weight | — | — | — | — | — |
|  | (b-7) polyehtertriamine | parts by weight | — | — | — | — | — |
|  | (b-8) 2,2,4-trimethyl-1,3-pentiadol | parts by weight | — | — | — | — | — |
|  | (b-9) 1,3,5-benzentriol | parts by weight | — | — | — | — | — |
|  | (b-10) polyoxypropylene glyceryl ether | parts by weight | — | — | — | — | — |
|  | (b-11) 2,2-bis (hydroxymethyl) butyric acid | parts by weight | — | — | — | — | — |
| Compound containing reactive functional group with amino group and hydroxyl group | (c-1) phenol novolac-type epoxy resin | parts by weight | 0.3 | 0.3 | 0.3 | 0.3 | 0.3 |
|  | (c-2) lauryl alcohol (EO) 15 glycidyl ether | parts by weight | — | — | — | — | — |
|  | (c-3) aliphatic polycarbodiimide | parts by weight | — | — | — | — | — |
|  | (c-4) aromatic polycarbodiimide | parts by weight | — | — | — | — | — |
|  | (c-5) bisphenol A-type epoxy resin | parts by weight | — | — | — | — | — |
| Copper compound | (d-1) nylon 66 master batch containing CuI/KI = 0.14 | parts by weight | — | — | — | — | — |
|  | (d-2) nylon 66 master batch containing CuI/KI = 0.16 | parts by weight | — | — | — | — | — |
|  | (d-3) nylon 66 master batch containing CuI/KI = 0.23 | parts by weight | — | — | — | — | — |
|  | (d-4) nylon 66 master batch containing CuI/KI = 0.31 | parts by weight | — | — | — | — | — |
| Filler | (e-1) glass fiber | parts by weight | 44.9 | 44.9 | 44.9 | 44.9 | 44.9 |
| Heat stabilizer | (f-4) Irganox1010 | parts by weight | 0.58 | — | — | — | — |
|  | (f-2) Irgafos168 | parts by weight | 0.58 | — | — | — | — |
|  | (f-3) Adkstab AO412S | parts by weight | — | 0.56 | — | — | — |
|  | (f-4) Naugard445 | parts by weight | — | 0.56 | — | — | — |

|  |  |  | EX 26 | EX 27 | EX 28 | EX 29 | EX 30 |
|---|---|---|---|---|---|---|---|
| Polyamide resin | (a-1) nylon 66 | parts by weight | 100 | — | — | — | 100 |
|  | (a-2) nylon 410 (Reference Example 1) | parts by weight | — | 100 | — | — | — |
|  | (a-3) nylon 6 | parts by weight | — | — | 100 | — | — |
|  | (a-4) nylon 4T/6T = 40/60 (Reference Example 2) | parts by weight | — | — | — | 100 | — |
| Amino group- or hydroxyl group- containing alphatic compound | (b-1) trimethylolpropane polyoxypropylenetriamine | parts by weight | — | — | — | — | — |
|  | (b-2) pentaethylenehexamine | parts by weight | — | — | — | — | — |
|  | (b-3) trimethylolpropane | parts by weight | — | — | — | — | — |
|  | (b-4) pentaerythritol | parts by weight | — | — | — | — | — |
|  | (b-5) dipentaerythritol | parts by weight | 3 | 3 | 3 | 3 | 3 |
|  | (b-6) polyoxypropylenediamine | parts by weight | — | — | — | — | — |
|  | (b-7) polyehtertriamine | parts by weight | — | — | — | — | — |
|  | (b-8) 2,2,4-trimethyl-1,3-pentiadol | parts by weight | — | — | — | — | — |
|  | (b-9) 1,3,5-benzentriol | parts by weight | — | — | — | — | — |
|  | (b-10) polyoxypropylene glyceryl ether | parts by weight | — | — | — | — | — |
|  | (b-11) 2,2-bis (hydroxymethyl) butyric acid | parts by weight | — | — | — | — | — |
| Compound containing reactive functional group with amino group and hydroxyl group | (c-1) phenol novolac-type epoxy resin | parts by weight | 0.3 | 0.3 | 0.3 | 0.3 | 0.3 |
|  | (c-2) lauryl alcohol (EO) 15 glycidyl ether | parts by weight | — | — | — | — | — |
|  | (c-3) aliphatic polycarbodiimide | parts by weight | — | — | — | — | — |
|  | (c-4) aromatic polycarbodiimide | parts by weight | — | — | — | — | — |
|  | (c-5) bisphenol A-type epoxy resin | parts by weight | — | — | — | — | 7 |
| Copper compound | (d-1) nylon 66 master batch containing CuI/KI = 0.14 | parts by weight | — | — | — | — | — |
|  | (d-2) nylon 66 master batch containing CuI/KI = 0.16 | parts by weight | — | — | — | — | — |
|  | (d-3) nylon 66 master batch containing CuI/KI = 0.23 | parts by weight | — | — | — | — | — |
|  | (d-4) nylon 66 master batch containing CuI/KI = 0.31 | parts by weight | — | — | — | — | — |
| Filler | (e-1) glass fiber | parts by weight | 44.9 | 44.9 | 44.9 | 44.9 | 44.9 |
| Heat stabilizer | (f-4) Irganox1010 | parts by weight | — | — | — | — | — |
|  | (f-2) Irgafos168 | parts by weight | — | — | — | — | — |
|  | (f-3) Adkstab AO412S | parts by weight | — | — | — | — | — |
|  | (f-4) Naugard445 | parts by weight | — | — | — | — | — |

TABLE 6

|  |  | EX 21 | EX 22 | EX 23 | EX 24 | EX 25 |
|---|---|---|---|---|---|---|
| Melting point of (a) polyamide resin | ° C. | 280 | 280 | 280 | 260 | 280 |
| Number of amino groups or number of hydroxyl groups per molecular of (b) amino group- or hydroxyl group-containing aliphatic compound | — | 8 | 6 | 6 | 6 | 6 |

TABLE 6-continued

|  |  |  |  |  |  |  |  |
|---|---|---|---|---|---|---|---|
| Amine value of (b) amino group- or hydroxyl group-containing aliphatic compound | mgKOH/g | — | — | — | — | — |
| Hydroxyl value of (b) amino group- or hydroxyl group-containing aliphatic compound | mgKOH/g | 1325 | 1325 | 1325 | 1325 | 1325 |
| Number of functional groups per molecular of (c) compound containing reactive funtional group with amino group and hydroxyl group | — | 7 | 7 | 7 | 7 | 7 |
| Molecular weight of (c) compound containing reactive fuctional group with amino group and hydroxyl group | — | 1330 | 1330 | 1330 | 1330 | 1330 |
| Carboxyl terminal group | Concentraion of carboxyl terminal group of polyamide resin composition before heat treatment | $\times 10^{-3}$ mol/g | 5.7 | 5.5 | 6.7 | 5.9 | 6.0 |
|  | Concentration of carboxyl terminal group of polyamide resin compositon after heat treatment of 130° C. × 100 hr | $\times 10^{-5}$ mol/g | 6.7 | 6.4 | 8.6 | 7.7 | 6.0 |
|  | Rate of increase in concentration of carboxyl terminal group of polyamide resin composition by heat treatment of 130° C. | % | 17 | 17 | 28 | 30 | 0 |
|  | Concentration of carboxyl terminal group of polyamide resin composition after heat treatment of 190° C. × 9 hr | $\times 10^{-5}$ mol/g | 8.4 | 8.1 | 10.7 | 9.2 | 6.4 |
|  | Rate of increase in concentration of carboxyl terminal group of polyamide resin composition by heat treatment of 190° C. | % | 47 | 48 | 60 | 58 | 6 |
| Copper content in composition |  | ppm | — | — | — | — | — |
| Ratio of copper content/potassium content in composition |  | — | — | — | — | — | — |
| Extruder feed position of (c) compound containing reactive functional group with amino group and hydroxyl group |  | — | 0.0 | 0.0 | 0.0 | 0.0 | 0.0 |
| Extruder feed position of (b) amino group- or hydroxyl group-containing alphatic compound |  | — | 0.65 | 0.65 | 0.00 | 0.65 | 0.0 |
| Pkmax-Pfmin |  | MPa | 1.3 | 1.3 | 0.8 | 0.2 | 1.1 |
| Heat aging resistance | Tensile strength retention after treatment of 135° C. × 3000 hr | % | 102 | 101 | 90 | 91 | 102 |
|  | Tensile strength retention after treatment of 190° C. × 2000 hr | % | 84 | 84 | 78 | 79 | 95 |
| Retention stability | Relative viscosity of polyamide resin composition before retention in molten state | — | 2.78 | 2.78 | 2.68 | 2.75 | 2.75 |
|  | Relative viscosity of polyamide resin composition after retention in molten state | — | 2.75 | 2.75 | 2.53 | 2.72 | 2.77 |
|  | Relative viscosity retention | % | 99 | 99 | 98 | 99 | 100 |
| Dimensional Accuracy | Linear expansion coefficient (MD direction, −40° C.-150° C. | $\times 10^{-5}$/° C. | 1.4 | 1.4 | 2.0 | 1.9 | 0.9 |
| Chemical resistance | Tensile strength retention after treatment of 130° C. × 1000 hr with 50% LLC aqueous solution | % | 65 | 85 | 62 | 60 | 71 |
| Creep resistance | Strain under application of load of 50 MPa at 130° C. × 300 hr | % | 1.5 | 1.5 | 1.8 | 1.8 | 0.9 |
| Surface appearance |  | — | A | A | A | A | A |

|  |  |  | EX 26 | EX 27 | EX 28 | EX 29 | EX 30 |
|---|---|---|---|---|---|---|---|
| Melting point of (a) polyamide resin |  | ° C. | 260 | 252 | 225 | 236 | 260 |
| Number of amino groups or number of hydroxyl groups per molecular of (b) amino group- or hydroxyl group-containing aliphatic compound |  | — | 6 | 6 | 6 | 6 | 6 |
| Amine value of (b) amino group- or hydroxyl group-containing aliphatic compound | mgKOH/g | — | — | — | — | — |
| Hydroxyl value of (b) amino group- or hydroxyl group-containing aliphatic compound | mgKOH/g | 1325 | 1325 | 1325 | 1325 | 1325 |
| Number of functional groups per molecular of (c) compound containing reactive funtional group with amino group and hydroxyl group | — | 7 | 7 | 7 | 7 | 2 |
| Molecular weight of (c) compound containing reactive fuctional group with amino group and hydroxyl group | — | 1330 | 1330 | 1330 | 1330 | 1650 |
| Carboxyl terminal group | Concentraion of carboxyl terminal group of polyamide resin composition before heat treatment | $\times 10^{-3}$ mol/g | 8.0 | 6.1 | 5.7 | 9.4 | 5.8 |
|  | Concentration of carboxyl terminal group of polyamide resin compositon after heat treatment of 130° C. × 100 hr | $\times 10^{-5}$ mol/g | 6.3 | 7.1 | 7.3 | 13.3 | 8.4 |
|  | Rate of increase in concentration of carboxyl terminal group of polyamide resin composition by heat treatment of 130° C. | % | 5 | 16 | 28 | 41 | 45 |
|  | Concentration of carboxyl terminal group of polyamide resin composition after heat treatment of 190° C. × 9 hr | $\times 10^{-5}$ mol/g | 8.3 | 9.0 | 8.8 | 15.0 | 9.3 |
|  | Rate of increase in concentration of carboxyl terminal group of polyamide resin composition by heat treatment of 190° C. | % | 38 | 48 | 55 | 60 | 60 |
| Copper content in composition |  | ppm | — | — | — | — | — |
| Ratio of copper content/potassium content in composition |  | — | — | — | — | — | — |
| Extruder feed position of (c) compound containing reactive functional group with amino group and hydroxyl group |  | — | 0.0 | 0.0 | 0.0 | 0.0 | 0.0 |
| Extruder feed position of (b) amino group- or hydroxyl group-containing alphatic compound |  | — | 0.65 | 0.85 | 0.65 | 0.65 | 0.65 |
| Pkmax-Pfmin |  | MPa | 1.4 | 1.3 | 1.2 | 0.7 | 1.4 |
| Heat aging resistance | Tensile strength retention after treatment of 135° C. × 3000 hr | % | 103 | 96 | 90 | 89 | 89 |
|  | Tensile strength retention after treatment of 190° C. × 2000 hr | % | 87 | 82 | 79 | 77 | 77 |
| Retention stability | Relative viscosity of polyamide resin composition before retention in molten state | — | 2.77 | 2.72 | 2.75 | 2.41 | 2.76 |
|  | Relative viscosity of polyamide resin composition after retention in molten state | — | 2.72 | 2.72 | 2.75 | 2.24 | 2.84 |
|  | Relative viscosity retention | % | 98 | 100 | 100 | 93 | 103 |
| Dimensional Accuracy | Linear expansion coefficient (MD direction, −40° C.-150° C. | $\times 10^{-5}$/° C. | 0.8 | 1.4 | 1.8 | 2.3 | 1.5 |
| Chemical resistance | Tensile strength retention after treatment of 130° C. × 1000 hr with 50% LLC aqueous solution | % | 71 | 85 | 63 | 70 | 61 |
| Creep resistance | Strain under application of load of 50 MPa at 130° C. × 300 hr | % | 1.0 | 1.3 | 2.3 | 2.6 | 1.7 |
| Surface appearance |  | — | A | A | A | A | A |

TABLE 7

|  |  |  | COMP EX 1 | COMP EX 2 | COMP EX 3 | COMP EX 4 | COMP EX 5 | COMP EX 6 |
|---|---|---|---|---|---|---|---|---|
| Polyamide resin | (a-1) nylon 66 | parts by weight | 100 | 100 | 100 | 100 | 100 | 100 |
|  | (a-2) nylon 410 (Reference Example 1) | parts by weight | — | — | — | — | — | — |
|  | (a-3) nylon 6 | parts by weight | — | — | — | — | — | — |
|  | (a-4) nylon 4T/6T = 40/60 (Reference Example 2) | parts by weight | — | — | — | — | — | — |
| Amino group- or hydroxyl group- containing alphatic compound | (b-1) trimethylolpropane polyoxypropylenetriamine | parts by weight | — | — | — | — | — | — |
|  | (b-2) pentaethylenehexamine | parts by weight | — | — | — | — | — | — |
|  | (b-3) trimethylolpropane | parts by weight | — | — | — | — | — | — |
|  | (b-4) pentaerythritol | parts by weight | — | — | — | — | — | — |
|  | (b-5) dipentaerythritol | parts by weight | 3 | 12 | — | — | — | 3 |
|  | (b-6) polyoxypropylenediamine | parts by weight | — | — | 3 | — | — | — |
|  | (b-7) polyehtertriamine | parts by weight | — | — | — | 3 | — | — |
|  | (b-8) 2,2,4-trimethyl-1,3-pentiadol | parts by weight | — | — | — | — | 3 | — |
|  | (b-9) 1,3,5-benzentriol | parts by weight | — | — | — | — | — | — |
|  | (b-10) polyoxypropylene glyceryl ether | parts by weight | — | — | — | — | — | — |
|  | (b-11) 2,2-bis (hydroxymethyl) butyric acid | parts by weight | — | — | — | — | — | — |
| Compound containing reactive functional group with amino group and hydroxyl group | (c-1) phenol novolac-type epoxy resin | parts by weight | — | 0.12 | 0.3 | 0.3 | 0.3 | — |
|  | (c-2) lauryl alcohol (EO) 15 glycidyl ether | parts by weight | — | — | — | — | — | 0.3 |
|  | (c-3) aliphatic polycarbodiimide | parts by weight | — | — | — | — | — | — |
|  | (c-4) aromatic polycarbodiimide | parts by weight | — | — | — | — | — | — |
|  | (c-5) bisphenol A-type epoxy resin | parts by weight | — | — | — | — | — | — |
| Copper compound | (d-1) nylon 66 master batch containing CuI/KI = 0.14 | parts by weight | — | — | — | — | — | — |
|  | (d-2) nylon 66 master batch containing CuI/KI = 0.16 | parts by weight | — | — | — | — | — | — |
|  | (d-3) nylon 66 master batch containing CuI/KI = 0.23 | parts by weight | — | — | — | — | — | — |
|  | (d-4) nylon 66 master batch containing CuI/KI = 0.31 | parts by weight | — | — | — | — | — | — |
| Filler | (e-1) glass fiber | parts by weight | 44.9 | 44.9 | 44.9 | 44.9 | 44.9 | 44.9 |
| Heat stabilizer | (f-4) Irganox1010 | parts by weight | — | — | — | — | — | — |
|  | (f-2) Irgafos168 | parts by weight | — | — | — | — | — | — |
|  | (f-3) Adkstab AO412S | parts by weight | — | — | — | — | — | — |
|  | (f-4) Naugard445 | parts by weight | — | — | — | — | — | — |

TABLE 8

|  |  | COMP EX 1 | COMP EX 2 | COMP EX 3 | COMP EX 4 | COMP EX 5 | COMP EX 6 |
|---|---|---|---|---|---|---|---|
| Melting point of (a) polyamide resin | °C. | 260 | 260 | 260 | 260 | 280 | 260 |
| Number of amino groups or number of hydroxyl groups per molecular of (b) amino group- or hydroxyl group-containing aliphatic compound | — | 6 | 6 | 2 | 2 | 3 | 6 |
| Amine value of (b) amino group- or hydroxyl group-containing aliphatic compound | mgKOH/g | — | — | 56 | — | — | — |
| Hydroxyl value of (b) amino group- or hydroxyl group-containing aliphatic compound | mgKOH/g | 1325 | 1325 | — | 765 | 128 | 1325 |
| Number of functional groups per molecular of (c) compound containing reactive funtional group with amino group and hydroxyl group | — | — | 7 | 7 | 7 | 7 | 1.0 |
| Molecular weight of (c) compound containing reactive fuctional group with amino group and hydroxyl group | — | — | 1330 | 1330 | 1330 | 1330 | 970 |
| Carboxyl terminal group | Concentraion of carboxyl terminal group of polyamide resin composition before heat treatment | $\times 10^{-3}$ mol/g | 6.5 | 8.8 | 6.1 | 8.0 | 5.9 | 5.8 |
|  | Concentration of carboxyl terminal group of polyamide resin compositon after heat treatment of 130° C. × 100 hr | $\times 10^{-5}$ mol/g | 21.5 | 19.2 | 17.1 | 15.6 | 15.7 | 18.1 |
|  | Rate of increase in concentration of carboxyl terminal group of polyamide resin composition by heat treatment of 130° C. | % | 230 | 118 | 180 | 160 | 166 | 212 |
|  | Concentration of carboxyl terminal group of polyamide resin composition after heat treatment of 190° C. × 9 hr | $\times 10^{-5}$ mol/g | 12.6 | 17.8 | 15.3 | 14.6 | 14.1 | 11.3 |
|  | Rate of increase in concentration of carboxyl terminal group of polyamide resin composition by heat treatment of 190° C. | % | 94 | 102 | 150 | 144 | 139 | 94 |

TABLE 8-continued

|  |  |  | COMP EX 1 | COMP EX 2 | COMP EX 3 | COMP EX 4 | COMP EX 5 | COMP EX 6 |
|---|---|---|---|---|---|---|---|---|
| Copper content in composition | | ppm | — | — | — | — | — | — |
| Ratio of copper content/potassium content in composition | | | — | — | — | — | — | — |
| Extruder feed position of (c) compound containing reactive functional group with amino group and hydroxyl group | | | — | — | 0.0 | 0.0 | 0.0 | 0.0 | 0.0 |
| Extruder feed position of (b) amino group- or hydroxyl group- containing alphatic compound | | | — | 0.65 | 0.65 | 0.65 | 0.65 | 0.65 | 0.65 |
| Pkmax-Pfmin | | MPa | 0.9 | 0.7 | 1.1 | 1.1 | 1.2 | 0.9 |
| Heat aging resistance | Tensile strength retention after treatment of 135° C. × 3000 hr | % | 40 | 61 | 48 | 45 | 52 | 47 |
| | Tensile strength retention after treatment of 190° C. × 2000 hr | % | 60 | 58 | 38 | 41 | 44 | 60 |
| Retention stability | Relative viscosity of polyamide resin composition before retention in molten state | — | — | 2.72 | 2.56 | 2.75 | 2.78 | 2.75 | 2.76 |
| | Relative viscosity of polyamide resin composition after retention in molten state | — | — | 2.39 | 2.32 | 2.66 | 2.68 | 2.68 | 2.44 |
| | Relative viscosity retention | % | 88 | 91 | 97 | 97 | 97 | 88 |
| Dimensional Accuracy | Linear expansion coefficient (MD direction, −40° C.-150° C. | ×10$^{-5}$/° C. | 7.3 | 4.9 | 6.8 | 6.5 | 6.3 | 6.8 |
| Chemical resistance | Tensile strength retention after treatment of 130° C. × 1000 hr with 50% LLC aqueous solution | % | 20 | 27 | 19 | 21 | 27 | 23 |
| Creep resistance | Strain under application of load of 50 MPa at 130° C. × 300 hr | % | 8.8 | 6.2 | 5.1 | 5.1 | 4.8 | 6.9 |
| Surface appearance | | — | — | C2 | C2 | A | A | A | C2 |

TABLE 9

|  |  |  | COMP EX 7 | COMP EX 8 | COMP EX 9 | COMP EX 10 | COMP EX 11 | COMP EX 12 |
|---|---|---|---|---|---|---|---|---|
| Polyamide resin | (a-1) nylon 66 | parts by weight | 100 | 100 | 100 | 100 | 100 | 100 |
| | (a-2) nylon 410 (Reference Example 1) | parts by weight | — | — | — | — | — | — |
| | (a-3) nylon 6 | parts by weight | — | — | — | — | — | — |
| | (a-4) nylon 4T/6T = 40/60 (Reference Example 2) | parts by weight | — | — | — | — | — | — |
| Amino group- or hydroxyl group- containing alphatic compound | (b-1) trimethylolpropane polyoxypropylenetriamine | parts by weight | — | — | — | 3 | — | — |
| | (b-2) pentaethylenehexamine | parts by weight | — | — | — | — | — | — |
| | (b-3) trimethylolpropane | parts by weight | — | — | — | — | — | — |
| | (b-4) pentaerythritol | parts by weight | — | — | — | — | — | — |
| | (b-5) dipentaerythritol | parts by weight | — | 3 | 3 | — | — | — |
| | (b-6) polyoxypropylenediamine | parts by weight | — | — | — | — | — | — |
| | (b-7) polyehtertriamine | parts by weight | — | — | — | — | — | — |
| | (b-8) 2,2,4-trimethyl-1,3-pentiadol | parts by weight | — | — | — | — | — | — |
| | (b-9) 1,3,5-benzentriol | parts by weight | — | — | — | — | — | — |
| | (b-10) polyoxypropylene glyceryl ether | parts by weight | — | — | — | — | — | — |
| | (b-11) 2,2-bis (hydroxymethyl) butyric acid | parts by weight | — | — | — | — | — | 3 |
| Compound containing reactive functional group with amino group and hydroxyl group | (c-1) phenol novolac-type epoxy resin | parts by weight | 0.3 | — | — | — | — | — |
| | (c-2) lauryl alcohol (EO) 15 glycidyl ether | parts by weight | — | — | — | — | — | — |
| | (c-3) aliphatic polycarbodiimide | parts by weight | — | — | — | — | — | — |
| | (c-4) aromatic polycarbodiimide | parts by weight | — | — | — | — | — | — |
| | (c-5) bisphenol A-type epoxy resin | parts by weight | — | 12 | — | — | — | — |
| Copper compound | (d-1) nylon 66 master batch containing CuI/KI = 0.14 | parts by weight | — | — | — | — | — | — |
| | (d-2) nylon 66 master batch containing CuI/KI = 0.16 | parts by weight | — | — | 2.55 | 2.55 | 2.55 | — |
| | (d-3) nylon 66 master batch containing CuI/KI = 0.23 | parts by weight | — | — | — | — | — | — |
| | (d-4) nylon 66 master batch containing CuI/KI = 0.31 | parts by weight | — | — | — | — | — | — |
| Filler | (e-1) glass fiber | parts by weight | 44.9 | 44.9 | 44.9 | 44.9 | 44.9 | 44.9 |
| Heat stabilizer | (f-4) Irganox1010 | parts by weight | — | — | — | — | — | — |
| | (f-2) Irgafos168 | parts by weight | — | — | — | — | — | — |
| | (f-3) Adkstab AO412S | parts by weight | — | — | — | — | — | — |
| | (f-4) Naugard445 | parts by weight | — | — | — | — | — | — |

TABLE 10

|  |  | COMP EX 7 | COMP EX 8 | COMP EX 9 | COMP EX 10 | COMP EX 11 | COMP EX 12 |
|---|---|---|---|---|---|---|---|
| Melting point of (a) polyamide resin | ° C. | 260 | 280 | 260 | 280 | 280 | 260 |
| Number of amino groups or number of hydroxyl groups per molecular of (b) amino group- or hydroxyl group-containing aliphatic compound | — | — | — | 6 | 6 | 3 | — | 2 |
| Amine value of (b) amino group- or hydroxyl group-containing aliphatic compound | mgKOH/g | — | — | — | 380 | — | — |
| Hydroxyl value of (b) amino group- or hydroxyl group-containing aliphatic compound | mgKOH/g | — | 1325 | 1325 | — | — | 750 |
| Number of functional groups per molecular of (c) compound containing reactive funtional group with amino group and hydroxyl group | — | — | 7 | 2 | — | — | — |
| Molecular weight of (c) compound containing reactive fuctional group with amino group and hydroxyl group | — | — | 1330 | 1850 | — | — | — |
| Carboxyl terminal group | Concentraion of carboxyl terminal group of polyamide resin composition before heat treatment | ×10$^{-3}$ mol/g | 5.7 | 5.3 | 5.3 | 5.2 | 5.5 | 7.3 |
| | Concentration of carboxyl terminal group of polyamide resin compositon after heat treatment of 130° C. × 100 hr | ×10$^{-5}$ mol/g | 14.3 | 11.3 | 9.8 | 10.0 | 9.8 | 9.7 |
| | Rate of increase in concentration of carboxyl terminal group of polyamide resin composition by heat treatment of 130° C. | % | 150 | 113 | 85 | 92 | 78 | 33 |
| | Concentration of carboxyl terminal group of polyamide resin composition after heat treatment of 190° C. × 9 hr | ×10$^{-5}$ mol/g | 18.0 | 10.0 | 10.0 | 14.1 | 13.9 | 12.9 |
| | Rate of increase in concentration of carboxyl terminal group of polyamide resin composition by heat treatment of 190° C. | % | 181 | 89 | 88 | 171 | 152 | 77 |
| Copper content in composition | ppm | — | — | 98 | 98 | 100 | — |
| Ratio of copper content/potassium content in composition | — | — | — | 0.23 | 0.23 | 0.23 | — |
| Extruder feed position of (c) compound containing reactive functional group with amino group and hydroxyl group | — | — | 0.0 | 0.0 | — | — | — | — |
| Extruder feed position of (b) amino group- or hydroxyl group-containing alphatic compound | — | — | — | 0.65 | 0.65 | 0.65 | — | 0.65 |
| Pkmax-Pfmin | MPa | 1.4 | 2.1 | 1.2 | 1.0 | 1.3 | 1.2 |
| Heat aging resistance | Tensile strength retention after treatment of 135° C. × 3000 hr | % | 40 | 65 | 64 | 84 | 59 | 84 |
| | Tensile strength retention after treatment of 190° C. × 2000 hr | % | 21 | 83 | 62 | 27 | 38 | 68 |
| Retention stability | Relative viscosity of polyamide resin composition before retention in molten state | — | — | 2.77 | 2.81 | 2.75 | 2.74 | 2.75 | 2.69 |
| | Relative viscosity of polyamide resin composition after retention in molten state | — | — | 2.80 | 2.91 | 2.48 | 2.43 | 2.72 | 2.38 |
| | Relative viscosity retention | % | 101 | 104 | 90 | 89 | 99 | 88 |
| Dimensional Accuracy | Linear expansion coefficient (MD direction, −40° C.-150° C. | ×10$^{-5}$/° C. | 4.5 | 4.8 | 4.8 | 4.8 | 4.7 | 4.5 |
| Chemical resistance | Tensile strength retention after treatment of 130° C. × 1000 hr with 50% LLC aqueous solution | % | 28 | 30 | 26 | 25 | 20 | 42 |
| Creep resistance | Strain under application of load of 50 MPa at 130° C. × 300 hr | % | 5.1 | 4.7 | 6.8 | 7.2 | 4.8 | 4.8 |
| Surface appearance | — | — | A | A | A | A | B | A |

TABLE 11

|  |  |  | EX 31 | EX 32 | EX 33 | EX 34 | EX 35 |
|---|---|---|---|---|---|---|---|
| Polyamide resin | (a-1) nylon 66 | parts by weight | 100 | 100 | 100 | 100 | 100 |
|  | (a-2) nylon 410 (Reference Example 1) | parts by weight | — | — | — | — | — |
|  | (a-3) nylon 6 | parts by weight | — | — | — | — | — |
|  | (a-4) nylon 4T/6T = 40/60 (Reference Example 2) | parts by weight | — | — | — | — | — |
| Copper compound | (d-1) nylon 66 master batch containing CuI/KI = 0.14 | parts by weight | — | — | — | — | — |
|  | (d-2) nylon 66 master batch containing CuI/KI = 0.16 | parts by weight | — | — | — | — | — |
|  | (d-3) nylon 66 master batch containing CuI/KI = 0.23 | parts by weight | — | — | — | — | — |
|  | (d-4) nylon 66 master batch containing CuI/KI = 0.31 | parts by weight | — | — | — | — | — |
| Filler | (e-1) glass fiber | parts by weight | 44.9 | 44.9 | 44.9 | 44.9 | 44.9 |
| Heat stabilizer | (f-4) Irganox1010 | parts by weight | — | — | — | — | — |
|  | (f-2) Irgafos168 | parts by weight | — | — | — | — | — |
|  | (f-3) Adkstab AO412S | parts by weight | — | — | — | — | — |
|  | (f-4) Naugard445 | parts by weight | — | — | — | — | — |

TABLE 11-continued

| | | | | | | | |
|---|---|---|---|---|---|---|---|
| Epoxy group- or carbodiimide group- containing compound or its condensate | (g-1) Reference Example 3 | parts by weight | — | — | — | 3.3 | — |
| | (g-2) Reference Example 4 | parts by weight | 1.1 | 3.3 | 9.9 | — | — |
| | (g-3) Reference Example 5 | parts by weight | — | — | — | — | 3.3 |
| | (g-4) Reference Example 6 | parts by weight | — | — | — | — | — |
| | (g-5) Reference Example 7 | parts by weight | — | — | — | — | — |
| | (g-6) Reference Example 8 | parts by weight | — | — | — | — | — |
| | (g-7) Reference Example 9 | parts by weight | — | — | — | — | — |
| | (g-8) Reference Example 10 | parts by weight | — | — | — | — | — |
| | (g'-1) Reference Example 11 | parts by weight | — | — | — | — | — |
| | (g'-2) Reference Example 12 | parts by weight | — | — | — | — | — |
| | (g'-3) Reference Example 13 | parts by weight | — | — | — | — | — |
| High concentration preliminary reactant | (h-1) Reference Example 14 | parts by weight | — | — | — | — | — |
| Flame retardent | (i-1) bromine-based flame retardant | parts by weight | — | — | — | — | — |
| | (i-2) phosphorus-based flame retardant | parts by weight | — | — | — | — | — |
| Auxilary flame retardant | (j-1) antimony trioxide | parts by weight | — | — | — | — | — |
| Impact resistance improver | (k-1) maleic anhydride-modified ethylene-butene copolymer | parts by weight | — | — | — | — | — |
| Other additive | (l-1) hydrolacite | parts by weight | — | — | — | — | — |

| | | | EX 36 | EX 37 | EX 38 | EX 39 | EX 40 |
|---|---|---|---|---|---|---|---|
| Polyamide resin | (a-1) nylon 66 | parts by weight | 100 | 100 | 100 | 100 | 100 |
| | (a-2) nylon 410 (Reference Example 1) | parts by weight | — | — | — | — | — |
| | (a-3) nylon 6 | parts by weight | — | — | — | — | — |
| | (a-4) nylon 4T/6T = 40/60 (Reference Example 2) | parts by weight | — | — | — | — | — |
| Copper compound | (d-1) nylon 66 master batch containing CuI/KI = 0.14 | parts by weight | — | — | — | — | — |
| | (d-2) nylon 66 master batch containing CuI/KI = 0.16 | parts by weight | — | — | — | — | — |
| | (d-3) nylon 66 master batch containing CuI/KI = 0.23 | parts by weight | — | — | — | — | — |
| | (d-4) nylon 66 master batch containing CuI/KI = 0.31 | parts by weight | — | — | — | — | — |
| Filler | (e-1) glass fiber | parts by weight | 44.9 | 44.9 | 44.9 | 44.9 | 44.9 |
| Heat stabilizer | (f-4) Irganox1010 | parts by weight | — | — | — | — | — |
| | (f-2) Irgafos168 | parts by weight | — | — | — | — | — |
| | (f-3) Adkstab AO412S | parts by weight | — | — | — | — | — |
| | (f-4) Naugard445 | parts by weight | — | — | — | — | — |
| Epoxy group- or carbodiimide group- containing compound or its condensate | (g-1) Reference Example 3 | parts by weight | — | — | — | — | — |
| | (g-2) Reference Example 4 | parts by weight | — | — | — | — | — |
| | (g-3) Reference Example 5 | parts by weight | — | — | — | — | — |
| | (g-4) Reference Example 6 | parts by weight | 3.3 | — | — | — | — |
| | (g-5) Reference Example 7 | parts by weight | — | 3.3 | — | — | — |
| | (g-6) Reference Example 8 | parts by weight | — | — | 3.3 | — | — |
| | (g-7) Reference Example 9 | parts by weight | — | — | — | 3.3 | — |
| | (g-8) Reference Example 10 | parts by weight | — | — | — | — | 3.3 |
| | (g'-1) Reference Example 11 | parts by weight | — | — | — | — | — |
| | (g'-2) Reference Example 12 | parts by weight | — | — | — | — | — |
| | (g'-3) Reference Example 13 | parts by weight | — | — | — | — | — |
| High concentration preliminary reactant | (h-1) Reference Example 14 | parts by weight | — | — | — | — | — |
| Flame retardent | (i-1) bromine-based flame retardant | parts by weight | — | — | — | — | — |
| | (i-2) phosphorus-based flame retardant | parts by weight | — | — | — | — | — |
| Auxilary flame retardant | (j-1) antimony trioxide | parts by weight | — | — | — | — | — |
| Impact resistance improver | (k-1) maleic anhydride-modified ethylene-butene copolymer | parts by weight | — | — | — | — | — |
| Other additive | (l-1) hydrolacite | parts by weight | — | — | — | — | — |

TABLE 12

| | | | EX 31 | EX 32 | EX 33 | EX 34 | EX 35 |
|---|---|---|---|---|---|---|---|
| Melting point of (a) polyamide resin | | ° C. | 260 | 260 | 260 | 260 | 260 |
| Branching degree of (g) compound and/or its condensate | | — | 0.29 | 0.29 | 0.29 | 0.27 | 0.15 |
| Hydroxyl value of (g) compound and/or its condensate | | mgKOH/g | 1280 | 1280 | 1280 | 1530 | 1350 |
| Reaction rate of (g) compound and/or its condensate | | % | 53 | 53 | 53 | 49 | 2 |
| Carboxyl terminal group | Concentraion of carboxyl terminal group of polyamide resin composition before heat treatment | $\times 10^{-5}$ mol/g | 5.3 | 5.4 | 5.8 | 5.5 | 5.8 |
| | Concentration of carboxyl terminal group of polyamide resin compositon after heat treatment of 130° C. × 100 hr | $\times 10^{-5}$ mol/g | 6.1 | 5.4 | 6.2 | 5.7 | 6.2 |
| | Rate of increase in concentration of carboxyl terminal group of polyamide resin composition by heat treatment of 130° C. | % | 15 | 0 | 7 | 3 | 7 |
| | Concentration of carboxyl terminal group of polyamide resin composition after heat treatment of 190° C. × 9 hr | $\times 10^{-5}$ mol/g | 5.9 | 5.5 | 6.1 | 5.8 | 6.4 |
| | Rate of increase in concentration of carboxyl terminal group of polyamide resin composition by heat treatment of 190° C. | % | 12 | 1 | 5 | 1 | 10 |

TABLE 12-continued

| | | | | | | | |
|---|---|---|---|---|---|---|---|
| Copper content in composition | | ppm | — | — | — | — | — |
| Ratio of copper content/potassium content in composition | | — | — | — | — | — | — |
| Extruder feed position of (g) compound and/or its condensate | | — | 0.65 | 0.65 | 0.65 | 0.65 | 0.65 |
| Pkmax-Pfmin | | MPa | 1.3 | 1.3 | 1.2 | 1.3 | 1.2 |
| Heat aging resistance | Tensile strength retention after treatment of 135° C. × 3000 hr | % | 99 | 100 | 103 | 107 | 101 |
| | Tensile strength retention after treatment of 190° C. × 2000 hr | % | 94 | 105 | 100 | 105 | 97 |
| Retention stability | Relative viscosity of polyamide resin composition before retention in molten state | — | 2.78 | 2.77 | 2.76 | 2.77 | 2.76 |
| | Relative viscosity of polyamide resin composition after retention in molten state | — | 2.86 | 2.85 | 2.84 | 2.88 | 2.70 |
| | Relative viscosity retention | % | 103 | 103 | 103 | 104 | 98 |
| Dimensional Accuracy | Linear expansion coefficient (MD direction, −40° C.-150° C.) | ×$10^{-5}$/° C. | 1.1 | 0.6 | 1.0 | 0.6 | 1.0 |
| Chemical resistance | Tensile strength retention after treatment of 130° C. × 1000 hr) with 50% LLC aqueous solution | % | 71 | 77 | 76 | 76 | 72 |
| Creep resistance | Strain under application of load of 50 MPa at 130° C. × 300 hr | % | 0.9 | 0.6 | 0.7 | 0.6 | 1.0 |
| Heat aging resistance (Impact strength) | Izop impact strength retention after treatment of 190° C. × 2000 hr | % | — | — | — | — | — |
| Fire retardancy | | UL-94 | — | — | — | — | — |
| Surface appearance | | — | A | A | A | A | A |

| | | | EX 36 | EX 37 | EX 38 | EX 39 | EX 40 |
|---|---|---|---|---|---|---|---|
| Melting point of (a) polyamide resin | | ° C. | 260 | 260 | 260 | 260 | 260 |
| Branching degree of (g) compound and/or its condensate | | — | 0.20 | 0.39 | 0.23 | 0.34 | 0.37 |
| Hydroxyl value of (g) compound and/or its condensate | | mgKOH/g | 1300 | 1170 | 540 | 1200 | 1110 |
| Reaction rate of (g) compound and/or its condensate | | % | 15 | 96 | 33 | 56 | 89 |
| Carboxyl terminal group | Concentraion of carboxyl terminal group of polyamide resin composition before heat treatment | ×$10^{-3}$ mol/g | 5.8 | 5.0 | 4.8 | 5.8 | 5.4 |
| | Concentration of carboxyl terminal group of polyamide resin compositon after heat treatment of 130° C. × 100 hr | ×$10^{-5}$ mol/g | 6.1 | 5.4 | 6.4 | 5.1 | 5.4 |
| | Rate of increase in concentration of carboxyl terminal group of polyamide resin composition by heat treatment of 130° C. | % | 5 | 8 | 34 | 5 | 0 |
| | Concentration of carboxyl terminal group of polyamide resin composition after heat treatment of 190° C. × 9 hr | ×$10^{-5}$ mol/g | 6.3 | 5.5 | 5.3 | 6.3 | 5.5 |
| | Rate of increase in concentration of carboxyl terminal group of polyamide resin composition by heat treatment of 190° C. | % | 9 | 10 | 10 | 8 | 1 |
| Copper content in composition | | ppm | — | — | — | — | — |
| Ratio of copper content/potassium content in composition | | — | — | — | — | — | — |
| Extruder feed position of (g) compound and/or its condensate | | — | 0.65 | 0.65 | 0.65 | 0.65 | 0.65 |
| Pkmax-Pfmin | | MPa | 1.2 | 1.5 | 1.9 | 1.3 | 1.4 |
| Heat aging resistance | Tensile strength retention after treatment of 135° C. × 3000 hr | % | 104 | 101 | 98 | 108 | 110 |
| | Tensile strength retention after treatment of 190° C. × 2000 hr | % | 100 | 97 | 97 | 102 | 105 |
| Retention stability | Relative viscosity of polyamide resin composition before retention in molten state | — | 2.76 | 2.82 | 2.86 | 2.77 | 2.77 |
| | Relative viscosity of polyamide resin composition after retention in molten state | — | 2.84 | 3.09 | 3.46 | 2.79 | 2.91 |
| | Relative viscosity retention | % | 103 | 110 | 121 | 101 | 105 |
| Dimensional Accuracy | Linear expansion coefficient (MD direction, −40° C.-150° C.) | ×$10^{-5}$/° C. | 0.8 | 1.0 | 1.2 | 0.8 | 0.6 |
| Chemical resistance | Tensile strength retention after treatment of 130° C. × 1000 hr) with 50% LLC aqueous solution | % | 73 | 71 | 71 | 75 | 77 |
| Creep resistance | Strain under application of load of 50 MPa at 130° C. × 300 hr | % | 0.8 | 0.9 | 1.3 | 0.7 | 0.6 |
| Heat aging resistance (Impact strength) | Izop impact strength retention after treatment of 190° C. × 2000 hr | % | — | — | — | — | — |
| Fire retardancy | | UL-94 | — | — | — | — | — |
| Surface appearance | | — | A | A | A | A | A |

TABLE 13

| | | | EX 41 | EX 42 | EX 43 | EX 44 | EX 45 |
|---|---|---|---|---|---|---|---|
| Polyamide resin | (a-1) nylon 66 | parts by weight | 100 | 100 | 100 | 100 | 100 |
| | (a-2) nylon 410 (Reference Example 1) | parts by weight | — | — | — | — | — |
| | (a-3) nylon 6 | parts by weight | — | — | — | — | — |
| | (a-4) nylon 4T/6T = 40/60 (Reference Example 2) | parts by weight | — | — | — | — | — |
| Copper compound | (d-1) nylon 66 master batch containing CuI/KI = 0.14 | parts by weight | 2.55 | — | — | — | — |
| | (d-2) nylon 66 master batch containing CuI/KI = 0.16 | parts by weight | — | 2.55 | — | — | 0.6 |
| | (d-3) nylon 66 master batch containing CuI/KI = 0.23 | parts by weight | — | — | 2.55 | — | — |
| | (d-4) nylon 66 master batch containing CuI/KI = 0.31 | parts by weight | — | — | — | 2.55 | — |

TABLE 13-continued

| | | | | | | | |
|---|---|---|---|---|---|---|---|
| Filler | (e-1) glass fiber | parts by weight | 4.49 | 4.49 | 4.49 | 4.49 | 4.49 |
| Heat stabilizer | (f-4) Irganox1010 | parts by weight | — | — | — | — | — |
| | (f-2) Irgafos168 | parts by weight | — | — | — | — | — |
| | (f-3) Adkstab AO412S | parts by weight | — | — | — | — | — |
| | (f-4) Naugard445 | parts by weight | — | — | — | — | — |
| Epoxy group- or | (g-1) Reference Example 3 | parts by weight | — | — | — | — | — |
| carbodiimide group- | (g-2) Reference Example 4 | parts by weight | 3.3 | 3.3 | 3.3 | 3.3 | 3.3 |
| containing compound | (g-3) Reference Example 5 | parts by weight | — | — | — | — | — |
| or its condensate | (g-4) Reference Example 6 | parts by weight | — | — | — | — | — |
| | (g-5) Reference Example 7 | parts by weight | — | — | — | — | — |
| | (g-6) Reference Example 8 | parts by weight | — | — | — | — | — |
| | (g-7) Reference Example 9 | parts by weight | — | — | — | — | — |
| | (g-8) Reference Example 10 | parts by weight | — | — | — | — | — |
| | (g'-1) Reference Example 11 | parts by weight | — | — | — | — | — |
| | (g'-2) Reference Example 12 | parts by weight | — | — | — | — | — |
| | (g'-3) Reference Example 13 | parts by weight | — | — | — | — | — |
| High concentration preliminary reactant | (h-1) Reference Example 14 | parts by weight | — | — | — | — | — |
| Flame retardent | (i-1) bromine-based flame retardant | parts by weight | — | — | — | — | — |
| | (i-2) phosphorus-based flame retardant | parts by weight | — | — | — | — | — |
| Auxilary flame retardant | (j-1) antimony trioxide | parts by weight | — | — | — | — | — |
| Impact resistance improver | (k-1) maleic anhydride-modified ethylene-butene copolymer | parts by weight | — | — | — | — | — |
| Other additive | (l-1) hydrolacite | parts by weight | — | — | — | — | — |

| | | | EX 46 | EX 47 | EX 48 | EX 49 | EX 50 |
|---|---|---|---|---|---|---|---|
| Polyamide resin | (a-1) nylon 66 | parts by weight | 100 | 100 | 100 | 100 | 100 |
| | (a-2) nylon 410 (Reference Example 1) | parts by weight | — | — | — | — | — |
| | (a-3) nylon 6 | parts by weight | — | — | — | — | — |
| | (a-4) nylon 4T/6T = 40/60 (Reference Example 2) | parts by weight | — | — | — | — | — |
| Copper compound | (d-1) nylon 66 master batch containing CuI/KI = 0.14 | parts by weight | — | — | — | — | — |
| | (d-2) nylon 66 master batch containing CuI/KI = 0.16 | parts by weight | 6.38 | — | — | — | — |
| | (d-3) nylon 66 master batch containing CuI/KI = 0.23 | parts by weight | — | — | — | — | — |
| | (d-4) nylon 66 master batch containing CuI/KI = 0.31 | parts by weight | — | — | — | — | — |
| Filler | (e-1) glass fiber | parts by weight | 4.49 | 4.49 | 4.49 | 4.49 | 4.49 |
| Heat stabilizer | (f-4) Irganox1010 | parts by weight | — | 0.58 | — | — | — |
| | (f-2) Irgafos168 | parts by weight | — | 0.58 | — | — | — |
| | (f-3) Adkstab AO412S | parts by weight | — | — | 0.56 | — | — |
| | (f-4) Naugard445 | parts by weight | — | — | — | 0.56 | — |
| Epoxy group- or | (g-1) Reference Example 3 | parts by weight | — | — | — | — | — |
| carbodiimide group- | (g-2) Reference Example 4 | parts by weight | 3.3 | 3.3 | 3.3 | 3.3 | 3.3 |
| containing compound | (g-3) Reference Example 5 | parts by weight | — | — | — | — | — |
| or its condensate | (g-4) Reference Example 6 | parts by weight | — | — | — | — | — |
| | (g-5) Reference Example 7 | parts by weight | — | — | — | — | — |
| | (g-6) Reference Example 8 | parts by weight | — | — | — | — | — |
| | (g-7) Reference Example 9 | parts by weight | — | — | — | — | — |
| | (g-8) Reference Example 10 | parts by weight | — | — | — | — | — |
| | (g'-1) Reference Example 11 | parts by weight | — | — | — | — | — |
| | (g'-2) Reference Example 12 | parts by weight | — | — | — | — | — |
| | (g'-3) Reference Example 13 | parts by weight | — | — | — | — | — |
| High concentration preliminary reactant | (h-1) Reference Example 14 | parts by weight | — | — | — | — | — |
| Flame retardent | (i-1) bromine-based flame retardant | parts by weight | — | — | — | — | — |
| | (i-2) phosphorus-based flame retardant | parts by weight | — | — | — | — | — |
| Auxilary flame retardant | (j-1) antimony trioxide | parts by weight | — | — | — | — | — |
| Impact resistance improver | (k-1) maleic anhydride-modified ethylene-butene copolymer | parts by weight | — | — | — | — | — |
| Other additive | (l-1) hydrolacite | parts by weight | — | — | — | — | — |

TABLE 14

| | | EX 41 | EX 42 | EX 43 | EX 44 | EX 45 |
|---|---|---|---|---|---|---|
| Melting point of (a) polyamide resin | ° C. | 260 | 260 | 260 | 260 | 260 |
| Branching degree of (g) compound and/or its condensate | — | 0.29 | 0.29 | 0.29 | 0.29 | 0.29 |
| Hydroxyl value of (g) compound and/or its condensate | mgKOH/g | 1280 | 1280 | 1280 | 1280 | 1280 |
| Reaction rate of (g) compound and/or its condensate | % | 53 | 53 | 53 | 53 | 53 |
| Carboxyl terminal group Concentraion of carboxyl terminal group of polyamide resin composition before heat treatment | $\times 10^{-3}$ mol/g | 5.5 | 5.5 | 5.5 | 5.5 | 5.4 |
| Concentration of carboxyl terminal group of polyamide resin compositon after heat treatment of 130° C. × 100 hr | $\times 10^{-5}$ mol/g | 5.5 | 5.5 | 5.5 | 5.5 | 5.9 |
| Rate of increase in concentration of carboxyl terminal group of polyamide resin composition by heat treatment of 130° C. | % | 0 | 0 | 0 | 0 | 9 |

TABLE 14-continued

|  |  |  |  |  |  |  |  |
|---|---|---|---|---|---|---|---|
|  | Concentration of carboxyl terminal group of polyamide resin composition after heat treatment of 190° C. × 9 hr | ×10$^{-5}$ mol/g | 5.5 | 5.5 | 5.5 | 5.5 | 5.4 |
|  | Rate of increase in concentration of carboxyl terminal group of polyamide resin composition by heat treatment of 190° C. | % | 0 | 0 | 0 | 0 | 0 |
| Copper content in composition |  | ppm | 96 | 98 | 101 | 105 | 23 |
| Ratio of copper content/potassium content in composition |  | — | 0.20 | 0.23 | 0.33 | 0.44 | 0.23 |
| Extruder feed position of (g) compound and/or its condensate |  | — | 0.65 | 0.65 | 0.65 | 0.65 | 0.65 |
| Pkmax-Pfmin |  | MPa | 1.3 | 1.3 | 1.3 | 1.3 | 1.3 |
| Heat aging resistance | Tensile strength retention after treatment of 135° C. × 3000 hr | % | 111 | 114 | 114 | 111 | 110 |
|  | Tensile strength retention after treatment of 190° C. × 2000 hr | % | 106 | 107 | 107 | 106 | 105 |
| Retention stability | Relative viscosity of polyamide resin composition before retention in molten state | — | 2.77 | 2.77 | 2.77 | 2.77 | 2.78 |
|  | Relative viscosity of polyamide resin composition after retention in molten state | — | 2.85 | 2.88 | 2.88 | 2.91 | 2.81 |
|  | Relative viscosity retention | % | 103 | 104 | 104 | 105 | 101 |
| Dimensional Accuracy | Linear expansion coefficient (MD direction, −40° C.-150° C.) | ×10$^{-5}$/° C. | 0.5 | 0.4 | 0.4 | 0.5 | 0.6 |
| Chemical resistance | Tensile strength retention after treatment of 130° C. × 1000 hr) with 50% LLC aqueous solution | % | 78 | 79 | 79 | 78 | 77 |
| Creep resistance | Strain under application of load of 50 MPa at 130° C. × 300 hr | % | 0.5 | 0.4 | 0.4 | 0.5 | 0.6 |
| Heat aging resistance (Impact strength) | Izop impact strength retention after treatment of 190° C. × 2000 hr | % | — | — | — | — | — |
| Fire retardancy |  | UL-94 | — | — | — | — | — |
| Surface appearance |  | — | B | A | A | B | A |

|  |  |  | EX 46 | EX 47 | EX 48 | EX 49 | EX 50 |
|---|---|---|---|---|---|---|---|
| Melting point of (a) polyamide resin |  | ° C. | 260 | 260 | 260 | 280 | 260 |
| Branching degree of (g) compound and/or its condensate |  | — | 0.29 | 0.29 | 0.29 | 0.29 | 0.29 |
| Hydroxyl value of (g) compound and/or its condensate |  | mgKOH/g | 1280 | 1280 | 1280 | 1280 | 1280 |
| Reaction rate of (g) compound and/or its condensate |  | % | 53 | 53 | 53 | 53 | 53 |
| Carboxyl terminal group | Concentraion of carboxyl terminal group of polyamide resin composition before heat treatment | ×10$^{-5}$ mol/g | 5.4 | 5.5 | 5.5 | 6.2 | 5.4 |
|  | Concentration of carboxyl terminal group of polyamide resin compositon after heat treatment of 130° C. × 100 hr | ×10$^{-5}$ mol/g | 6.0 | 5.5 | 5.5 | 7.6 | 6.4 |
|  | Rate of increase in concentration of carboxyl terminal group of polyamide resin composition by heat treatment of 130° C. | % | 12 | 0 | 0 | 23 | 19 |
|  | Concentration of carboxyl terminal group of polyamide resin composition after heat treatment of 190° C. × 9 hr | ×10$^{-5}$ mol/g | 5.7 | 5.9 | 5.9 | 6.6 | 6.0 |
|  | Rate of increase in concentration of carboxyl terminal group of polyamide resin composition by heat treatment of 190° C. | % | 5 | 7 | 8 | 7 | 12 |
| Copper content in composition |  | ppm | 239 | — | — | — | — |
| Ratio of copper content/potassium content in composition |  | — | 0.23 | — | — | — | — |
| Extruder feed position of (g) compound and/or its condensate |  | — | 0.65 | 0.65 | 0.85 | 0.00 | 0.65 |
| Pkmax-Pfmin |  | MPa | 1.4 | 1.3 | 1.3 | 0.8 | 0.2 |
| Heat aging resistance | Tensile strength retention after treatment of 135° C. × 3000 hr | % | 112 | 115 | 114 | 98 | 98 |
|  | Tensile strength retention after treatment of 190° C. × 2000 hr | % | 102 | 100 | 99 | 99 | 96 |
| Retention stability | Relative viscosity of polyamide resin composition before retention in molten state | — | 2.78 | 2.77 | 2.77 | 2.71 | 2.77 |
|  | Relative viscosity of polyamide resin composition after retention in molten state | — | 2.84 | 2.83 | 2.83 | 2.79 | 2.91 |
|  | Relative viscosity retention | % | 102 | 102 | 102 | 103 | 105 |
| Dimensional Accuracy | Linear expansion coefficient (MD direction, −40° C.-150° C.) | ×10$^{-5}$/° C. | 0.5 | 0.8 | 0.8 | 1.1 | 1.0 |
| Chemical resistance | Tensile strength retention after treatment of 130° C. × 1000 hr) with 50% LLC aqueous solution | % | 78 | 77 | 77 | 71 | 73 |
| Creep resistance | Strain under application of load of 50 MPa at 130° C. × 300 hr | % | 0.5 | 0.6 | 0.6 | 1.2 | 1.3 |
| Heat aging resistance (Impact strength) | Izop impact strength retention after treatment of 190° C. × 2000 hr | % | — | — | — | — | — |
| Fire retardancy |  | UL-94 | — | — | — | — | — |
| Surface appearance |  | — | B | A | A | A | A |

TABLE 15

|  |  |  | EX 51 | EX 52 | EX 53 | EX 54 |
|---|---|---|---|---|---|---|
| Polyamide resin | (a-1) nylon 66 | parts by weight | 87.7 | — | — | — |
|  | (a-2) nylon 410 (Reference Example 1) | parts by weight | — | 100 | — | — |
|  | (a-3) nylon 6 | parts by weight | — | — | 100 | — |
|  | (a-4) nylon 4T/6T = 40/60 (Reference Example 2) | parts by weight | — | — | — | 100 |
| Copper compound | (d-1) nylon 66 master batch containing CuI/KI = 0.14 | parts by weight | — | — | — | — |
|  | (d-2) nylon 66 master batch containing CuI/KI = 0.16 | parts by weight | — | — | — | — |
|  | (d-3) nylon 66 master batch containing CuI/KI = 0.23 | parts by weight | — | — | — | — |
|  | (d-4) nylon 66 master batch containing CuI/KI = 0.31 | parts by weight | — | — | — | — |

TABLE 15-continued

| | | | | | | |
|---|---|---|---|---|---|---|
| Filler | (e-1) glass fiber | parts by weight | 4.49 | 4.49 | 4.49 | 4.49 |
| Heat stabilizer | (f-4) Irganox1010 | parts by weight | — | — | — | — |
| | (f-2) Irgafos168 | parts by weight | — | — | — | — |
| | (f-3) Adkstab AO412S | parts by weight | — | — | — | — |
| | (f-4) Naugard445 | parts by weight | — | — | — | — |
| Epoxy group- or | (g-1) Reference Example 3 | parts by weight | — | — | — | — |
| carbodiimide group- | (g-2) Reference Example 4 | parts by weight | — | 3.3 | 3.3 | 3.3 |
| containing compound | (g-3) Reference Example 5 | parts by weight | — | — | — | — |
| or its condensate | (g-4) Reference Example 6 | parts by weight | — | — | — | — |
| | (g-5) Reference Example 7 | parts by weight | — | — | — | — |
| | (g-6) Reference Example 8 | parts by weight | — | — | — | — |
| | (g-7) Reference Example 9 | parts by weight | — | — | — | — |
| | (g-8) Reference Example 10 | parts by weight | — | — | — | — |
| | (g'-1) Reference Example 11 | parts by weight | — | — | — | — |
| | (g'-2) Reference Example 12 | parts by weight | — | — | — | — |
| | (g'-3) Reference Example 13 | parts by weight | — | — | — | — |
| High concentration preliminary reactant | (h-1) Reference Example 14 | parts by weight | 15.6 | — | — | — |
| Flame retardent | (i-1) bromine-based flame retardant | parts by weight | — | — | — | — |
| | (i-2) phosphorus-based flame retardant | parts by weight | — | — | — | — |
| Auxilary flame retardant | (j-1) antimony trioxide | parts by weight | — | — | — | — |
| Impact resistance improver | (k-1) maleic anhydride-modified ethylene-butene copolymer | parts by weight | — | — | — | — |
| Other additive | (l-1) hydrolacite | parts by weight | — | — | — | — |

| | | | EX 55 | EX 56 | EX 57 | EX 58 |
|---|---|---|---|---|---|---|
| Polyamide resin | (a-1) nylon 66 | parts by weight | 100 | 100 | 100 | 80 |
| | (a-2) nylon 410 (Reference Example 1) | parts by weight | — | — | — | — |
| | (a-3) nylon 6 | parts by weight | — | — | — | — |
| | (a-4) nylon 4T/6T = 40/60 (Reference Example 2) | parts by weight | — | — | — | 20 |
| Copper compound | (d-1) nylon 66 master batch containing CuI/KI = 0.14 | parts by weight | — | — | — | — |
| | (d-2) nylon 66 master batch containing CuI/KI = 0.16 | parts by weight | — | — | — | — |
| | (d-3) nylon 66 master batch containing CuI/KI = 0.23 | parts by weight | — | — | — | — |
| | (d-4) nylon 66 master batch containing CuI/KI = 0.31 | parts by weight | — | — | — | — |
| Filler | (e-1) glass fiber | parts by weight | 62.8 | 57.7 | — | 4.49 |
| Heat stabilizer | (f-4) Irganox1010 | parts by weight | — | — | — | — |
| | (f-2) Irgafos168 | parts by weight | — | — | — | — |
| | (f-3) Adkstab AO412S | parts by weight | — | — | — | — |
| | (f-4) Naugard445 | parts by weight | — | — | — | — |
| Epoxy group- or | (g-1) Reference Example 3 | parts by weight | — | — | — | — |
| carbodiimide group- | (g-2) Reference Example 4 | parts by weight | 3.3 | 3.3 | 3.3 | 3.3 |
| containing compound | (g-3) Reference Example 5 | parts by weight | — | — | — | — |
| or its condensate | (g-4) Reference Example 6 | parts by weight | — | — | — | — |
| | (g-5) Reference Example 7 | parts by weight | — | — | — | — |
| | (g-6) Reference Example 8 | parts by weight | — | — | — | — |
| | (g-7) Reference Example 9 | parts by weight | — | — | — | — |
| | (g-8) Reference Example 10 | parts by weight | — | — | — | — |
| | (g'-1) Reference Example 11 | parts by weight | — | — | — | — |
| | (g'-2) Reference Example 12 | parts by weight | — | — | — | — |
| | (g'-3) Reference Example 13 | parts by weight | — | — | — | — |
| High concentration preliminary reactant | (h-1) Reference Example 14 | parts by weight | — | — | — | — |
| Flame retardent | (i-1) bromine-based flame retardant | parts by weight | 32 | — | — | — |
| | (i-2) phosphorus-based flame retardant | parts by weight | — | 34.6 | — | — |
| Auxilary flame retardant | (j-1) antimony trioxide | parts by weight | 12.3 | — | — | — |
| Impact resistance improver | (k-1) maleic anhydride-modified ethylene-butene copolymer | parts by weight | — | — | 25 | — |
| Other additive | (l-1) hydrolacite | parts by weight | — | 0.6 | — | — |

TABLE 16

| | | | EX 51 | EX 52 | EX 53 | EX 54 |
|---|---|---|---|---|---|---|
| Melting point of (a) polyamide resin | | ° C. | 260 | 252 | 225 | 336 |
| Branching degree of (g) compound and/or its condensate | | — | 0.29 | 0.29 | 0.29 | 0.29 |
| Hydroxyl value of (g) compound and/or its condensate | | mgKOH/g | 1280 | 1280 | 1280 | 1280 |
| Reaction rate of (g) compound and/or its condensate | | % | 53 | 53 | 53 | 53 |
| Carboxyl terminal group | Concentraion of carboxyl terminal group of polyamide resin composition before heat treatment | $\times 10^{-3}$ mol/g | 6.1 | 5.9 | 5.4 | 8.9 |
| | Concentration of carboxyl terminal group of polyamide resin compositon after heat treatment of 130° C. × 100 hr | $\times 10^{-5}$ mol/g | 6.1 | 6.2 | 6.3 | 11.5 |
| | Rate of increase in concentration of carboxyl terminal group of polyamide resin composition by heat treatment of 130° C. | % | 0 | 5 | 16 | 29 |
| | Concentration of carboxyl terminal group of polyamide resin composition after heat treatment of 190° C. × 9 hr | $\times 10^{-5}$ mol/g | 6.1 | 8.3 | 5.9 | 9.8 |
| | Rate of increase in concentration of carboxyl terminal group of polyamide resin composition by heat treatment of 190° C. | % | 0 | 7 | 10 | 10 |

TABLE 16-continued

| | | | | | | |
|---|---|---|---|---|---|---|
| Copper content in composition | | ppm | — | — | — | — |
| Ratio of copper content/potassium content in composition | | — | — | — | — | — |
| Extruder feed position of (g) compound and/or its condensate | | — | 0.00 | 0.65 | 0.65 | 0.65 |
| Pkmax-Pfmin | | MPa | 1.3 | 1.3 | 1.2 | 0.7 |
| Heat aging resistance | Tensile strength retention after treatment of 135° C. × 3000 hr | % | 115 | 108 | 101 | 100 |
| | Tensile strength retention after treatment of 190° C. × 2000 hr | % | 117 | 102 | 97 | 95 |
| Retention stability | Relative viscosity of polyamide resin composition before retention in molten state | — | 2.77 | 2.72 | 2.75 | 2.43 |
| | Relative viscosity of polyamide resin composition after retention in molten state | — | 2.85 | 2.88 | 2.94 | 2.24 |
| | Relative viscosity retention | % | 103 | 105 | 107 | 92 |
| Dimensional Accuracy | Linear expansion coefficient (MD direction, −40° C.-150° C.) | ×$10^{-5}$/° C. | 0.4 | 0.6 | 0.9 | 1.4 |
| Chemical resistance | Tensile strength retention after treatment of 130° C. × 1000 hr) with 50% LLC aqueous solution | % | 85 | 93 | 71 | 79 |
| Creep resistance | Strain under application of load of 50 MPa at 130° C. × 300 hr | % | 0.4 | 0.5 | 1.5 | 1.7 |
| Heat aging resistance (Impact strength) | Izop impact strength retention after treatment of 190° C. × 2000 hr | % | — | — | — | — |
| Fire retardancy | | UL-94 | — | — | — | — |
| Surface appearance | | — | — | A | A | A | A |

| | | | EX 55 | EX 56 | EX 57 | EX 58 |
|---|---|---|---|---|---|---|
| Melting point of (a) polyamide resin | | ° C. | 260 | 280 | 260 | 225/260 |
| Branching degree of (g) compound and/or its condensate | | — | 0.29 | 0.29 | 0.29 | 0.29 |
| Hydroxyl value of (g) compound and/or its condensate | | mgKOH/g | 1280 | 1280 | 1280 | 1280 |
| Reaction rate of (g) compound and/or its condensate | | % | 53 | 53 | 53 | 53 |
| Carboxyl terminal group | Concentraion of carboxyl terminal group of polyamide resin composition before heat treatment | ×$10^{-3}$ mol/g | — | — | — | 5.6 |
| | Concentration of carboxyl terminal group of polyamide resin compositon after heat treatment of 130° C. × 100 hr | ×$10^{-5}$ mol/g | — | — | — | 5.6 |
| | Rate of increase in concentration of carboxyl terminal group of polyamide resin composition by heat treatment of 130° C. | % | — | — | — | 0 |
| | Concentration of carboxyl terminal group of polyamide resin composition after heat treatment of 190° C. × 9 hr | ×$10^{-5}$ mol/g | — | — | — | 5.8 |
| | Rate of increase in concentration of carboxyl terminal group of polyamide resin composition by heat treatment of 190° C. | % | — | — | — | 0 |
| Copper content in composition | | ppm | — | — | — | — |
| Ratio of copper content/potassium content in composition | | — | — | — | — | — |
| Extruder feed position of (g) compound and/or its condensate | | — | 0.65 | 0.65 | 0.65 | 0.65 |
| Pkmax-Pfmin | | MPa | 1.3 | 1.1 | 1.4 | 1.3 |
| Heat aging resistance | Tensile strength retention after treatment of 135° C. × 3000 hr | % | 93 | 90 | 92 | 112 |
| | Tensile strength retention after treatment of 190° C. × 2000 hr | % | 92 | 88 | 93 | 120 |
| Retention stability | Relative viscosity of polyamide resin composition before retention in molten state | — | — | — | — | 2.76 |
| | Relative viscosity of polyamide resin composition after retention in molten state | — | — | — | — | 2.93 |
| | Relative viscosity retention | % | — | — | — | 106 |
| Dimensional Accuracy | Linear expansion coefficient (MD direction, −40° C.-150° C.) | ×$10^{-5}$/° C. | 1.1 | 1.4 | — | 0.7 |
| Chemical resistance | Tensile strength retention after treatment of 130° C. × 1000 hr) with 50% LLC aqueous solution | % | 75 | 70 | 72 | 75 |
| Creep resistance | Strain under application of load of 50 MPa at 130° C. × 300 hr | % | 1.7 | 1.8 | — | 0.7 |
| Heat aging resistance (Impact strength) | Izop impact strength retention after treatment of 190° C. × 2000 hr | % | — | — | 58 | — |
| Fire retardancy | | UL-94 | V-0 | V-0 | — | — |
| Surface appearance | | — | A | A | A | A |

TABLE 17

| | | | COMP EX 13 | COMP EX 14 | COMP EX 15 | COMP EX 16 | COMP EX 17 | COMP EX 18 | COMP EX 19 |
|---|---|---|---|---|---|---|---|---|---|
| Polyamide resin | (a-1) nylon 66 | parts by weight | 100 | 100 | 100 | 100 | 100 | 100 | 100 |
| | (a-2) nylon 410 (Reference Example 1) | parts by weight | — | — | — | — | — | — | — |
| | (a-3) nylon 6 | parts by weight | — | — | — | — | — | — | — |
| | (a-4) nylon 4T/6T = 40/60 (Reference Example 2) | parts by weight | — | — | — | — | — | — | — |
| Copper compound | (d-1) nylon 66 master batch containing CuI/KI = 0.14 | parts by weight | — | — | — | — | — | — | — |
| | (d-2) nylon 66 master batch containing CuI/KI = 0.16 | parts by weight | — | — | — | — | — | — | — |
| | (d-3) nylon 66 master batch containing CuI/KI = 0.23 | parts by weight | — | — | — | — | — | — | — |
| | (d-4) nylon 66 master batch containing CuI/KI = 0.31 | parts by weight | — | — | — | — | — | — | — |

TABLE 17-continued

|  |  |  | COMP EX 13 | COMP EX 14 | COMP EX 15 | COMP EX 16 | COMP EX 17 | COMP EX 18 | COMP EX 19 |
|---|---|---|---|---|---|---|---|---|---|
| Filler | (e-1) glass fiber | parts by weight | 44.9 | 44.9 | 44.9 | 44.9 | 44.9 | 62.8 | — |
| Heat stabilizer | (f-4) Irganox1010 | parts by weight | — | — | — | — | — | — | — |
|  | (f-2) Irgafos168 | parts by weight | — | — | — | — | — | — | — |
|  | (f-3) Adkstab AO412S | parts by weight | — | — | — | — | — | — | — |
|  | (f-4) Naugard445 | parts by weight | — | — | — | — | — | — | — |
| Epoxy group- or carbodiimide group- containing compound or its condensate | (g-1) Reference Example 3 | parts by weight | — | — | — | — | — | — | — |
|  | (g-2) Reference Example 4 | parts by weight | — | 21 | — | — | — | — | — |
|  | (g-3) Reference Example 5 | parts by weight | — | — | — | — | — | — | — |
|  | (g-4) Reference Example 6 | parts by weight | — | — | — | — | — | — | — |
|  | (g-5) Reference Example 7 | parts by weight | — | — | — | — | — | — | — |
|  | (g-6) Reference Example 8 | parts by weight | — | — | — | — | — | — | — |
|  | (g-7) Reference Example 9 | parts by weight | — | — | — | — | — | — | — |
|  | (g-8) Reference Example 10 | parts by weight | — | — | — | — | — | — | — |
|  | (g'-1) Reference Example 11 | parts by weight | — | — | 3.3 | — | — | — | — |
|  | (g'-2) Reference Example 12 | parts by weight | — | — | — | 3.3 | — | — | — |
|  | (g'-3) Reference Example 13 | parts by weight | — | — | — | — | 3.3 | — | — |
| High concentration preliminary reactant | (h-1) Reference Example 14 | parts by weight | — | — | — | — | — | — | — |
| Flame retardent | (i-1) bromine-based flame retardant | parts by weight | — | — | — | — | — | 32 | — |
|  | (i-2) phosphorus-based flame retardant | parts by weight | — | — | — | — | — | — | — |
| Auxilary flame retardant | (j-1) antimony trioxide | parts by weight | — | — | — | — | — | 12.3 | — |
| Impact resistance improver | (k-1) maleic anhydride-modified ethylene-butene copolymer | parts by weight | — | — | — | — | — | — | 25 |
| Other additive | (l-1) hydrolacite | parts by weight | — | — | — | — | — | — | — |

TABLE 18

|  |  |  | COMP EX 13 | COMP EX 14 | COMP EX 15 | COMP EX 16 | COMP EX 17 | COMP EX 18 | COMP EX 19 |
|---|---|---|---|---|---|---|---|---|---|
| Melting point of (a) polyamide resin |  | ° C. | 260 | 260 | 260 | 260 | 280 | 260 | 260 |
| Branching degree of (g) compound and/or its condensate |  | — | — | 0.29 | 0.02 | 0.03 | 0.01 | — | — |
| Hydroxyl value of (g) compound and/or its condensate |  | mgKOH/g | — | 1280 | 1240 | 1180 | 48 | — | — |
| Reaction rate of (g) compound and/or its condensate |  | % | — | 53 | 38 | 42 | 30 | — | — |
| Carboxyl terminal group | Concentraion of carboxyl terminal group of polyamide resin composition before heat treatment | ×10$^{-3}$ mol/g | 6.1 | 10.9 | 6.1 | 6.0 | 5.9 | 5.8 | 5.7 |
|  | Concentration of carboxyl terminal group of polyamide resin compositon after heat treatment of 130° C. × 100 hr | ×10$^{-5}$ mol/g | 15.7 | 19.6 | 17.1 | 15.6 | 15.7 | 18.1 | 14.3 |
|  | Rate of increase in concentration of carboxyl terminal group of polyamide resin composition by heat treatment of 130° C. | % | 158 | 80 | 180 | 180 | 166 | 212 | 150 |
|  | Concentration of carboxyl terminal group of polyamide resin composition after heat treatment of 190° C. × 9 hr | ×10$^{-5}$ mol/g | 18.2 | 19.1 | 10.4 | 10.8 | 11.1 | 18.3 | 14.8 |
|  | Rate of increase in concentration of carboxyl terminal group of polyamide resin composition by heat treatment of 190° C. | % | 198 | 75 | 70 | 77 | 88 | 215 | 180 |
| Copper content in composition |  | ppm | — | — | — | — | — | — | — |
| Ratio of copper content/potassium content in composition |  | — | — | — | — | — | — | — | — |
| Extruder feed position of (g) compound and/or its condensate |  | — | — | — | 0.65 | 0.65 | 0.65 | 0.65 | — | — |
| Pkmax-Pfmin |  | MPa | 1.4 | 0.5 | 1.1 | 1.1 | 1.2 | 0.9 | 1.4 |
| Heat aging resistance | Tensile strength retention after treatment of 135° C. × 3000 hr | % | 38 | 84 | 48 | 45 | 52 | 47 | 40 |
|  | Tensile strength retention after treatment of 190° C. × 2000 hr | % | 11 | 70 | 73 | 69 | 64 | 6 | 31 |
| Retention stability | Relative viscosity of polyamide resin composition before retention in molten state | — | — | 2.76 | 2.57 | 2.72 | 2.74 | 2.77 | — |
|  | Relative viscosity of polyamide resin composition after retention in molten state | — | — | 2.65 | 2.13 | 2.50 | 2.55 | 2.60 | — |
|  | Relative viscosity retention | % | — | 98 | 83 | 92 | 83 | 94 | — |
| Dimensional Accuracy | Linear expansion coefficient (MD direction, −40° C.-150° C.) | ×10$^{-5}$/° C. | 4.8 | 2.9 | 2.6 | 3.0 | 3.5 | 4.8 | — |
| Chemical resistance | Tensile strength retention after treatment of 130° C. × 1000 hr) with 50% LLC aqueous solution | % | 26 | 50 | 54 | 49 | 44 | 27 | 30 |
| Creep resistance | Strain under application of load of 50 MPa at 130° C. × 300 hr | % | 5.3 | 3.9 | 2.7 | 3.3 | 4.6 | 5.5 | — |

TABLE 18-continued

| | | | COMP EX 13 | COMP EX 14 | COMP EX 15 | COMP EX 16 | COMP EX 17 | COMP EX 18 | COMP EX 19 |
|---|---|---|---|---|---|---|---|---|---|
| Heat aging resistance (Impact strength) | Izop impact strength retention after treatment of 190° C. × 2000 hr | % | — | — | — | — | — | — | 1.0 |
| Fire retardancy | | UL-94 | — | — | — | — | — | V-0 | — |
| Surface appearance | | — | — | A | C2 | A | A | A | A |

Compared to Comparative Examples 1 and 9 to 12, Examples 1 to 30 included the compound containing reactive functional group with amino group or hydroxyl group and accordingly provided the molded products having excellent heat aging resistance, surface appearance, retention stability, dimensional accuracy, chemical resistance and creep resistance.

Compared to Comparative Examples 2 and 7, Examples 1 to 3 had the more favorable contents of the amino group- or hydroxyl group-containing aliphatic compound and accordingly provided the molded products having excellent heat aging resistance, surface appearance, retention stability, dimensional accuracy, chemical resistance and creep resistance.

Compared to Example 8, Example 4 had the amine value of the amino group- or hydroxyl group-containing aliphatic compound in the more favorable range and accordingly provided the molded product having better heat aging resistance, dimensional accuracy, chemical resistance and creep resistance.

Compared to Example 9, Examples 2, 6 and 7 had the hydroxyl values of the amino group- or hydroxyl group-containing aliphatic compound in the more favorable range and accordingly provided the molded products having better heat aging resistance, dimensional accuracy, chemical resistance and creep resistance.

Compared to Comparative Examples 1 and 8, Example 30 had the more favorable ratio of the content of the amino group- or hydroxyl group-containing aliphatic compound to the content of the compound containing reactive functional group with amino group and hydroxyl group and accordingly provided the molded product having excellent heat aging resistance, surface appearance, retention stability, dimensional accuracy, chemical resistance and creep resistance.

Compared to Example 2, Examples 15 to 18 additionally contained the copper compound and accordingly provided the molded products having better heat aging resistance, dimensional accuracy, chemical resistance and creep resistance. Among them, compared to Examples 15 and 18, Examples 16 and 17 had the more favorable ratio of the content of the copper element to the content of the potassium element in the polyamide resin composition and accordingly provided the molded products having better heat aging resistance, surface appearance, dimensional accuracy, chemical resistance and creep resistance.

Compared to Examples 19 and 20, Example 16 had the more favorable content of the copper element in the polyamide resin composition and accordingly provided the molded product having better heat aging resistance, surface appearance, dimensional accuracy, chemical resistance and creep resistance.

Compared to Example 2, Examples 21 and 22 additionally contained the heat stabilizer and accordingly provided the molded products having better heat aging resistance.

Compared to Example 23, Example 2 fed the amino group- or hydroxyl group-containing aliphatic compound from the more favorable position in the extruder and accordingly provided the molded product having better heat aging resistance, retention stability, dimensional accuracy, chemical resistance and creep resistance.

Compared to Example 24, Example 2 had the ratio of the kneading zones in the extruder set to the more favorable range to enhance the resin pressure and accordingly provided the molded product having better heat aging resistance, dimensional accuracy, chemical resistance and creep resistance.

Compared to Example 2, Example 25 caused the amino group- or hydroxyl group-containing aliphatic compound and the compound containing reactive functional group with amino group and hydroxyl group to be preliminarily reacted before being fed to the extruder and used the (g) compound and/or its condensate and accordingly provided the molded product having better heat aging resistance, dimensional accuracy, chemical resistance and creep resistance. Compared to Example 2, Example 25 especially had better heat aging resistance at 190° C.

Compared to Example 2, Example 26 produced the master batch and performed melt-kneading twice and accordingly provided the molded product having better heat aging resistance, dimensional accuracy, chemical resistance and creep resistance.

Compared to Examples 28 and 29, Examples 2 and 27 had the melting point of the polyamide resin in the more favorable range and accordingly provided the molded products having better heat aging resistance, retention stability, dimensional accuracy, chemical resistance and creep resistance.

Compared to Comparative Example 3, Examples 4 and 5 had the number of amino groups per molecule of the amino group- or hydroxyl group-containing aliphatic compound in the more preferable range and accordingly provided the molded products having excellent heat aging resistance, retention stability, dimensional accuracy, chemical resistance and creep resistance.

Compared to Comparative Example 4, Examples 2, 6 and 7 had the number of hydroxyl groups per molecule of the amino group- or hydroxyl group-containing aliphatic compound in the more preferable range and accordingly provided the molded products having excellent heat aging resistance, retention stability, dimensional accuracy, chemical resistance and creep resistance.

Compared to Comparative Example 5, Examples 2, 6 and 7 used the aliphatic compound without cyclic structure as the amino group- or hydroxyl group-containing aliphatic compound and accordingly provided the molded products having excellent heat aging resistance, retention stability, dimensional accuracy, chemical resistance and creep resistance.

Compared to Comparative Example 6, Example 2 had the number of functional groups per molecule of the compound containing reactive functional group with amino group and hydroxyl group in the more favorable range and accordingly provided the molded product having excellent heat aging resistance, surface appearance, retention stability, dimensional accuracy, chemical resistance and creep resistance.

Compared to the composition including the hydroxyl group- and carboxyl group-containing compound of Comparative Example 12, Examples 1 to 30 provided the molded products having better dimensional accuracy, retention stability and creep resistance while having equivalent heat aging resistance and chemical resistance.

Compared to Comparative Examples 13 to 19, Examples 31 to 58 had the specified amounts of the (g) compound and/or its condensate and accordingly provided the molded products having excellent heat aging resistance, surface appearance, retention stability, dimensional accuracy, chemical resistance and creep resistance.

Compared to Comparative Examples 13 and 14, Examples 31 to 33 had the more favorable mixing amounts of the (g) compound and/or its condensate and accordingly provided the molded products having excellent heat aging resistance, surface appearance, retention stability, dimensional accuracy, chemical resistance and creep resistance.

Compared to Examples 35 to 37, Example 32 had the reactivity of the (g) compound and/or its condensate in the more favorable range and accordingly provided the molded product having better heating aging resistance, retention stability, dimensional accuracy, chemical resistance and creep resistance.

Compared to Example 38, Example 32 used the (g) compound and/or its condensate having the greater number of hydroxyl groups per molecule than the number of epoxy groups or the number of carbodiimide groups per molecule and accordingly provided the molded product having better heat aging resistance, retention stability, dimensional accuracy and creep resistance.

Compared to Example 32, Examples 41 to 44 additionally included the copper compound and accordingly provided the molded products having better heat aging resistance, dimensional accuracy, chemical resistance and creep resistance. Among them, compared to Examples 41 and 44, Examples 42 and 43 had the more favorable ratio of the content of the copper element to the content of the potassium element in the polyamide resin composition and accordingly provided the molded products having better heat aging resistance, surface appearance, dimensional accuracy, chemical resistance and creep resistance.

Compared to Examples 45 and 46, Example 42 had the more favorable content of the copper element in the polyamide resin composition and accordingly provided the molded product having better heat aging resistance, surface appearance, dimensional accuracy, chemical resistance and creep resistance.

Compared to Example 32, Examples 47 and 48 additionally included the heat stabilizer and accordingly provided the molded products having better heat aging resistance.

Compared to Example 49, Example 32 fed the (g) compound and/or its condensate from the more favorable position in the extruder and accordingly provided the molded product having better heat aging resistance, dimensional accuracy, chemical resistance and creep resistance.

Compared to Example 50, Example 32 had the ratio of the kneading zones in the extruder set to the more favorable range to enhance the resin pressure and accordingly provided the molded product having better heat aging resistance, dimensional accuracy, chemical resistance and creep resistance.

Compared to Example 32, Example 51 produced the highly concentrated preliminary reactant and performed melt-kneading twice and accordingly provided the molded product having better heat aging resistance, dimensional accuracy, chemical resistance and creep resistance.

Compared to Examples 53 and 54, Examples 32 and 52 had the melting point of the polyamide resin in the more favorable range and accordingly provided the molded products having better heat aging resistance, retention stability, dimensional accuracy, chemical resistance and creep resistance.

Compared to Example 2, Example 32 used the (g) compound and/or its condensate obtained by the preliminary reaction and accordingly provided the molded product having better heat aging resistance, dimensional accuracy, chemical resistance and creep resistance. Compared to Example 2, Example 32 especially had better heat aging resistance at 190° C.

Compared to Comparative Example 1, Example 32 used the compound and/or its condensate including epoxy group or carbodiimide group and accordingly provided excellent heat aging resistance, retention stability, dimensional accuracy, chemical resistance, surface appearance and creep resistance.

Compared to Comparative Example 12, Example 32 did not use the compound and/or its condensate including carboxyl group but used the compound and/or its condensate including epoxy group or carbodiimide group and accordingly provided the molded product having excellent heat aging resistance, retention stability, dimensional accuracy, chemical resistance and creep resistance.

Compared to Comparative Examples 15 to 17, Example 32 included the (g) compound and/or its condensate and accordingly provided the molded product having excellent heat aging resistance, retention stability, dimensional accuracy, chemical resistance and creep resistance.

Example 55 included the flame retardant and the auxiliary flame retardant, and Example 56 included the flame retardant. Examples 55 and 56 accordingly had the fire retardancy. Compared to Comparative Example 18, Examples 55 and 56 provided the molded products having excellent heat aging resistance, dimensional accuracy and creep resistance. Compared to Comparative Example 18, Example 55 included the (g) compound and/or its condensate and accordingly provided the molded product having excellent heat aging resistance, retention stability, dimensional accuracy, chemical resistance and creep resistance.

Example 57 and Comparative Example 19 included the impact resistance improver. Compared to Comparative Example 19, Example 57 included the (g) compound and/or its condensate and accordingly provided the molded product having excellent tensile strength and impact strength after heat treatment, i.e., provided the molded product having heat aging resistance.

Compared to Example 32, Example 58 used two different types of polyamide resins in combination and accordingly provided the molded product having better heat aging resistance.

INDUSTRIAL APPLICABILITY

The polyamide resin composition is moldable by any technique, for example, injection molding, injection compression molding, compression molding, extrusion molding, blow molding or press molding and may be processed to be used as various molded products. Especially, the polyamide resin composition provides molded products having excellent heat aging resistance, surface appearance, retention stability, dimensional accuracy, chemical resistance and creep resistance. By taking advantage of these features, the molded product is effectively processable in automobile applications such as automobile engine peripheral components, automobile under-hood components, automobile gear components, automobile interior components, automobile exterior components, air intake and exhaust system components, engine cooling water system components and automobile electric components and electric and electronic component applications such as LED reflector and SMT connector.

The invention claimed is:

1. A polyamide resin composition, comprising:
100 parts by weight of an (a) polyamide resin; and
0.1 to 20 parts by weight of a (g) compound and/or its condensate that includes a hydroxyl group and an epoxy group
wherein the (g) compound and/or its condensate is a reaction product of a hydroxyl group-containing aliphatic compound and an epoxy group-containing compound, and
a reaction rate defined by Equation (4) for the reaction of the hydroxyl group-containing aliphatic compound and the epoxy group-containing compound included in the (g) compound and/or its condensate is not lower than 20% and not higher than 70%, $$\text{reaction rate (\%)} = \{1-(b/a)\} \times 100 \quad \text{Equation (4), and}$$

wherein, in Equation (4), "a" represents an area of epoxy ring-derived peaks of a dry-blended mixture of the hydroxyl group-containing aliphatic compound and the epoxy-group containing compound, and "b" represents an area of epoxy ring-derived peaks of the (g) compound and/or its condensate.

2. The polyamide resin composition according to claim 1, wherein the (g) compound and/or its condensate has a number of hydroxyl groups per molecule that is greater than a total number of epoxy groups and carbodiimide groups per molecule.

3. The polyamide resin composition according to claim 1, wherein the (g) compound and/or its condensate has a hydroxyl value of 100 to 2000 mg KOH/g.

4. The polyamide resin composition according to claim 1, wherein, when an ASTM No. 1 dumbbell of 3.2 mm in thickness produced by injection molding of the polyamide resin composition is processed in the atmosphere by heat treatment at 130° C. for 100 hours, an increase rate in concentration of a carboxyl group in the polyamide resin composition from a surface of the dumbbell to a depth of 0.2 mm after the heat treatment is lower than 70%.

5. The polyamide resin composition according to claim 1, wherein the (a) polyamide resin includes two or more different types of polyamide resins.

6. A method of manufacturing the polyamide resin composition according to claim 1, comprising:
melt-kneading 10 to 250 parts by weight of the (g) compound and/or its condensate with 100 parts by weight of the (a) polyamide resin to produce a highly concentrated preliminary reactant; and
further melt-kneading the highly concentrated preliminary reactant with an (a) polyamide resin.

7. The polyamide resin composition according to claim 1, further comprising 1 to 150 parts by weight of an (e) inorganic filler relative to 100 parts by weight of the (a) polyamide resin.

8. A molded product produced by molding the polyamide resin composition according to claim 1.

9. The polyamide resin composition according to claim 1, comprising 2.0 to 20 parts by weight of a (g) compound and/or its condensate that includes a hydroxyl group and an epoxy group.

10. The polyamide resin composition according to claim 9, wherein the (g) compound and/or its condensate that includes a hydroxyl group and an epoxy group has a number of hydroxyl groups per molecule that is greater than a number of epoxy groups per molecule.

11. A polyamide resin composition, comprising:
100 parts by weight of an (a) polyamide resin; and
0.1 to 20 parts by weight of a (g) compound and/or its condensate that includes a hydroxyl group and a carbodiimide group,
wherein the (g) compound and/or its condensate is a reaction product of a hydroxyl group-containing aliphatic compound and a carbodiimide group-containing compound, and
a reaction rate defined by Equation (4) for the reaction of the hydroxyl group-containing aliphatic compound and the carbodiimide group-containing compound included in the (g) compound and/or its condensate is not lower than 20% and not higher than 70%, $$\text{reaction rate (\%)} = \{1-(b/a)\} \times 100 \quad \text{Equation (4), and}$$

wherein, in Equation (4), "a" represents an area of carbodiimide ring-derived peaks of a dry-blended mixture of the hydroxyl group-containing aliphatic compound and the carbodiimide-group containing compound, and "b" represents an area of carbodiimide ring-derived peaks of the (g) compound and/or its condensate.

* * * * *